US009982067B2

(12) United States Patent
Holtcamp et al.

(10) Patent No.: US 9,982,067 B2
(45) Date of Patent: May 29, 2018

(54) POLYMERIZATION PROCESS USING PYRIDYLDIAMIDO COMPOUNDS SUPPORTED ON ORGANOALUMINUM TREATED LAYERED SILICATE SUPPORTS

(71) Applicant: ExxonMobil Chemical Patents Inc., Baytown, TX (US)

(72) Inventors: Matthew W. Holtcamp, Huffman, TX (US); John R. Hagadorn, Houston, TX (US); Gregory S. Day, College Station, TX (US); Machteld M. W. Mertens, Boortmeerbeek (BE); Gerardo J. Majano Sanchez, Raritan, NJ (US); Rohan A. Hule, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days. days.

(21) Appl. No.: 15/239,036

(22) Filed: Aug. 17, 2016

(65) Prior Publication Data

US 2017/0088641 A1 Mar. 30, 2017

Related U.S. Application Data

(60) Provisional application No. 62/222,935, filed on Sep. 24, 2015.

(51) Int. Cl.
*C08F 4/76* (2006.01)
*C08F 4/64* (2006.01)
*C08F 10/02* (2006.01)
*C08L 23/06* (2006.01)

(52) U.S. Cl.
CPC .......... *C08F 10/02* (2013.01); *C08F 4/64148* (2013.01); *C08F 4/64* (2013.01); *C08L 23/06* (2013.01)

(58) Field of Classification Search
CPC ....... C08L 23/04; C08K 3/346; C08F 4/64148
See application file for complete search history.

(56) References Cited

U.S. PATENT DOCUMENTS

| | | | |
|---|---|---|---|
| 5,308,811 A | 5/1994 | Suga et al. | |
| 5,830,820 A | 11/1998 | Yano et al. | |
| 5,928,982 A | 7/1999 | Suga et al. | |
| 5,973,084 A | 10/1999 | Suga et al. | |
| 6,103,657 A | 8/2000 | Murray | |
| 6,274,684 B1 | 8/2001 | Loveday et al. | |
| 6,333,423 B1 | 12/2001 | Kol et al. | |
| 6,368,999 B1 | 4/2002 | Speca | |
| 6,399,535 B1 | 6/2002 | Shih et al. | |
| 6,531,552 B2 | 3/2003 | Nakano et al. | |
| 6,559,090 B1 | 5/2003 | Shih et al. | |
| 6,596,827 B2 | 7/2003 | Kol et al. | |
| 6,664,348 B2 | 12/2003 | Speca | |
| 6,734,131 B2 | 5/2004 | Shih et al. | |
| 6,844,389 B2 * | 1/2005 | Mehta | C08K 9/04 524/236 |
| 6,900,321 B2 | 5/2005 | Boussie et al. | |
| 6,924,334 B1 * | 8/2005 | Fukatani | C08K 7/00 501/145 |
| 6,943,224 B2 | 9/2005 | Shih | |
| 6,953,764 B2 | 10/2005 | Frazier et al. | |
| 7,183,348 B2 * | 2/2007 | Reinking | C08K 3/346 524/445 |
| 7,220,695 B2 | 5/2007 | Casty et al. | |
| 7,273,914 B2 * | 9/2007 | Wang | C08F 10/00 502/103 |
| 7,355,058 B2 | 4/2008 | Luo et al. | |
| 7,754,840 B2 | 7/2010 | Loveday et al. | |
| 7,858,718 B1 | 12/2010 | Nagy et al. | |
| 7,973,116 B2 | 7/2011 | Hagadorn et al. | |
| 8,071,701 B2 | 12/2011 | Klosin et al. | |
| 8,080,613 B2 * | 12/2011 | Moad | B82Y 30/00 524/442 |
| 8,110,518 B2 | 2/2012 | Marin et al. | |
| 8,158,733 B2 | 4/2012 | Nagy et al. | |
| 8,394,902 B2 | 3/2013 | Hagadorn et al. | |
| 8,575,284 B2 | 11/2013 | Luo et al. | |
| 8,674,040 B2 | 3/2014 | Hagadorn et al. | |
| 8,710,163 B2 | 4/2014 | Hagadorn et al. | |
| 8,791,217 B2 | 7/2014 | Hlavinka et al. | |
| 8,907,032 B2 | 12/2014 | Kol et al. | |
| 8,937,137 B2 | 1/2015 | Holtcamp et al. | |
| 8,952,114 B2 | 2/2015 | Giesbrecht et al. | |
| 8,957,171 B2 | 2/2015 | Giesbrecht et al. | |
| 8,957,172 B2 | 2/2015 | Giesbrecht et al. | |

(Continued)

FOREIGN PATENT DOCUMENTS

EP 511 665 A2 11/1992
EP 511 665 B1 11/1992

(Continued)

OTHER PUBLICATIONS

U.S. Appl. No. 61/779,435, filed Mar. 13, 2013, Holtcamp et al.
U.S. Appl. No. 62/149,799, filed Apr. 20, 2015, Ye et al.
U.S. Appl. No. 62/149,814, filed Apr. 20, 2015, Ye et al.
U.S. Appl. No. 62/168,302, filed May 29, 2015, Holtcamp et al.
U.S. Appl. No. 62/236,691, filed Oct. 2, 2015, Ye et al.
U.S. Appl. No. 62/236,697, filed Oct. 2, 2015, Ye et al.
U.S. Appl. No. 62/236,701, filed Oct. 2, 2015, Atienza et al.
U.S. Appl. No. 62/236,712, filed Oct. 2, 2015, Atienza et al.
U.S. Appl. No. 62/236,720, filed Oct. 2, 2015, Atienza et al.
U.S. Appl. No. 62/236,727, filed Oct. 2, 2015, Ye et al.
U.S. Appl. No. 15/051,421, filed Feb. 23, 2016, Atienza et al.
Barroso et al., "Chiral Diamine Bis(phenolate) TiIV and ZrIV Complexes—Synthesis, Structures and Reactivity," Eur. J. Inorg. Chem., 2011, pp. 4277-4290.

(Continued)

*Primary Examiner* — Rip A Lee

(57) ABSTRACT

This invention relates to a process to polymerize olefins comprising: i) contacting one or more olefins with a catalyst system comprising: 1) a support comprising an organoaluminum treated layered silicate and an inorganic oxide; and 2) a pyridyldiamido compound; and ii) obtaining olefin polymer having high molecular weight and layered silicate dispersed therein. Preferably the support is in the form of spheroidal particles.

49 Claims, 1 Drawing Sheet

(56) References Cited

U.S. PATENT DOCUMENTS

| | | | |
|---|---|---|---|
| 9,079,991 B2 | 7/2015 | Ker et al. | |
| 9,120,879 B2 | 9/2015 | Giesbrecht et al. | |
| 9,150,676 B2 | 10/2015 | Kol et al. | |
| 9,193,813 B2 | 11/2015 | Kol et al. | |
| 9,200,099 B2 | 12/2015 | Kol et al. | |
| 9,200,100 B2 | 12/2015 | Kol et al. | |
| 9,249,238 B2 | 2/2016 | Hagadorn et al. | |
| 9,260,552 B2 | 2/2016 | Hagadorn et al. | |
| 9,290,589 B2 | 3/2016 | Evans et al. | |
| 9,315,593 B2 | 4/2016 | Hagadorn | |
| 9,321,858 B2 | 4/2016 | Hagadorn et al. | |
| 2002/0019503 A1 | 2/2002 | Kol et al. | |
| 2002/0123582 A1 | 9/2002 | Speca | |
| 2002/0142912 A1 | 10/2002 | Boussie et al. | |
| 2003/0027950 A1 | 2/2003 | Uchino et al. | |
| 2003/0096698 A1 | 5/2003 | Shih et al. | |
| 2005/0148743 A1* | 7/2005 | Casty | B01J 31/02 526/113 |
| 2006/0293470 A1 | 12/2006 | Cao et al. | |
| 2010/0022726 A1* | 1/2010 | Hagadorn | C07D 213/38 526/154 |
| 2010/0040653 A1* | 2/2010 | Grah | C01B 33/44 424/401 |
| 2010/0227990 A1 | 9/2010 | Kuhlman et al. | |
| 2011/0077369 A1 | 3/2011 | Yukita | |
| 2011/0082323 A1 | 4/2011 | Small et al. | |
| 2011/0092651 A1 | 4/2011 | Arriola et al. | |
| 2012/0016092 A1 | 1/2012 | Nagy et al. | |
| 2013/0035463 A1 | 2/2013 | Cann et al. | |
| 2013/0131294 A1 | 5/2013 | Hagadorn et al. | |
| 2013/0172498 A1 | 7/2013 | Hlavinka et al. | |
| 2014/0031504 A1 | 1/2014 | Jacobsen et al. | |
| 2014/0039137 A1 | 2/2014 | Giesbrecht et al. | |
| 2014/0039138 A1 | 2/2014 | Giesbrecht et al. | |
| 2014/0039139 A1 | 2/2014 | Giesbrecht et al. | |
| 2014/0121341 A1 | 5/2014 | Holtcamp et al. | |
| 2014/0128557 A1 | 5/2014 | Giesbrecht et al. | |
| 2014/0221587 A1 | 8/2014 | Hagadorn et al. | |
| 2014/0275454 A1 | 9/2014 | Holtcamp et al. | |
| 2014/0378720 A1 | 12/2014 | Wu et al. | |
| 2015/0025205 A1 | 1/2015 | Jian et al. | |
| 2015/0119540 A1 | 4/2015 | Holtcamp et al. | |
| 2015/0141601 A1 | 5/2015 | Hagadorn et al. | |
| 2015/0329652 A1 | 11/2015 | Hlavinka | |
| 2017/0096506 A1 | 4/2017 | Ye et al. | |
| 2017/0096507 A1 | 4/2017 | Atienza et al. | |
| 2017/0096508 A1 | 4/2017 | Ye et al. | |
| 2017/0096509 A1 | 4/2017 | Atienza et al. | |
| 2017/0096510 A1 | 4/2017 | Ye et al. | |
| 2017/0096511 A1 | 4/2017 | Atienza et al. | |

FOREIGN PATENT DOCUMENTS

| | | |
|---|---|---|
| EP | 849 292 | 6/1998 |
| EP | 1 160 261 | 12/2001 |
| EP | 2436703 | 4/2012 |
| GB | 1002430 | 8/1965 |
| GB | 1278516 | 6/1972 |
| JP | 1995033814 A | 2/1995 |
| JP | 3891905 | 12/2006 |
| JP | 3943959 | 7/2007 |
| JP | 2007-254575 | 10/2007 |
| JP | 2007-262335 | 10/2007 |
| JP | 2007-262631 | 10/2007 |
| JP | 2007261211 | 10/2007 |
| JP | 2007262330 | 10/2007 |
| JP | 2007262336 | 10/2007 |
| JP | 2007262338 | 10/2007 |
| JP | 4615248 | 1/2011 |
| JP | 2011-089019 | 6/2011 |
| JP | 2013124302 A | 6/2013 |
| KR | 101381879 | 11/2012 |
| WO | WO 97/48743 | 12/1997 |
| WO | WO 01/42320 | 6/2001 |
| WO | 2002/038628 | 5/2002 |
| WO | WO 02/088198 | 11/2002 |
| WO | 2004/106390 A2 | 12/2004 |
| WO | 2005/075525 A2 | 8/2005 |
| WO | 2005/095469 | 10/2005 |
| WO | WO 2006/036748 | 4/2006 |
| WO | WO 2007/018804 | 2/2007 |
| WO | 2007/067965 | 6/2007 |
| WO | 2010/037059 | 4/2010 |
| WO | 2011/014533 | 2/2011 |
| WO | 2012/033670 A1 | 3/2012 |
| WO | 2012/098521 A1 | 7/2012 |
| WO | 2012/134614 A1 | 10/2012 |
| WO | WO 2012/134615 | 10/2012 |
| WO | WO 2012/158260 | 11/2012 |
| WO | 2013/028283 A1 | 2/2013 |
| WO | 2013/040276 A1 | 3/2013 |
| WO | 2014/137927 | 9/2014 |
| WO | 2014/143202 A1 | 9/2014 |
| WO | 2014/149361 A1 | 9/2014 |
| WO | 2015/088819 A1 | 6/2015 |
| WO | 2016/102690 | 6/2016 |
| WO | 2017/039994 | 3/2017 |
| WO | 2017/039995 | 3/2017 |

OTHER PUBLICATIONS

Busico et al., "Block Copolymers of Highly Isotactic Polypropylene via Controlled Ziegler-Natta Polymerization," Macromolecules, 2004, vol. 37, pp. 8201-8203.

Cipullo et al., "Improving the Behavior of Bis(phenoxyamine) Group 4 Metal Catalysts for Controlled Alkene Polymerization," Macromolecules, 2009, vol. 42, pp. 3869-3872.

Groysman et al., "From THF to Furan: Activity Tuning and Mechanistic Insight via Sidearm Donor Replacement in Group IV Amine Bis(phenolate) Polymerization Catalysts," Organometallics, 2003, vol. 22, pp. 3013-3015.

Groysman et al., "Diverse Structure-Activity Trends in Amine Bis(phenolate) Titanium Polymerization Catalysts," Organometallics, 2004, vol. 23, pp. 5291-5299.

Reybuck et al., "Amine Bis(phenolate) Zirconium Complexes: Influence of Ligand Structure and Cocatalyst on Copolymerization Behaivor," Macromolecules, 2005, vol. 38, pp. 2552-2558.

Su et al., "Oxo-Bridged Bimetallic Group 4 Complexes Bearing Amine-Bis(benzotriazole phenolate) Derivatives as Bifunctional Catalysts for Ring-Opening Polymerization of Lactide and Copolymerization of Carbon Dioxide with Cyclohexene Oxide," Organometallics, 2014, vol. 33, pp. 7091-7100.

Tshuva et al., "[ONXO]-Type Amine Bis(phenolate) Zirconium and Hafnium Complexes as Extremely Active 1-Hexene Polymerization Catalysts," Organometallics, 2002, vol. 21, pp. 662-670.

Bucheli, T.D. et al., Spherical Clay Conglomerates: A Novel Stationary Phase for Solid-Phase Extraction and "Reversed-Phase" Liquid Chromatography, Anal. Chem., 1999, vol. 71, pp. 2171-2178.

Gibson, V.C. et al., "Advances in Non-Metallocene Olefin Polymerization Catalysis," Chem. Rev., 2003, vol. 103, pp. 283-315.

Meurs, M.V. et al., "Polyethylene Chain Growth on Zinc Catalyzed by Olefin Polymerization Catalysts: A Comparative Investigation of Highly Active Catalyst Systems across the Transition Series," Jrnl. Am. Chem. Soc., 2005, vol. 127, pp. 9913-9923.

Valente, A. et al., "Coordinative Chain Transfer Polymerization," Chemical Reviews, 2013, vol. 113, pp. 3836-3857.

U.S. Appl. No. 62/332,940, filed May 6, 2016 Holtcamp et al,.

PCT/US2017/055131 filed Oct. 4, 2017 Hule et al.

U.S. Appl. No. 62/410,173, Oct. 19, 2016 Hule et al.

Nam et al., "Propene Polymerization with Stereospecific Metallocene Dichloride-[Ph3C] [B(C6F5)4] Using ω-Alkenylaluminum as an Alkylation Reagent and as a Functional Comonomer", Macromolecules, 2002, vol. 35, No. 18, pp. 6760-6762.

Dolzine et al., "Intramolecular metal—double bond interactions : VII. Intramolecular cyclization of alkenyl derivatives of lithium, aluminum, gallium and indium", Journal of Organometallic Chemistry, 1974, vol. 78, No. 2, pp. 165-176.

(56) References Cited

OTHER PUBLICATIONS

Warwel et al., "Thermische Strukturisomerisierung der Additionsprodukte von HAl(iso-C4H9)2 an 1,4-Pentadiene," Justus Liebigs Annalen der Chemie, vol. 1975, Issue 4; pp. 642-649.

Hata, "Aluminium-Olefinic Double Bond Interaction in Alkeynlaluminium Compounds," Chemical Communications, 1968, vol. 1, pp. 7-9.

Shiono et al., "Isospecific Polymerization of Propene over TiCl3 Combined with Bis(.omega.-alkenyl)zinc Compounds," Macromolecules, 1995, vol. 28, No. 2, pp. 437-443.

Weng et al., "Long Chain Branched Isotactic Polypropylene," Macromolecules, 2002, vol. 35, No. 10, pp. 3838-3843.

Dekmezian et al., "Characterization and Modeling of Metallocene-Based Branch-Block Copolymers," Macromolecules, 2002, vol. 35, No. 25, pp. 9586-9594.

Vaughan et al., "Industrial Catalysts for Alkene Polymerization," Polymer Science: A Comprehensive Reference, vol. 3, 3.20, pp. 657-672.

Britovsek et al., "The Search for New-Generation Olefin Polymerization Catalysts: Life beyond Metallocenes," Angew. Chem. Int. Ed., 1999, vol. 38, vol. 4, pp. 428-447.

Froese et al., "Mechanism of Activation of a Hafnium Pyridyl-Amide Olefin Polymerization Catalyst: Ligand Modification by Monomer," Journal of the American Chemical Society, 2007, vol. 129, No. 25, pp. 7831-7840.

Guerin et al., "Conformationally Rigid Diamide Complexes of Zirconium: Electron Deficient Analogues of Cp2Zr," Organometallics, 1996, vol. 15, No. 26, pp. 5586-5590.

U.S. Appl. No. 61/815,065, filed Apr. 23, 2013 Hagadorn et al.

Hu et al., "Syntheses, Characterization, and Ethylene Polymerization of Titanium Complexes with Double-Duty Tridentate [ONN] Ligands," Organometallics, 2012, vol. 31, No. 8, pp. 3241-3247.

Nifant'ev et al, "Reaction of 2,8-Bis(o-hydroxyaryl)quinolines with Group 4 Metal Alkyls Resulting in Three Distinct Coordination Modes of the Tridentate Ligand. X-ray Structure of Complexes and Performance as Precursors in Ethylene Polymerization Catalysis," Organometallics, 2013, vol. 32, No. 9, pp. 2685-2692.

Nifant'ev et al., "Zirconium and hafnium complexes based on 2-aryl-8-arylaminoquinoline ligands: synthesis, molecular structure, and catalytic performance in ethylene copolymerization," Dalton Transactions, 2013, vol. 42, pp. 1501-1511.

\* cited by examiner

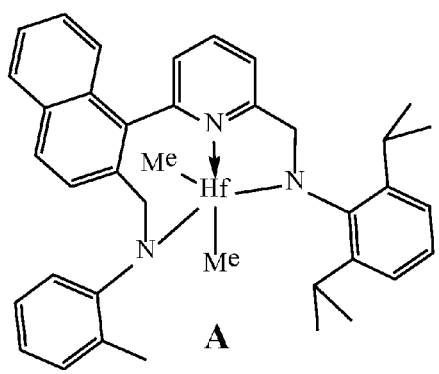
A
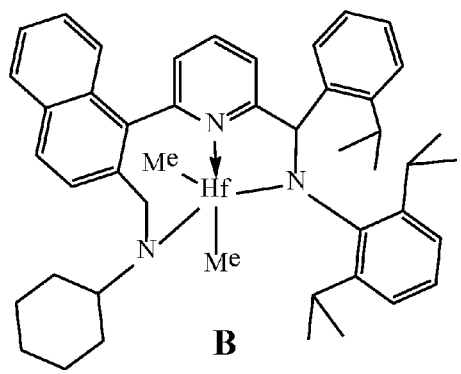
B
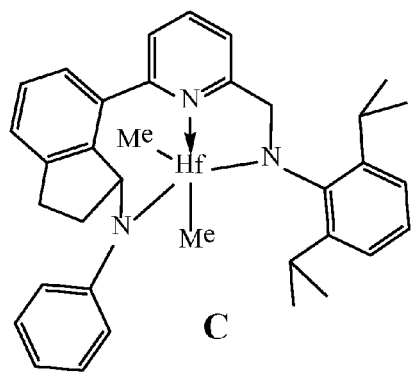
C
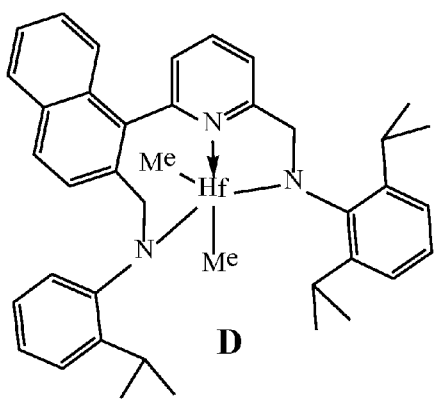
D

POLYMERIZATION PROCESS USING PYRIDYLDIAMIDO COMPOUNDS SUPPORTED ON ORGANOALUMINUM TREATED LAYERED SILICATE SUPPORTS

CROSS REFERENCE TO RELATED APPLICATIONS

This invention claims priority to and the benefit of U.S. Ser. No. 62/222,935, filed Sep. 24, 2015.

FIELD OF THE INVENTION

This invention relates to supported pyridyldiamido compounds useful for the polymerization of olefins, in particular ethylene, where the catalyst support comprises a layered silicate and an inorganic oxide. This invention also relates to polymerization processes using these supported pyridyldiamido compounds, in particular, gas phase polymerization processes.

BACKGROUND OF THE INVENTION

Various types of polyethylenes are known in the art and, high density, low density, and linear low density polyethylenes are some of the most useful. Low density polyethylene is generally prepared at high pressure using free radical initiators, or in gas phase processes using Ziegler-Natta or vanadium catalysts, and typically has a density in the range of 0.916 to 0.950 g/cm$^3$. Typical low density polyethylene produced using free radical initiators is known in the industry as "LDPE". LDPE is also known as "branched" or "heterogeneously branched" polyethylene because of the relatively large number of long chain branches extending from the main polymer backbone. Polyethylene in the same density range, i.e., 0.916 to 0.940 g/cm$^3$, which is linear and does not contain long chain branching, is known as "linear low density polyethylene" ("LLDPE") and is typically produced with conventional Ziegler-Natta catalysts or with metallocene catalysts. Polyethylenes having still greater density are the high density polyethylenes ("HDPEs"), i.e., polyethylenes having densities greater than 0.940 g/cm$^3$, and are generally prepared with Ziegler-Natta catalysts. Very low density polyethylenes ("VLDPEs") are also known. VLDPEs can be produced by a number of different processes yielding polyethylenes having a density less than 0.916 g/cm$^3$, typically 0.890 to 0.915 g/cm$^3$ or 0.900 to 0.915 g/cm$^3$.

A majority of global LDPE and LLDPE demand includes film, carrying bag, and sack applications. Some examples of these applications include agricultural, multi-layer, and shrink films. LDPE, which is soft, ductile, and flexible, is additionally utilized for strong, elastic goods, such as screw caps, lids, and coatings. There remains a demand for LDPE and LLDPE in the global marketplace, and consequently there is a continued need for improvements that provide cost savings.

Some improvements include using a different catalyst system. For example, some work has been done to provide branched polymers having a density of 0.940 g/cm$^3$ or less using metallocene compounds. JP2011-089019A discloses a bridged metallocene in combination with a cocatalyst (a modified clay mineral, an alkyl alumoxane or an ionized ionic compound) and an organoaluminum compound for olefin polymerization which can produce a polyolefin which possesses long chain branching with high activity.

Pyridyl amines have been used to prepare Group 4 complexes which are useful transition metal components for use in the polymerization of alkenes, see for example US 2002/0142912; U.S. Pat. No. 6,900,321; and U.S. Pat. No. 6,103,657, where the ligands have been used in complexes in which the ligands are coordinated in a bidentate fashion to the transition metal atom.

Other improvements have focused on the support technology. Alternative supports for metallocene and single-site catalysts have been the subject of numerous ongoing research projects. In particular, metallocenes supported on clay or ion-exchanged layered compounds have generated a great deal of interest. Olefin polymerization catalysts using clay, clay mineral, or acid/salt-treated (or a combination of both) ion-exchange layered compounds, an organoaluminum compound and a metallocene as components have been reported (see EP 0,511,665A2; EP 0,511,665B1; and U.S. Pat. No. 5,308,811). Likewise, U.S. Pat. No. 5,928,982 and U.S. Pat. No. 5,973,084 report olefin polymerization catalysts containing an acid or salt-treated (or a combination of both) ion exchange layered silicate, containing less than 1% by weight water, an organoaluminum compound and a metallocene. Furthermore, WO 01/42320 A1 discloses combinations of clay or clay derivatives as a catalyst support, an activator comprising any Group 1-12 metal or Group 13 metalloid, other than organoaluminum compound, and a Group 3-13 metal complex. Also, U.S. Pat. No. 6,531,552B2 and EP 1,160,261 A1 report an olefin polymerization catalyst of an ion-exchange layered compound having particular acid strength and acid site densities. US 2003/0027950 A1 reports an olefin polymerization catalyst utilizing ion-exchange layered silicates with a specific pore size distribution and having a carrier strength within a specific range.

U.S. Pat. No. 7,220,695 discloses catalyst systems comprising, inter alia, metallocene catalysts and supported activator systems comprising an ion-exchange layered silicate, an organoaluminum compound, and a heterocyclic organic compound, see Example 7 et seq.

U.S. Pat. No. 6,559,090 discloses a coordinating catalyst system comprising at least one metallocene or constrained geometry pre-catalyst transition metal compound, (e.g., di-(n-butylcyclopentadienyl)zirconium dichloride), at least one support-activator (e.g., spray dried silica/clay agglomerate), and, optionally, at least one organometallic compound (e.g., triisobutyl aluminum), in controlled amounts, and methods for preparing the same.

Accordingly, there is a need for new processes to produce low cost LLDPE or HDPE over a wide molecular weight range. More specifically, there is a need for new supported catalyst systems, particularly supported pyridyldiamido catalyst systems, to produce new polyethylenes, such as high molecular weight polyethylenes, which can be useful as a component in bimodal high density PE resins for pipe applications, film, or blow molding, particularly such with layered silicates dispersed therein. It is further desirable that these new pyridyldiamido catalyst systems are robust and have high productivity, particularly in gas phase polymerization processes, and can even be used as a single component supported catalyst or in a mixed component catalyst system.

SUMMARY OF THE INVENTION

This invention relates to a process to polymerize olefins comprising: i) contacting olefins with a catalyst system comprising: 1) support comprising an organoaluminum treated layered silicate and an inorganic oxide and 2) pyridyldiamido compound represented by the Formula (A):

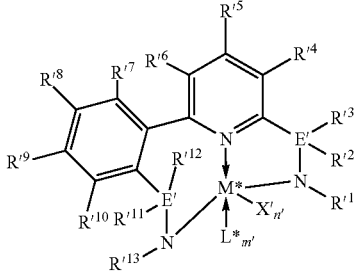

wherein:
M* is a Group 4 metal;
each E' group is independently selected from carbon, silicon, or germanium;
each X' is an anionic leaving group;
L* is a neutral Lewis base;
$R'^1$ and $R'^{13}$ are independently selected from the group consisting of hydrocarbyls, substituted hydrocarbyls, and silyl groups;
$R'^2$, $R'^3$, $R'^4$, $R'^5$, $R'^6$, $R'^7$, $R'^8$, $R'^9$, $R'^{10}$, $R'^{11}$, and $R'^{12}$ are independently selected from the group consisting of hydrogen, hydrocarbyls, alkoxy, silyl, amino, aryloxy, substituted hydrocarbyls, halogen, and phosphino;
n' is 1 or 2;
m' is 0, 1, or 2; and
two X' groups may be joined together to form a dianionic group;
two L* groups may be joined together to form a bidentate Lewis base;
an X' group may be joined to an L* group to form a monoanionic bidentate group;
$R'^7$ and $R'^8$ may be joined to form a ring; and
$R'^{10}$ and $R'^{11}$ may be joined to form a ring.

This invention also relates to a process to polymerize olefins comprising: i) contacting olefins with a catalyst system comprising: 1) support comprising an organoaluminum treated layered silicate and an inorganic oxide and 2) pyridyldiamido compound represented by the Formula (A):

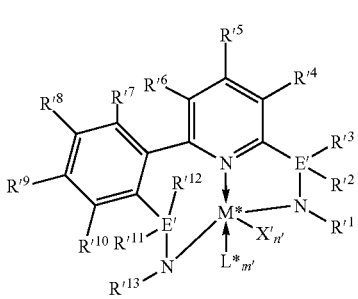

wherein:
M* is a Group 4 metal;
each E' group is independently selected from carbon, silicon, or germanium;
each X' is an anionic leaving group;
L* is a neutral Lewis base;
$R'^1$ and $R'^{13}$ are independently selected from the group consisting of hydrocarbyls, substituted hydrocarbyls, and silyl groups;
$R'^2$, $R'^3$, $R'^4$, $R'^5$, $R'^6$, $R'^7$, $R'^8$, $R'^9$, $R'^{10}$, $R'^{11}$, and $R'^{12}$ are independently selected from the group consisting of hydrogen, hydrocarbyls, alkoxy, silyl, amino, aryloxy, substituted hydrocarbyls, halogen, and phosphino;
n' is 1 or 2;
m' is 0, 1, or 2; and
two X' groups may be joined together to form a dianionic group;
two L* groups may be joined together to form a bidentate Lewis base;
an X' group may be joined to an L* group to form a monoanionic bidentate group;
$R'^7$ and $R'^8$ may be joined to form a ring; and
$R'^{10}$ and $R'^{11}$ may be joined to form a ring; and
and ii) obtaining polyolefin composition, A, having an Mw of 1,000,000 g/mol or more and comprising less than 5 wt %, based upon weight of polymer, of the layered silicate, where polyolefin composition A has: 1) no diffraction peak resulting from interlamellar spacing of the organoaluminum treated layered silicate, and/or 2) a diffraction peak resulting from interlamellar spacing of the organoaluminum treated layered silicate of Z Angstroms or more, where Z=5X, where X is the diffraction peak resulting from interlamellar spacing of the support before combination with the catalyst compound, as measured by wide angle x-ray scattering.

This invention also relates to a supported catalyst system comprising a pyridyldiamido compound described above and a support comprising an organoaluminum (preferably alkylaluminum) treated layered silicate and an inorganic oxide.

This invention also relates to supported catalyst systems comprising pyridyldiamido compounds described above supported on particles of an agglomerate of an inorganic oxide and an organoaluminum (preferably alkylaluminum) treated layered silicate, where the support has been spray dried prior to contact with the organoaluminum.

This invention relates to catalyst systems comprising: 1) a support comprising an organoaluminum treated layered silicate and an inorganic oxide and 2) pyridyldiamido compound represented by the formula described above.

BRIEF DESCRIPTION OF THE FIGURES

FIG. 1 is a depiction of compounds A, B, C and D.

DETAILED DESCRIPTION OF THE INVENTION

Definitions

For the purposes of this invention and the claims thereto, the new numbering scheme for the Periodic Table Groups is used as set out in CHEMICAL AND ENGINEERING NEWS, 63(5), 27 (1985). Therefore, a "Group 4 metal" is an element from Group 4 of the Periodic Table.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gP/gcat/hr. "Catalyst activity" is a measure of how many grams of polymer are produced using a polymerization catalyst comprising W g of catalyst (cat) and may be expressed by the following formula: P/W and expressed in units of gP/g (cat), and is typically used for batch processes. Catalyst activity may be converted to catalyst productivity by taking into account the run time of the batch process: catalyst productivity=catalyst activity/T, where T is the run time in hours.

An "olefin," alternatively referred to as "alkene," is a linear, branched, or cyclic compound of carbon and hydrogen having at least one double bond. For the purposes of this invention and the claims thereto, when a polymer is referred to as "comprising an olefin," the olefin present in the polymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different," as used to refer to mer units, indicates that the mer units differ from each other by at least one atom or are different isomerically. Accordingly, the definition of polymer, as used herein, includes co- and ter-polymers and the like and the definition of copolymer, as used herein, includes terpolymers and the like. An ethylene polymer is a polymer comprising more than 50 mol % ethylene, a propylene polymer is a polymer comprising more than 50 mol % propylene, and so on.

As used herein, Mn is number average molecular weight, Mw is weight average molecular weight, and Mz is z average molecular weight, wt % is weight percent, mol % is mole percent, vol % is volume percent and mol is mole. Molecular weight distribution (MWD), also referred to as polydispersity index (PDI), is defined to be Mw divided by Mn, Mw/Mn. Unless otherwise noted, all molecular weights (e.g., Mw, Mn, Mz) have units of g/mol. Unless otherwise noted, all melting points ($T_m$) are DSC second melt.

A "catalyst system" is a combination of at least one catalyst compound, at least one activator, at least one support material, and optional co-activator. An "anionic ligand" is a negatively charged ligand which donates one or more pairs of electrons to a metal ion. A "neutral donor ligand" is a neutrally charged ligand which donates one or more pairs of electrons to a metal ion.

The following abbreviations are used through this specification: dme is 1,2-dimethoxyethane, Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, nBu is normal butyl, TMS is trimethylsilyl, TIBAL is triisobutylaluminum, TNOAL is tri(n-octyl)aluminum, MAO is methylalumoxane, p-Me is para-methyl, Bn is benzyl (i.e., $CH_2Ph$), THF (also referred to as thf) is tetrahydrofuran, tol is toluene, EtOAc is ethyl acetate, and Cy is cyclohexyl.

Room temperature (RT) is 23° C. unless otherwise indicated.

Unless otherwise indicated, the term "substituted" means that a hydrogen has been replaced with a heteroatom, a heteroatom-containing group, or a hydrocarbyl group. For example, bromo-cyclopentadiene is cyclopentadiene substituted with a bromine group.

The terms "hydrocarbyl radical," "hydrocarbyl" and "hydrocarbyl group" are used interchangeably throughout this document. Likewise the terms "group", "radical", and "substituent" are also used interchangeably in this document. For purposes of this disclosure, "hydrocarbyl radical" is defined to be a radical of carbon and hydrogen, preferably a $C_1$-$C_{100}$ radical of carbon and hydrogen, that may be linear, branched, or cyclic, and when cyclic, aromatic or non-aromatic.

Substituted hydrocarbyl radicals are hydrocarbyl radicals in which at least one hydrogen atom of the hydrocarbyl radical has been substituted with a heteroatom or heteroatom-containing group, such as a group having at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like, or where at least one heteroatom has been inserted within a hydrocarbyl ring.

The term "complex", as used herein, is also often referred to as catalyst precursor, pre-catalyst, catalyst, catalyst compound, transition metal compound, or transition metal complex. These words are used interchangeably. Activator and co-catalyst are also used interchangeably.

A scavenger is a compound that is typically added to facilitate polymerization by scavenging impurities. Some scavengers may also act as chain transfer agents. Some scavengers may also act as activators and may be referred to as co-activators. A co-activator, that is not a scavenger, may also be used in conjunction with an activator in order to form an active catalyst. In some embodiments, a co-activator can be pre-mixed with the transition metal compound to form an alkylated transition metal compound. Examples of scavengers include, but are not limited to, trialkylaluminums, methylalumoxanes, modified methylalumoxanes, MMAO-3A (Akzo Nobel), bis(diisobutylaluminum)oxide (Akzo Nobel), tri(n-octyl)aluminum, triisobutylaluminum, and diisobutylaluminum hydride.

The term "aryl" or "aryl group" means a six-carbon aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, preferably N, O, or S.

The term "ring atom" means an atom that is part of a cyclic ring structure. By this definition, a benzyl group has six ring atoms and tetrahydrofuran has 5 ring atoms.

A "ring carbon atom" is a carbon atom that is part of a cyclic ring structure. By this definition, a benzyl group has six ring carbon atoms and para-methylstyrene also has six ring carbon atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

Aromatic means a cyclic hydrocarbyl with conjugated double bonds, such as benzene or cyclopentadiene.

As used herein, the term "aromatic" also refers to pseudoaromatic cyclic groups which are cyclic substituents that have similar properties and structures (nearly planar) to aromatic ligands, but are not by definition aromatic.

The term "continuous" means a system that operates without interruption or cessation. For example, a continuous process to produce a polymer would be one where the reactants are continually introduced into one or more reactors and polymer product is continually withdrawn.

The term "agglomerate" as used herein refers to a material comprising an assembly, of primary particles held together by adhesion, i.e., characterized by weak physical interactions such that the particles can easily be separated by mechanical or chemical forces.

Embodiments

This invention relates to catalyst systems comprising: 1) a support comprising an organoaluminum treated layered silicate and an inorganic oxide and 2) pyridyldiamido compound represented by the Formula (A) below.

This invention also relates to a process to polymerize olefins comprising: i) contacting olefins with catalyst systems comprising: 1) a support comprising an organoaluminum treated layered silicate and an inorganic oxide and 2) pyridyldiamido compound represented by the Formula (A):

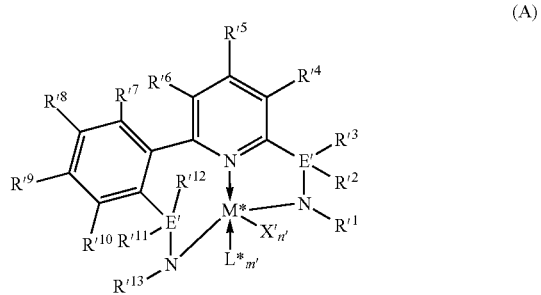

(A)

wherein:
M* is a Group 4 metal (preferably hafnium);
each E' group is independently selected from carbon, silicon, or germanium (preferably carbon);
each X' is an anionic leaving group (preferably alkyl, aryl, hydride, alkylsilane, fluoride, chloride, bromide, iodide, triflate, carboxylate, alkylsulfonate);
L* is a neutral Lewis base (preferably ether, amine, thioether);
$R'^1$ and $R'^{13}$ are independently selected from the group consisting of hydrocarbyls, substituted hydrocarbyls, and silyl groups (preferably aryl groups);
$R'^2$, $R'^3$, $R'^4$, $R'^5$, $R'^6$, $R'^7$, $R'^8$, $R'^9$, $R'^{10}$, $R'^{11}$, and $R'^{12}$ are independently selected from the group consisting of hydrogen, hydrocarbyls, alkoxy, silyl, amino, aryloxy, substituted hydrocarbyls, halogen, and phosphino;
n' is 1 or 2;
m' is 0, 1, or 2; and
two X' groups may be joined together to form a dianionic group;
two L* groups may be joined together to form a bidentate Lewis base;
an X' group may be joined to an L* group to form a monoanionic bidentate group;
$R'^7$ and $R'^8$ may be joined to form a ring (preferably an aromatic ring, preferably a six-membered aromatic ring with the joined $R'^7R'^8$ group being —CH═CHCH═CH—); and $R'^{10}$ and $R'^{11}$ may be joined to form a ring (preferably a five-membered ring with the joined $R'^{10}R'^{11}$ group being —CH$_2$CH$_2$—, or a six membered ring with the joined $R'^{10}R'^{11}$ group being —CH$_2$CH$_2$CH$_2$—).

This invention also relates to a process to polymerize olefins comprising contacting olefins with a catalyst system comprising pyridyldiamido compound represented by the Formula (I), (II) or (III), as described herein, deposited on a support comprising organoaluminum treated layered silicate and an inorganic oxide.

This invention further relates to a process to polymerize olefins comprising: i) contacting olefins with catalyst systems comprising: 1) support comprising an organoaluminum treated layered silicate support and an inorganic oxide and 2) pyridyldiamido compound represented by the following Formula (I), (II) or (III):

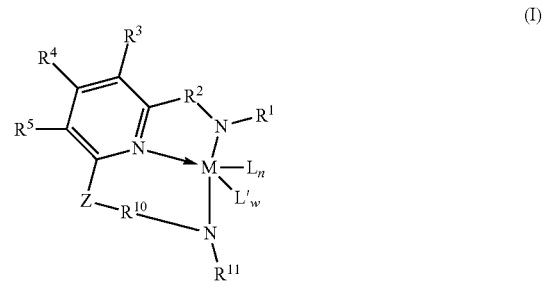

(I)

wherein:
M is a Group 4 metal;
Z is —($R^{14}$)$_p$C—C($R^{15}$)$_q$—,
where $R^{14}$ and $R^{15}$ are independently selected from the group consisting of hydrogen, hydrocarbyls, and substituted hydrocarbyls, and wherein adjacent $R^{14}$ and $R^{15}$ groups may be joined to form an aromatic or saturated, substituted or unsubstituted hydrocarbyl ring, where the ring has 5, 6, 7, or 8 ring carbon atoms and where substitutions on the ring can join to form additional rings,
p is 0, 1 or 2, and
q is 0, 1 or 2;
$R^1$ and $R^{11}$ are independently selected from the group consisting of hydrocarbyls, substituted hydrocarbyls, and silyl groups;
$R^2$ and $R^{10}$ are each, independently, -E($R^{12}$)($R^{13}$)— with E being carbon, silicon, or germanium, and each $R^{12}$ and $R^{13}$ being independently selected from the group consisting of hydrogen, hydrocarbyls, alkoxy, silyl, amino, aryloxy, substituted hydrocarbyls, halogen, and phosphino, $R^{12}$ and $R^{13}$ may be joined to each other or to $R^{14}$ or $R^{15}$ to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;
$R^3$, $R^4$, and $R^5$ are independently selected from the group consisting of hydrogen, hydrocarbyls (such as alkyls and aryls), substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;
L is an anionic leaving group, where the L groups may be the same or different and any two L groups may be linked to form a dianionic leaving group;
n is 1 or 2;
L' is a neutral Lewis base; and
w is 0, 1, or 2.

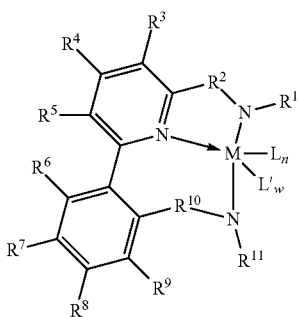

(II)

wherein:
$R^6$, $R^7$, $R^8$, and $R^9$ are independently selected from the group consisting of hydrogen, hydrocarbyls, substituted hydrocarbyls, alkoxy, halogen, amino, and silyl, and wherein adjacent R groups ($R^6$ & $R^7$ and/or $R^7$ & $R^8$ and/or $R^8$ & $R^9$, and/or $R^9$ & $R^{10}$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, $R^1$, $R^2$, $R^3$, $R^4$, $R^5$, $R^{10}$, and $R^{11}$ are as defined above in Formula (I); and

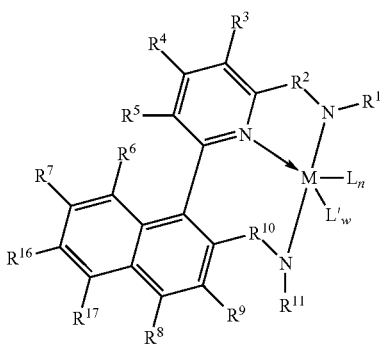

(III)

wherein:
$R^{16}$ and $R^{17}$ are independently selected from the group consisting of hydrogen, hydrocarbyls, substituted hydrocarbyls, alkoxy, halogen, amino, and silyl, and wherein adjacent R groups ($R^6$ & $R^7$ and/or $R^7$ & $R^{16}$ and/or $R^{16}$ & $R^{17}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, $R^1$, $R^2$, $R^3$, $R^4$, $R^5$, $R^6$, $R^7$, $R^8$, $R^9$, $R^{10}$, and $R^{11}$ are as defined above in Formula (I) and (II); and
ii) obtaining polyolefin composition, A, having an Mw of 1,000,000 g/mol or more and comprising less than 5 wt %, based upon weight of polymer, of the layered silicate, where polyolefin composition A has: 1) no diffraction peak resulting from interlamellar spacing of the organoaluminum treated layered silicate, and/or 2) a diffraction peak resulting from interlamellar spacing of the organoaluminum treated layered silicate of Z Angstroms or more, where Z=5X, where X is the diffraction peak resulting from interlamellar spacing of the support before combination with the catalyst compound, as measured by wide angle x-ray scattering.

This invention also relates to a process to prepare high molecular weight (Mw of 1,000,000 g/mol or more) ethylene polymers, preferably having excellent bulk density (0.25 g/cc or more), preferably without using additional activator such as an alumoxane and or a non-coordinating anion, comprising contacting ethylene and optional comonomer with a catalyst system comprising pyridyldiamido compound represented by the Formula A, (I), (II) or (III), as described herein, deposited on a support comprising organoaluminum treated layered silicate and an inorganic oxide.

This invention also relates to any of the above processes where the support and or the supported catalyst system is present in the form of spherioid particles, preferably having an average particle size (D50) of 20 to 180 microns, alternately 55 to 180 microns, and a surface area of about 100 to about 200 m²/g and a pore volume of about 0.1 to about 0.4 cc/g.

This invention also relates to any of the above processes where the support and/or the supported catalyst system have an average aspect ratio (L/W) of 1 to 1.7 (alternately 1 to 1.6, alternately 1 to 1.5, alternately 1 to 1.4, alternately 1 to 1.3, and alternately 1 to 1.2).

Average aspect ratio of the support and or supported catalyst systems is determined by averaging the aspect ratio (length versus width) of multiple particles as shown in Scanning Electron Micrographs. Several SEM photographs of the sample are taken and 35 particles of layered silicate are identified and measured. For each of the 35 particles, the longest dimension is identified by drawing a line between the two points at the edge of the particle which are the furthest apart ("length"). Then the shortest dimension is identified by drawing a line between the two points at the edge of the particle which are the least distance apart ("width"). Length is then divided by width to obtain aspect ratio. The average aspect ratio is calculated as the arithmetical mean based on the aspect ratio of the 35 particles. Image-Pro Plus™ v 7.0.0 is used for image analysis.

When selecting the 35 particles for analysis: 1) only particles which are entirely in the field of view are chosen for analysis; and 2) particles which exhibit signs of damage such as rough fracture surfaces due to handling are not included in the analysis.

This invention also relates to any of the above processes where the support and/or the supported catalyst system is present in the form of spherioid particles, has an average aspect ratio (L/W) of 1 to 1.7 (alternately 1 to 1.6, alternately 1 to 1.5, alternately 1 to 1.4, alternately 1 to 1.3, alternately 1 to 1.2); has an average particle size (D50) of 20 to 180 microns, alternately 55 to 180 microns, has a surface area of about 100 to about 200 m²/g and has a pore volume of about 0.1 to about 0.4 cc/g.

Alternately, the catalyst system has an average aspect ratio (L/W) of 1 to 1.7, has an average particle size (D50) of 20 to 180 microns, and has a pore volume of about 0.1 to about 0.4 cc/g.

Pyridyldiamido Transition Metal Complex

The term "pyridyldiamido complex" or "pyridyldiamide complex" or "pyridyldiamido catalyst" or pyridyldiamide catalyst" refers to a class of coordination complexes described in U.S. Pat. No. 7,973,116B2, US 2012/0071616A1, US 2011/0224391A1, and US 2011/0301310A1, US 2014/0221587A1, US 2014/0256893A1, US 2014/0316089A1, US 2015/0141590A1, and US 2015/0141601A1 that feature a dianionic tridentate ligand that is coordinated to a metal center through one neutral Lewis basic donor atom (e.g., a pyridine group) and a pair of anionic amido or phosphido (i.e., deprotonated amine or phosphine) donors. In these complexes, the pyridyldiamido ligand is coordinated to the metal with the formation of one five-membered chelate ring and one seven-membered chelate ring. It is possible for additional atoms of the pyridyldiamido ligand to be coordinated to the metal without affecting the catalyst function upon activation; an example of this could be a cyclometalated substituted aryl group that forms an additional bond to the metal center.

In one aspect of the invention, the supported catalyst system comprises a pyridyldiamido transition metal complex represented by the Formula (A):

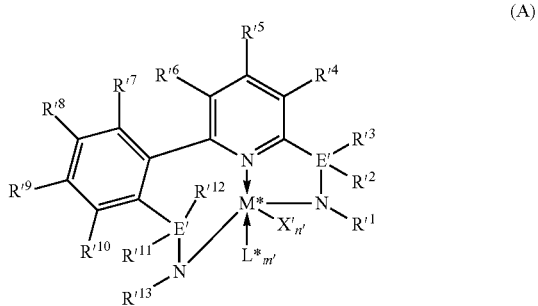

(A)

wherein:

M* is a Group 4 metal (preferably hafnium);

each E' group is independently selected from carbon, silicon, or germanium (preferably carbon);

each X' is an anionic leaving group (preferably alkyl, aryl, hydride, alkylsilane, fluoride, chloride, bromide, iodide, triflate, carboxylate, alkylsulfonate);

L* is a neutral Lewis base (preferably ether, amine, thioether);

$R'^1$ and $R'^{13}$ are independently selected from the group consisting of hydrocarbyls, substituted hydrocarbyls, and silyl groups (preferably aryl);

$R'^2$, $R'^3$, $R'^4$, $R'^5$, $R'^6$, $R'^7$, $R'^8$, $R'^9$, $R'^{10}$, $R'^{11}$, and $R'^{12}$ are independently selected from the group consisting of hydrogen, hydrocarbyls, alkoxy, silyl, amino, aryloxy, substituted hydrocarbyls, halogen, and phosphino;

n' is 1 or 2;

m' is 0, 1, or 2; and two X' groups may be joined together to form a dianionic group;

two L* groups may be joined together to form a bidentate Lewis base;

an X' group may be joined to an L* group to form a monoanionic bidentate group;

$R'^7$ and $R'^8$ may be joined to form a ring (preferably an aromatic ring, a six-membered aromatic ring with the joined $R'^7R'^8$ group being —CH═CHCH═CH—); and $R'^{10}$ and $R'^{11}$ may be joined to form a ring (preferably a five-membered ring with the joined $R'^{10}R'^{11}$ group being —CH$_2$CH$_2$—, a six-membered ring with the joined $R'^{10}R'^{11}$ group being —CH$_2$CH$_2$CH$_2$—).

In any embodiment described herein, M* is preferably Zr, or Hf, preferably Hf.

In any embodiment described herein, the R' groups above ($R'^1$, $R'^2$, $R'^3$, $R'^4$, $R'^5$, $R'^6$, $R'^7$, $R'^8$, $R'^9$, $R'^{10}$, $R'^{11}$ $R'^{12}$, and $R'^{13}$) preferably contain up to 30, preferably no more than 30 carbon atoms, especially from 2 to 20 carbon atoms.

In a preferred embodiment of the invention, $R'^1$ is selected from phenyl groups that are variously substituted with between zero to five substituents that include F, Cl, Br, I, CF$_3$, NO$_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In any embodiment described herein, preferably $R'^1$ and $R'^{13}$ are independently selected from phenyl groups that are variously substituted with between zero to five substituents that include F, Cl, Br, I, CF$_3$, NO$_2$, alkoxy, dialkylamino, aryl, and alkyl groups with between one to ten carbons, such as methyl, ethyl, propyl, butyl, pentyl, hexyl, heptyl, octyl, nonyl, decyl, and isomers thereof.

In any embodiment described herein, preferably E is carbon, and $R'^1$ and $R'^{13}$ are independently selected from phenyl groups that are variously substituted with between zero to five substituents that include F, Cl, Br, I, CF$_3$, NO$_2$, alkoxy, dialkylamino, hydrocarbyl, and substituted hydrocarbyls, groups with from one to ten carbons.

In any embodiment described herein, preferably $R'^1$ and $R'^{13}$ are selected from aryl or alkyl groups containing from 6 to 30 carbon atoms, especially phenyl groups. It is preferred that $R'^1$ and $R'^{13}$ be chosen from aryl or alkyl groups and that $R'^2$, $R'^3$, $R'^{11}$, and $R'^{12}$, be independently chosen from hydrogen, alkyl, and aryl groups, such as phenyl. The phenyl groups may be alkyl substituted. The alkyl substituents may be straight chain alkyls, but include branched alkyls.

Preferably, each $R'^1$ and $R'^{13}$ is a substituted phenyl group with either one or both of $R^2$ and $R^{11}$ being substituted with a group containing between one to ten carbons. Some specific examples would include, $R^1$ and $R^{13}$ being chosen from a group including 2-methylphenyl, 2-isopropylphenyl, 2-ethylphenyl, 2,6-dimethylphenyl, mesityl, 2,6-diethylphenyl, and 2,6-diisopropylphenyl.

In a preferred embodiment, $R'^7$ and $R'^8$ may be joined to form a four- to ten-membered ring. One example has the $R'^7R'^8$ group being —CH═CHCH═CH—, with the formation of an aromatic six-membered ring.

In a preferred embodiment, $R'^{10}$ and $R'^{11}$ may be joined to form a four- to ten-membered ring. One specific example has the $R'^{10}R'^{11}$ group being —CH$_2$CH$_2$—, with the formation of a five-membered ring. Another example has the $R'^{10}R'^{11}$ being —CH$_2$CH$_2$CH$_2$—, with the formation of a six-membered ring.

In a preferred embodiment, E' is carbon.

In a preferred embodiment, $R'^2$ is an aromatic hydrocarbyl group containing between 6 to 12 carbon atoms and $R'^{13}$ is a saturated hydrocarbon containing between 3 to 12 carbon atoms. A specific example has $R'^2$=2-isopropylphenyl and $R'^{13}$=cyclohexyl.

In any embodiment described herein, $R'^2$, $R'^3$, $R'^4$, $R'^5$, $R'^6$, $R'^7$, $R'^8$, $R'^9$, $R'^{10}$, $R'^{11}$, and $R'^{12}$ may be hydrogen or alkyl from 1 to 4 carbon atoms. Preferably 0, 1, or 2 of $R'^2$, $R'^3$, $R'^4$, $R'^5$, $R'^6$, $R'^7$, $R'^8$, $R'^9$, $R'^{10}$, $R'^{11}$, and $R'^{12}$ are alkyl substituents.

In any embodiment described herein, preferably X' is selected from alkyl, aryl, hydride, alkylsilane, fluoride, chloride, bromide, iodide, triflate, carboxylate, alkylsulfonate, alkoxy, amido, hydrido, phenoxy, hydroxy, silyl, allyl, alkenyl, and alkynyl.

In any embodiment described herein, preferably L* is selected from ethers, thio-ethers, amines, nitriles, imines, pyridines, and phosphines, preferably ethers.

In one aspect of the invention, the supported catalyst system comprises a pyridyldiamido transition metal complex represented by the Formula (I):

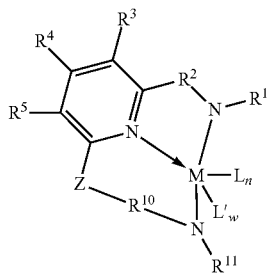

(I)

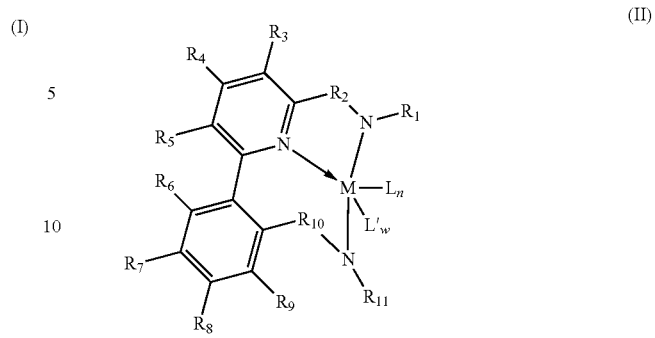

(II)

M is a Group 4 metal, preferably a group 4 metal, more preferably Ti, Zr or Hf;

Z is $-(R^{14})_pC-C(R^{15})_q-$, where $R^{14}$ and $R^{15}$ are independently selected from the group consisting of hydrogen, hydrocarbyls, and substituted hydrocarbyls, (preferably hydrogen and alkyls), and wherein adjacent $R^{14}$ and $R^{15}$ groups may be joined to form an aromatic or saturated, substituted or unsubstituted hydrocarbyl ring, where the ring has 5, 6, 7, or 8 ring carbon atoms and where substitutions on the ring can join to form additional rings, p is 1 or 2, and q is 1 or 2;

$R^1$ and $R^{11}$ are independently selected from the group consisting of hydrocarbyls, substituted hydrocarbyls, and silyl groups (preferably alkyl, aryl, heteroaryl, and silyl groups);

$R^2$ and $R^{10}$ are each, independently, -E($R^{12}$)($R^{13}$)— with E being carbon, silicon, or germanium, and each $R^{12}$ and $R^{13}$ being independently selected from the group consisting of hydrogen, hydrocarbyl, and substituted hydrocarbyl, alkoxy, silyl, amino, aryloxy, halogen, and phosphino (preferably hydrogen, alkyl, aryl, alkoxy, silyl, amino, aryloxy, heteroaryl, halogen, and phosphino), $R^{12}$ and $R^{13}$ may be joined to each other or to $R^{14}$ or $R^{15}$ to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

$R^3$, $R^4$, and $R^5$ are independently selected from the group consisting of hydrogen, hydrocarbyls, substituted hydrocarbyls, alkoxy, aryloxy, halogen, amino, and silyl, (preferably hydrogen, alkyl, alkoxy, aryloxy, halogen, amino, silyl, and aryl), and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

L is an anionic leaving group, where the L groups may be the same or different and any two L groups may be linked to form a dianionic leaving group;

n is 1 or 2;

L' is a neutral Lewis base; and w is 0, 1, or 2.

In another preferred embodiment, Z is defined as an aryl so that the complex is represented by the Formula (II):

wherein:

$R^6$, $R^7$, $R^8$, and $R^9$ are independently selected from the group consisting of hydrogen, hydrocarbyls, substituted hydrocarbyls, alkoxy, halogen, amino, and silyl, and the pairs of positions, and wherein adjacent R groups ($R^6$ & $R^7$, and/or $R^7$ & $R^8$, and/or $R^8$ & $R^9$, and/or $R^9$ & $R^{10}$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L, w, n, $R^1$, $R^2$, $R^3$, $R^4$, $R^5$, $R^6$, $R^{10}$, and $R^{11}$ are as defined above.

In a more preferred embodiment, the complexes of this invention are represented by the Formula (III):

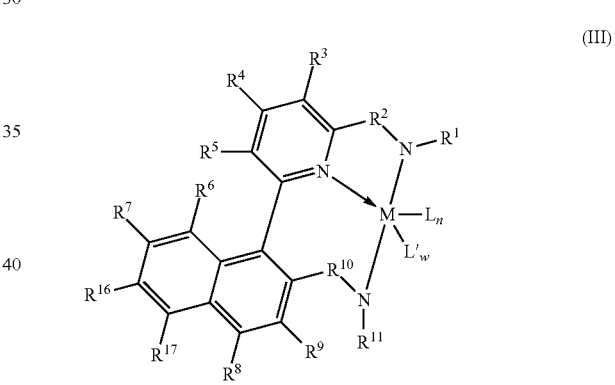

(III)

wherein:

$R^{16}$ and $R^{17}$ are independently selected from the group consisting of hydrogen, hydrocarbyls, substituted hydrocarbyls, alkoxy, halogen, amino, and silyl, and wherein adjacent R groups ($R^6$ & $R^7$ and/or $R^7$ & $R^{16}$ and/or $R^{16}$ & $R^{17}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, $R^1$, $R^2$, $R^3$, $R^4$, $R^5$, $R^6$, $R^7$, $R^8$, $R^9$, $R^{10}$, and $R^{11}$ are defined as above.

In any embodiment of Formula I, II or III described herein, M is preferably Ti, Zr, or Hf, preferably HF or Zr.

In any embodiment of Formula I, II, or III described herein, the R groups above ($R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$ and $R^{17}$) preferably contain up to 30 carbon atoms, preferably no more than 30 carbon atoms, especially from 2 to 20 carbon atoms.

In any embodiment of Formula I, II, or III described herein, preferably $R^1$, $R^2$, $R^3$, $R^4$, $R^5$, $R^6$, $R^7$, $R^8$, $R^9$, $R^{10}$, $R^{11}$, $R^{12}$, to $R^{13}$ contain up to 30 carbon atoms, especially from 2 to 20 carbon atoms.

In a preferred embodiment of the invention, $R^1$ is selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In any embodiment of Formula I, II, or III described herein, preferably $R^1$ and $R^{11}$ are independently selected from phenyl groups that are variously substituted with between zero to five substituents that include F, Cl, Br, I, $CF_3$, $NO_2$, alkoxy, dialkylamino, aryl, and alkyl groups with between one to ten carbons, such as methyl, ethyl, propyl, butyl, pentyl, hexyl, heptyl, octyl, nonyl, decyl, and isomers thereof.

In any embodiment of Formula I, II, or III described herein, preferably E is carbon, and $R^1$ and $R^{11}$ are independently selected from phenyl groups that are variously substituted with between zero to five substituents that include F, Cl, Br, I, $CF_3$, $NO_2$, alkoxy, dialkylamino, hydrocarbyl, and substituted hydrocarbyls, groups with from one to ten carbons.

In any embodiment of Formula I, II, or III described herein, preferably $R^1$ and $R^{11}$ are selected from aryl or alkyl groups containing from 6 to 30 carbon atoms, especially phenyl groups. It is preferred that $R^1$ and $R^{11}$ be chosen from aryl or alkyl groups and that $R^{12}$, $R^{13}$, $R^{14}$, and $R^{15}$, be independently chosen from hydrogen, alkyl, and aryl groups, such as phenyl. The phenyl groups may be alkyl substituted. The alkyl substituents may be straight chain alkyls, but include branched alkyls.

Preferably, each $R^1$ and $R^{11}$ is a substituted phenyl group with either one or both of the carbons adjacent to the carbon joined to the amido nitrogen being substituted with a group containing between one to ten carbons. Some specific examples would include $R^1$ and $R^{11}$ being chosen from a group including 2-methylphenyl, 2-isopropylphenyl, 2-ethylphenyl, 2,6-dimethylphenyl, mesityl, 2,6-diethylphenyl, and 2,6-diisopropylphenyl.

In any embodiment of Formula I, II, or III described herein, $R^2$ is preferably selected from moieties where E is carbon, especially a moiety —C($R^{12}$)($R^{13}$)— where $R^{12}$ is hydrogen and $R^{13}$ is an aryl group or a benzyl group (preferably a phenyl ring linked through an alkylene moiety such as methylene to the C atom). The phenyl group may then be substituted as discussed above. Useful $R^2$ groups include $CH_2$, $CMe_2$, $SiMe_2$, $SiEt_2$, $SiPr_2$, $SiBu_2$, $SiPh_2$, Si(aryl)$_2$, Si(alkyl)$_2$, CH(aryl), CH(Ph), CH(alkyl), and CH(2-isopropylphenyl).

In any embodiment of Formula I, II, or III described herein, $R^{10}$ is preferably selected from moieties where E is carbon, especially a moiety —C($R^{12}$)($R^{13}$)— where $R^{12}$ is hydrogen and $R^{13}$ is an aryl group or a benzyl group (preferably a phenyl ring linked through an alkylene moiety such as methylene to the C atom). The phenyl group may then be substituted as discussed above. Useful $R^{10}$ groups include $CH_2$, $CMe_2$, $SiMe_2$, $SiEt_2$, $SiPr_2$, $SiBu_2$, $SiPh_2$, Si(aryl)$_2$, Si(alkyl)$_2$, CH(aryl), CH(Ph), CH(alkyl), and CH(2-isopropylphenyl).

In any embodiment of Formula I, II or III described herein $R^{10}$ and $R^2$ are selected from $CH_2$, $CMe_2$, $SiMe_2$, $SiEt_2$, $SiPr_2$, $SiBu_2$, $SiPh_2$, Si(aryl)$_2$, Si(alkyl)$_2$, CH(aryl), CH(Ph), CH(alkyl), and CH(2-isopropylphenyl).

In any embodiment of Formula I, II, or III described herein, $R^3$, $R^4$, $R^5$, $R^6$, $R^7$, $R^8$, and $R^9$ may be hydrogen or alkyl from 1 to 4 carbon atoms. Preferably 0, 1, or 2 of $R^3$, $R^4$, $R^5$, $R^6$, $R^7$, $R^8$, and $R^9$ are alkyl substituents.

In any embodiment of Formula I, II, or III described herein, $R^3$, $R^4$, $R^5$, $R^6$, $R^7$, $R^8$, $R^9$, $R^{12}$, $R^{13}$, $R^{14}$, and $R^{15}$ are, independently, hydrogen, a $C_1$ to $C_{20}$ alkyl, preferably methyl, ethyl, propyl, butyl, pentyl, hexyl, heptyl, octyl, nonyl, decyl, undecyl, dodecyl, or an isomer thereof), or a $C_5$ to $C_{40}$ aryl group (preferably a $C_6$ to $C_{20}$ aryl group, preferably phenyl or substituted phenyl or an isomer thereof, preferably phenyl, 2-isopropylphenyl, or 2-tertbutylphenyl).

In any embodiment of Formula I, II, or III described herein, preferably L is selected from halide, alkyl, aryl, alkoxy, amido, hydrido, phenoxy, hydroxy, silyl, allyl, alkenyl, and alkynyl.

In any embodiment of Formula I, II, or III described herein, preferably L' is selected from ethers, thio-ethers, amines, nitriles, imines, pyridines, and phosphines, preferably ethers.

The pyridyldiamido-metal complex is coordinated at the metal center as a tridentate ligand through two amido donors and one pyridyl donor. The metal center, M or M*, is a transition metal from Group 4. While in its use as a catalyst, according to current theory, the metal center is preferably in its four valent state, it is possible to create compounds in which M has a reduced valency state and regains its formal valency state upon preparation of the catalyst system by contacting with an activator (e.g., the organoaluminum treated layered silicate). Preferably, in addition to the pyridyldiamido ligand, the metal M or M* is also coordinated to n number of anionic ligands, with n being from 1 or 2. The anionic donors are typically halide or alkyl, but a wide range of other anionic groups are possible, including some that are covalently linked together to form molecules that could be considered dianionic, such as oxalate. For certain complexes, it is likely that up to three neutral Lewis bases (L or L*), typically ethers, could also be coordinated to the metal center. In a preferred embodiment, w is 0, 1, or 2.

In a preferred embodiment, L or L* may be selected from halide, alkyl, aryl, alkoxy, amido, hydrido, phenoxy, hydroxy, silyl, allyl, alkenyl, and alkynyl. The selection of the leaving groups depends on the synthesis route adopted for arriving at the complex and may be changed by additional reactions to suit the later activation method in polymerization. For example, a preferred L or L* group is alkyl when using non-coordinating anions such as N,N-dimethylanilinium tetrakis(pentafluorophenyl)-borate or tris(pentafluorophenyl)borane. In another embodiment, two L or two L* groups may be linked to form a dianionic leaving group, for example oxalate.

In a preferred embodiment, X may be selected from halide, alkyl, aryl, alkoxy, amido, hydrido, phenoxy, hydroxy, silyl, allyl, alkenyl, and alkynyl. The selection of the leaving groups depends on the synthesis route adopted for arriving at the complex and may be changed by additional reactions to suit the later activation method in polymerization. For example, a preferred X is alkyl when using non-coordinating anions such as N,N-dimethylanilinium tetrakis(pentafluorophenyl)-borate or tris(pentafluorophenyl) borane. In another embodiment, two X groups may be linked to form a dianionic leaving group, for example oxalate.

In another embodiment, each L* is independently selected from the group consisting of ethers, thio-ethers, amines, nitriles, imines, pyridines, and phosphines, preferably ethers.

Preferred compounds useful in catalyst mixtures herein include the pyridyldiamide complexes A through D in FIG. 1.

Complex Synthesis

A typical synthesis of the pyridyldiamido complexes is reaction of the neutral pyridyldiamine ligand with a metalloamide, such as $Hf(NMe_2)_2Cl_2$(1,2-dimethoxyethane), $Zr(NMe_2)_4$, $Zr(NEt_2)_4$, $Hf(NMe_2)_4$, and $Hf(NEt_2)_4$. Another synthesis route for the pyridyldiamido complexes is the reaction of the neutral pyridyldiamine ligand precursors with an organolithium reagent to form the dilithio pyridyldiamido derivative followed by reaction of this species with either a transition metal salt, including $ZrC_{l4}$, $HfC_{l4}$, $ZrCl_4$(1,2-dimethoxyethane), $HfCl_4$(1,2-dimethoxyethane), $ZrCl_4$(tetrahydrofuran)$_2$, $HfCl_4$(tetrahydrofuran)$_2$, $ZrBn_2Cl_2(OEt_2)$, $HfBn_2Cl_2(OEt_2)$. Another preferred synthesis route for the pyridyldiamido complexes is reaction of the neutral pyridyldiamine ligands with an organometallic reactant, such as $ZrBn_4$, $ZrBn_2Cl_2(OEt_2)$, $Zr(CH_2SiMe_3)_4$, $Zr(CH_2CMe_3)_4$, $HfBn_4$, $HfBn_2Cl_2(OEt_2)$, $Hf(CH_2SiMe_3)_4$, $Hf(CH_2CMe_3)_4$.

The general synthetic routes used for the complexes presented herein are described in US 2014/0221587A1 and US 2015/0141601A1.

Catalyst Systems

The term "catalyst system" includes transition metal complex/activator pair(s). When "catalyst system" is used to describe such pair(s) before activation, it means the unactivated catalyst complex (pre-catalyst) together with an activator (e.g., the organoalumimun treated layered silicate) and, optionally, a co-activator. When it is used to describe such a pair after activation, it means the activated complex and the activator or other charge-balancing moiety. The transition metal compound may be neutral, as in a pre-catalyst, or a charged species with a counter ion as in an activated catalyst system.

The complexes described herein may be used in combination with one or more support-activators (e.g., the organoalumimun treated layered silicates described herein, which act as both supports and activators) for olefin polymerization, such as for ethylene-based polymers or propylene-based polymers, including ethylene-octene polymerization.

In a preferred embodiment, this invention also relates to supported catalyst systems comprising: (i) at least one pyridyldiamido compound represented by Formula (I), (II), (III) as described above; (ii) a support comprising an agglomerate of organoaluminum (preferably alkylaluminum) treated layered silicate material and inorganic oxide; and (iii) optionally, a co-catalyst. The pyridyldiamido catalyst compound may be any of the compounds described above. The organoaluminum (preferably alkylaluminum) treated layered silicate and optional co-catalyst/scavenger are discussed below.

Typically, catalyst is present on the support at from 0.01 wt % to 1 wt %, preferably 0.1 to 0.5 wt % of Ti, Zr, or Hf, based upon the weight of the catalyst, any activator, and support.

Layered Silicates

This invention relates to catalyst systems comprising organoaluminum (such as alkyl aluminum) treated layered silicates. The layered silicate may be an ion exchange layered silicate.

Preferred ion-exchange layered silicates useful in the present invention are silicate compounds having a crystal structure wherein layers formed by strong ionic and covalent bonds are laminated in parallel with weak ionic bonding, and the ions contained between the layers are exchangeable. Most ion-exchange layered silicates naturally occur as the main component of clay minerals, but these ion-exchange layered silicates may be artificially synthesized materials. Preferred ion-exchange layered silicates useful in this invention include natural or synthetic montmorillonite, nontronite, beidellite, volkonskoite, laponite, hectorite, saponite, sauconite, stevensite, vermiculite, halloysite, aluminate oxides, bentonite, kaolinite, dickite, smectic clays, mica, magadiite, kenyaite, octosilicate, kanemite, makatite, attapulgite, sepiolite, zeolitic layered materials (such as ITQ-2, MCM-22, and ferrierite precursors) and mixtures thereof. In a preferred embodiment, the ion-exchange layered silicate is acidified (by contacting with an acid, such as sulfuric acid, hydrochloric acid, a carboxylic acid, an amino acid, or the like) or otherwise chemically treated (see U.S. Pat. No. 6,559,090, especially columns 25 to 27).

Preferred ion-exchange layered silicates useful in this invention include those having a 1:1 type structure or a 2:1 type structure. Examples of the ion-exchange layered silicate include layered silicates having a 1:1 type structure or a 2:1 type structure as described in "Clay Mineralogy" written by R. E. Grim (published by McGraw Hill in 1968) and "Chemistry of Clays and Clay Minerals" written by A. C. Newman (published by John Wiley and Sons: New York in 1987). The 1:1 type structure is a structure formed by laminating 1:1 layered structures having one layer of tetrahedral sheet and one layer of octahedral sheet combined as described in the above literature "Clay Mineralogy", and the 2:1 type structure is a structure formed by laminating 2:1 layered structures having one layer of octahedral sheet sandwiched between two layers of tetrahedral sheets. Examples of ion-exchange layered silicate comprising the 1:1 layer as the main constituting layer include kaolin group silicates such as dickite, nacrite, kaolinite, metahalloysite, halloysite or the like, and serpentine group silicates such as chrysotile, lizardite, antigorite, or the like. Examples of ion-exchange layered silicate comprising the 2:1 layer as the main constituting layer include smectite group silicates, such as montmorillonite, beidellite, nontronite, saponite, hectorite, stephensite, or the like, vermiculite group silicates such as vermiculite or the like, mica group silicates such as mica, illite, sericite, glauconite, or the like, and attapulgite, sepiolite, palygorskite, bentonite, pyrophyllite, talc, chlorites, and the like. Mixed layer silicates are also included. In some embodiments, an ion-exchange layered silicate having the 2:1 type structure is preferable. In another preferred embodiment, a smectite group silicate is used and in a particularly preferable example, the ion exchange layered silicate comprises montmorillonite.

Kinds of exchangeable cations (a cation contained between layers of an ion-exchange layered silicate) are not specially limited, but the cations are preferably a metal of Group 1 of the Periodic Table of the Elements such as sodium or potassium, a metal of Group 2 of the Periodic Table of the Elements such as calcium or magnesium, or a transition metal such as iron, cobalt, copper, nickel, zinc, ruthenium, rhodium, palladium, silver, iridium, platinum, or gold, which are relatively easily available as industrial starting materials.

In some embodiments, the ion-exchange layered silicate has an average particle size of from 0.02 to 200 microns, preferably from 0.25 to 100 microns, even more preferably 0.5 to 50 microns. In some embodiments, the ion exchange layered silicates have a bi-modal distribution, or even multi-modal distribution, of particle sizes. (Particle size, also referred to as "average particle size," "particle diameter," or "average particle diameter," is determined using a Mastersizer™ 3000 (range of 1 to 3500 μm) available from Malvern Instruments, Ltd., Worcestershire, England.)

The ion exchange layered silicate may be used in a dry state and/or may be used also in a slurry state in liquid and is preferably used as a free flowing powder after spray drying. Also, the shape of the ion-exchange layered silicate is not specially limited, and the shape may be a naturally occurring shape, an artificially synthesized shape or a shape of an ion-exchange layered silicate obtained after subjected to pulverizing, granulating, and classifying.

The ion exchange layered silicates are combined with other support type compounds, such as inorganic oxides, and used in this invention. In another embodiment, the ion-exchange layered silicate may be utilized as part of an agglomerate (as described in US 2003/0096698 and U.S. Pat. No. 6,559,090, which are herein fully incorporated by reference), with at least one inorganic oxide component, such as $SiO_2$, $Al_2O_3$, MgO, $AlPO_4$, $TiO_2$, $ZrO_2$, or $Cr_2O_3$. For example, an ion exchange layered silicate, such as montmorillonite, may be combined with inorganic oxide, such as sodium silicate, and then combined with the organoaluminum compound (preferably, an alkylaluminum compound).

In a preferred embodiment of the invention, the organo-alumimum treated layered silica support is a composite in the form of agglomerates of at least two components, namely, (A) at least one inorganic oxide component, such as silica or a silicon oxide, such as sodium silicate, and (B) at least one layered silicate component, typically an ion exchange layered silicate such as those described herein, particularly montmorillonite, particularly an ion exchange montmorillonite such as K10 or KSF. The agglomerates are an intimate admixture of Components-A and -B.

The inorganic oxide Component-A of the agglomerate particles is derived from porous inorganic oxides including $SiO_2$, $Al_2O_3$, $AlPO_4$, MgO, $TiO_2$, $ZrO_2$; $Na_2SiO_3$; and or mixed inorganic oxides including $SiO_2.Al_2O_3$, $MgO.SiO_2Al_2O_3$, $SiO_2.TiO_2.Al_2O_3$, $SiO_2.Cr_2O_3.TiO_2$ and $SiO_2Cr_2O_3.TiO_2$. Particularly useful inorganic oxides include Group 1 and 2 silicates, such as sodium silicate, potassium silicate, calcium silicate, magnesium silicate, and mixtures thereof.

Component-B of the agglomerate particles is derived from layered silicate materials, particularly ion-exchange layered silicates, such as those described herein. The layered silicate derived materials in Component-B can be amorphous or crystalline, preferably amorphous, and can be clay or clay minerals. Preferably, the layered silicate is a smectic clay. Particularly useful ion-exchange layered silicates include magnesia, titania, montmorillonite (EP 0 511 665 B1 and U.S. Pat. No. 5,965,477), phyllosilicate, zeolites, talc, clays (U.S. Pat. No. 6,034,187), and the like. The ion-exchange layered silicates can be acid treated.

In a useful embodiment, the ion-exchange layered silicates have an acidic pH, such as less than 7, alternately from 1 to 6, alternately from 3 to 5.

The agglomerates comprising Component-A and Component-B, preferably contain 10 to 99.5 wt %, preferably 25 to 95 wt %, preferably 90 to 99 wt %, preferably 95 to 97 wt % of Component-B and 90 to 0.5 wt %, preferably 5 to 75 wt %, preferably 1 to 10 wt %, preferably 3 to 5 wt % of Component-A based upon the weight of Component-A and Component-B.

Alternately, the agglomerates comprising Component-A and Component-B, preferably contain 80 to 99.5 wt %, preferably 90 to 99 wt % of Component-B and preferably 20 to 0.5 wt %, preferably 10 to 1 wt % of Component-A based upon the weight of Component-A and Component-B.

The weight ratio of Component-A to Component-B in the agglomerate can vary typically from about 0.25:100 to about 20:100, preferably from about 0.5:100 to about 10:100, most preferably from about 1:100 to about 5:100. The agglomerates of the present invention preferably will exhibit a higher macropore content than the constituent particles as a result of the interparticle voids between the constituent particles. However, such interparticle voids may be partially or completely filled with the smaller secondary particles in other embodiments of the spray dried agglomerates. The agglomeration of Components-A and -B may be carried out in accordance with the methods well known to the art, in particular, by such methods as spray drying.

The agglomerates typically have an average particle size of 1 to 1000 microns, preferably 50 to 500 microns, preferably 20 to 180 microns, preferably 75 to 200 microns. In some embodiments the agglomerates have a bi-modal distribution, or even multi-modal distribution, of particle sizes. Particle size, also referred to as "average particle size," "particle diameter," or "average particle diameter," is determined using a Mastersizer™ 3000 (range of 1 to 3500 pin) available from Malvern Instruments, Ltd., Worcestershire, England. Unless otherwise stated, particle size is determined at D50. D50 is the value of the particle diameter at 50% in the cumulative distribution. For example, if D50=5.8 um, then 50% of the particles in the sample are equal to or larger than 5.8 um and 50% are smaller than 5.8 um. (In contrast, if D90=5.8 um, then 10% of the particles in the sample are larger than 5.8 um and 90% are smaller than 5.8 um.)

The agglomerates typically have a surface area of 100 to 300 $m^2/g$, preferably 120 to 250 $m^2/g$, preferably 130 to 220 $m^2/g$, alternately 100 to 200 $m^2/g$ (as measured by BET).

The agglomerates typically have a pore volume of 0.1 to 0.5 cc/g, preferably 0.1 to 0.4 cc/g, preferably 0.15 to 0.35 cc/g (as measured by BET). Pore volume may be determined by the BJH method, but in event of conflict between the results of the two methods, the BET method shall be used. The BET method shall be used for the claims to this invention.

The agglomerates typically have a spheroidal shape.

For purposes herein, the surface area (SA, also called the specific surface area or BET surface area), pore volume (PV) of support materials are determined by the Brunauer-Emmett-Teller (BET) method using adsorption-desorption of nitrogen (temperature of liquid nitrogen: 77 K) with a MICROMERITICS TRISTAR II 3020 instrument after degassing of the powders for 4 hrs. at 350° C. More information regarding the method can be found, for example, in "*Characterization of Porous Solids and Powders: Surface Area, Pore Size and Density,*" S. Lowell et al., Springer, 2004, PV refers to the total PV, including both internal and external PV.

For purposes herein, porosity of particles refers to the volume fraction or percentage of pore volume within a particle or body comprising a skeleton or matrix of the particle material, on the basis of the overall volume of the particle or body with respect to total volume. The porosity and median pore diameter of particles are determined using mercury intrusion porosimetry. Mercury intrusion porosimetry involves placing the sample in a penetrometer and surrounding the sample with mercury. Mercury is a non-wetting liquid to most materials and resists entering voids, doing so only when pressure is applied. The pressure at which mercury enters a pore is inversely proportional to the size of the opening to the void. As mercury is forced to enter pores within the sample material, it is depleted from a capillary stem reservoir connected to the sample cup. The incremental volume depleted after each pressure change is determined by measuring the change in the capacity of the stem. This intrusion volume is recorded with the corresponding pressure.

The agglomerates are typically a free flowing powder, preferably the agglomerate is formed into free flowing particles that have a pourability of 60 seconds or less as determined using ASTM 1895D. By "free flowing" is meant that the particles will flow through a funnel and yield a pourability value according to ASTM 1895D; preferably, the pourability value is about 50 seconds or less, more preferably about 30 seconds or less, still more preferably about 10 seconds or less, more preferably about 5 seconds or less, still more preferably about 1 second or less, when determined according to ASTM 1895D.

The agglomerates typically comprise from 0.1 mmol to 1 mmol aluminum that is derived from the aluminum alkyl per gram of support. Determining the aluminum content derived from the aluminum alkyl is done by titration using $^1$H NMR.

Processing of a shape of an ion-exchange layered silicate by granulating, pulverizing, or classifying may be carried out before chemical treatment (that is, the ion-exchange layered silicate having a shape previously processed may be subjected to the chemical treatment), or an ion-exchange layered silicate may be subjected to processing of a shape after chemical treatment.

Processing may occur before or after chemical treatment with an organoaluminum compound, an inorganic oxide and/or combination with a polymerization catalyst, however a particularly preferred method comprises dispersing the inorganic oxide and the ion-exchange layered silicate in water, thereafter spray drying, then contacting the spray dried particles with an organoaluminum compound, and thereafter contacting with polymerization catalyst.

Examples of a granulation method used herein include a stirring granulation method, a spraying granulation method, a tumbling granulation method, a bricketing granulation method, a compacting granulation method, an extruding granulation method, a fluidized layer granulation method, an emulsifying granulation method, a suspending granulation method a press-molding granulation method, and the like, but the granulation method is not limited thereto. Preferable examples include a stirring granulation method, a spraying granulation method, a tumbling granulation method and a fluidizing granulation method, and particularly preferable examples include a stirring granulation method and a spraying granulation method.

When carrying out the spraying granulation method, examples of a dispersion medium used for a starting slurry include water or an organic solvent. Preferably, water is used as a dispersion medium. A concentration of the ion-exchange layered silicate in a starting material slurry for the spraying granulation method producing spherical particles is from 0.1 to 70%, preferably from 1 to 50 wt %, more preferably from 5 to 30 wt %, based upon the weight of the slurry. An entrance temperature of hot air used in the spraying granulation method producing sphere particles varies depending on a dispersion medium used, but it is typically 120 to 600° C., preferably 150 to 590° C., when water is used as a dispersion medium. Preferably the outlet temperature is from 80 to 260° C., preferably 100 to 200° C., preferably 120 to 180° C.

Also, in the granulation step, an organic material, an inorganic solvent, an inorganic salt, various binders, and the like, may be used. Examples of the binders include sugar, dextrose, corn syrup, gelatin, glue, carboxymethylcelluloses, polyvinyl alcohol, water-glass, magnesium chloride, aluminum sulfate, aluminum chloride, magnesium sulfate, alcohols, glycol, starch, casein, latex, polyethylene glycol, polyethylene oxide, tar, pitch, alumina sol, gum arabic, sodium alginate, and the like.

Also, the pulverizing method is not specially limited, and it may be either dry type pulverization or wet type pulverization.

When the agglomerates are formed by spray drying, they can be further characterized in that typically at least 80, preferably at least 90, and most preferably at least 95 volume % of that fraction of the support agglomerate particles smaller that the D90 of the entire agglomerate particle size distribution possesses microspheroidal shape (i.e., morphology). Evaluation of the microspheroidal morphology is performed on that fraction of the particle size distribution of the support agglomerates, which is smaller than the D90, to avoid distortion of the results by a few large particle chunks, which because of their large volume, would constitute a non-representative sample of the agglomerate volume. The term "spheroidal" as used herein, means small particles of a generally rounded, but not necessarily spherical shape. This term is intended to distinguish from irregular jagged chunks and leaf or rod like configurations. "Spheroidal" is also intended to include polylobed configurations wherein the lobes are also generally rounded, although polylobed structures are uncommon when the agglomerate is made as described herein.

Each microspheroid is preferably composed of a loosely to densely packed composite of Components-A and -B typically with some, to substantially no, interstitial void spaces, and typically, substantially no visible boundaries, in an electron micrograph, between particles originally derived from Components-A and -B.

Bulk density is measured by quickly transferring (in 10 seconds) the sample powder into a graduated cylinder which overflows when exactly 100 cc is reached. No further powder is added at this point. The rate of powder addition prevents settling within the cylinder. The weight of the powder is divided by 100 cc to give the density.

Spray drying conditions are typically controlled in order to impart the desired target properties described above to the agglomerate. The most influential spray drying conditions are the pH of the aqueous slurry to be spray dried, as well as its dry solids content. By "dry solids content" as used herein is meant the weight of solids in the slurry after such solids have been dried at 175° C. for 3 hours, and then at 955° C. for 1 hour. Thus, dry solids content is used to quantify the weight of solid ingredients which exist in the slurry and to avoid inclusion of adsorbed water in such weight.

Typically, the pH of the slurry will be controlled or adjusted to be from about 2 to about 10 (e.g., 3 to 9, preferably from about 7 to about 9, such as about 4, and the dry solids content will be controlled or adjusted to be typically from about 10 to 40, preferably from 10 to 30, preferably from about 15 to about 25, and most preferably from about 18 to about 22 (e.g., 20) wt % based on the weight of the slurry and the dry weight of the gel. Control of the remaining variables in the spray drying process, such as the viscosity and temperature of the feed, surface tension of the feed, feed rate, the selection and operation of the atomizer (preferably an air atomizer is employed and, optionally, with the use of a pressure nozzle, the atomization energy applied, the manner in which air and spray are contacted, and the rate of drying, are well within the skill of the spray dry artisan once directed by the target properties sought to be imparted to the product produced by the spray drying. (See, for example, U.S. Pat. No. 4,131,452.)

In another embodiment, the pH of the slurry will be controlled or adjusted to be from about 3 to 7; the dry solids content will be controlled or adjusted to be typically from about 20 to 30 wt % based on the weight of the slurry and the dry weight of the gel; and the ratio of Component-A to Component-B will be in the range of 1:5 to 1:20.

In another embodiment, the pH of the slurry will be controlled or adjusted to be from about 3 to 7; the dry solids content will be controlled or adjusted to be typically from about 20 to 30 wt % based on the weight of the slurry and the dry weight of the gel; and the ratio of Component-A to Component-B will be in the range of 1:5 to 1:20 and a spray dried material having an average particle size of from 20 to 125 is obtained, preferably the particle is free flowing.

Product separation from the drying air follows completion of the spray drying stage when the dried product remains suspended in the air. Any convenient collection method can be employed, such as removal from the base of the spray dryer by the use of separation equipment.

To provide uniformity to the catalyst, as well as the resulting polymer, it is desirable to calcine the support to control any residual moisture present in the support.

When calcination is employed, it will typically be conducted at sufficient temperature and time to reduce the total volatiles to between about 0.1 and 8 wt. % where the total volatiles are determined by measuring the weight loss upon destructive calcination of the sample at 1000° C. However, the calcination temperature will also affect the interrelationship between the desired silica:clay ratio and the organoaluminum compound amount, and the activity of the catalyst as described hereinafter in more detail. Accordingly, calcination, when employed, will typically be conducted by heating the support to temperatures of typically from about 100 to about 800, preferably from about 150 to about 600, and most preferably from about 200 to about 300° C. for periods of typically from about 1 to about 600 (e.g., 50 to 600), and preferably from about 50 to about 300 minutes. The atmosphere of calcination can be air or an inert gas. Calcination should be conducted to avoid sintering.

Chemical Treatment of Ion-Exchange Layered Silicate

The chemical treatment of an ion-exchange layered silicate is carried out by bringing it in contact with an acid, a salt, an alkali, an oxidizing agent, a reducing agent or a treating agent containing a compound intercalatable between layers of an ion-exchange layered silicate. The intercalation means to introduce other material between layers of a layered material, and the material to be introduced is called a guest. Among these treatments, acid treatment or salt treatment is particularly preferable.

A common effect achieved by chemical treatment is to exchange an intercalation cation with other cations, and in addition to this effect, the following various effects can be achieved by various chemical treatments. For example, acid treatment removes impurities on the surface of silicate, and cations such as Al, Fe, Mg. or the like, in a crystal structure are eluted, thereby increasing the surface area. This treatment enhances the acid strength and acidity of the layered silicate.

Alkali treatment destroys a crystal structure of a clay mineral and changes a structure of the clay mineral. Also, intercalation or salt treatment forms an ion composite, a molecule composite, an organic derivative, or the like, and changes a surface area or a distance between layers. By using an ion-exchange reaction, an exchangeable intercalated cation between layers can be replaced by other large bulky ions, thereby producing a layered material having the distance between layers enlarged. Thus, the bulky ions have a function as a column supporting the layered structure, and are called pillars.

Examples of treating agents are illustrated below. In some embodiments, at least two kinds of members selected from the group consisting of acids, salts, alkalis, oxidizing agents, reducing agents and compounds intercalatable between layers of an ion-exchange layered silicate may be combined and used as treating agents. Also, acids, salts, alkalis, oxidizing agents, reducing agents and compounds intercalatable between layers of an ion-exchange layered silicate may be respectively used in a combination of two or more members. Among them, a combination of a salt treatment and an acid treatment is particularly preferable.

(A) Acids

Examples of acids useful in acid treatment, include hydrochloric acid, nitric acid, sulfuric acid, phosphoric acid, acetic acid, oxalic acid, and the like. Particularly, it is preferable to use an inorganic acid. Usually, the acid is used in the form of an acid aqueous solution. The acid used in the treatment may be a mixture of at least two kinds of acids. Usefully, the acid used herein is sulfuric acid.

(B) Salts

Examples of salts include salts formed from a cation selected from the group consisting of an organic cation, an inorganic cation and a metal ion and anion selected from the group consisting of an organic anion, an inorganic anion, and a halide ion. For example, preferable examples include compounds formed from a cation including at least one kind of atom selected from Group 1 to Group 14 of the Periodic Table of the Elements and at least one kind of an anion selected form an anion of halogen and an anion of an inorganic Bronsted acid and an organic Bronsted acid. Particularly preferable examples include compounds formed from an anion selected from the group consisting of an anion of halogen and an anion of an inorganic Bronsted acid.

Non-limiting examples of these salts include: LiCl, LiBr, $Li_2SO_4$, $Li_3(PO_4)$, $LiNO_3$, $Li(OOCCH_3)$, NaCl, NaBr, $Na_2SO_4$, $Na_3(PO_4)$, $NaNO_3$, $Na(OOCCH_3)$, KCl, KBr, $K_2SO_4$, $K_3(PO_4)$, $KNO_3$, $K(OOCCH_3)$, $MgCl_2$, $MgSO_4$, $Mg(NO_3)_2$, $CaCl_2$, $CaSO_4$, $Ca(NO_3)_2$, $Ca_3(C_6HSO_7)_2$, $Sc(OOCCH_3)_2$, $Sc_2(CO_3)_3$, $Sc_2(C_2O_4)_3$, $Sc(NO_3)_3$, $Sc_2(SO_4)_3$, $ScF_3$, $ScCl_3$, $ScBr_3$, $ScI_3$, $Y(OOCH_3)_3$, $Y(CH_3COCHCOCH_3)_3$, $Y_2(CO_3)_3$, $Y_2(C_2O_4)_3$, $Y(NO_3)_3$, $Y(ClO_4)_3$, $YPO_4$, $Y_2(SO_4)_3$, $YF_3$, $YCl_3$, $La(OOCH_3)_3$, $La(CH_3COCHCOCH_3)_3$, $La_2(CO_3)_3$, $La(NO_3)_3$, $La(ClO_4)_3$, $LaPO_4$, $La_2(SO_4)_3$, $LaF_3$, $LaCl_3$, $LaBr_3$, $LaI_3$, $Sm(OOCCH_3)_3$, $Sm(CH_3COCHCOCH_3)_3$, $Sm_2(CO_3)_3$, $Sm(NO_3)_3$, $Sm(ClO_4)_3$, $Sm_2(C_2O_4)_3$, $SmPO_4$, $Sm_2(SO_4)_3$, $SmF_3$, $SmCl_3$, $SmBr_3$, $SmI_3$, $Yb(OOCH_3)_3$, $Yb(NO_3)_3$, $Yb(C_1O_4)_3$, $Yb_2(C_2O_4)_3$, $Yb_2(SO_4)_3$, $YbF_3$, $YbCl_3$, $Ti(OOCCH_3)_4$, $Ti(CO_3)_2$, $Ti(NO_3)_4$, $Ti(SO_4)_2$, $TiF_4$, $TiCl_4$, $TiBr_4$, $TiI_4$, $Zr(OOCCH_3)_4$, $Zr(CO_3)_2$, $Zr(NO_3)_4$, $Zr(SO_4)_2$, $ZrF_4$, $ZrCl_4$, $ZrBr_4$, $ZrI_4$, $ZrOCl_2$, $ZrO(NO_3)_2$, $ZrO(ClO_4)_2$, $ZrO(SO_4)$, $Hf(OOCCH_3)_4$, $Hf(CO_3)_2$, $Hf(NO_3)_4$, $Hf(SO_4)_2$, $HfOCl_2$, $HfF_4$, $HfCl_4$, $HfBr_4$, $HfI_4$, $V(CH_3COCHCOCH_3)_3$, $VOSO_4$, $VOCl_3$, $VCl_3$, $VCl_4$, $VBr_3$, $Nb(CH_3COCHCOCH_3)_5$, $Nb_2(CO_3)_5$, $Nb(NO_3)_5$, $Nb_2(SO_4)_5$, $NbF_5$, $NbCl_5$, $NbBr_5$, $NbI_5$, $Ta(OOCCH_3)_5$, $Ta_2(CO_3)_5$, $Ta(NO_3)_5$, $Ta_2(SO_4)_5$, $TaF_5$, $TaCl_5$, $TaBr_5$, $Ta_5$, $Cr(OOCCH_3)_2OH$, $Cr(CH_3COCHCOCH_3)_3$, $Cr(NO_3)_3$, $Cr(ClO_4)_3$, $CrPO_4$, $Cr_2(SO_4)_3$, $CrO_2Cl_2$, $CrF_3$, $CrCl_3$, $CrBr_3$, $CrI_3$, $MoOCl_4$, $MoCl_3$, $MoCl_4$, $MoCl_5$, $MoF_6$, $MoI_2$, $WCl_4$, $WCl_6$, $WF_6$, $WBr_5$, $Mn(CH_3COCHCOCH_3)_2$, $MnCO_3$, $Mn(NO_3)_2$, MnO, $Mn(ClO_4)_2$, $MnF_2$, $MnCl_2$, $MnBr_2$, $MnI_2$, $FeCO_3$, $Fe(NO_3)_3$, $Fe(ClO_4)_3$, $FePO_4$, $FeSO_4$, $Fe_2(SO_4)_3$, $FeF_3$, $FeCl_3$, $FeBr_3$, $FeI_3$, $FeC_6H_5O_7$, $Co(OOCCH_3)_2$, $Co(CH_3COCHCOCH_3)_3$, $CoCO_3$, $Co(NO_3)_2$, $CoC_2O_4$, $Co(ClO_4)_2$, $Co_3(PO_4)_2$, $CoSO_4$, $CoF_2$, $CoCl_2$, $CoBr_2$, $CoI_2$, $NiCO_3$, $Ni(NO_3)_2$, $NiC_2O_4$, $Ni(ClO_4)_2$, $NiSO_4$, $NiCl_2$, $NiBr_2$, $CuCl_2$, $CuBr_2$, $Cu(NO_3)_2$, $CuC_2O_4$, $Cu(ClO_4)_2$, $CuSO_4$, $Cu(OOCCH_3)_2$, $Zn(OOCCH_3)_2$, $Zn(CH_3COCHCOCH_3)_2$, $ZnCO_3$, $Zn(NO_3)_2$, $Zn(ClO_4)_2$, $Zn_3(PO_4)_2$, $ZnSO_4$, $ZnF_2$, $ZnCl_2$, $ZnBr_2$, $ZnI_2$, $AlF_3$, $AlCl_3$, $AlBr_3$, $AlI_3$, $Al_2(SO_4)_3$, $Al_2(C_2O_4)_3$, $Al(CH_3COCHCOCH_3)_3$, $Al(NO_3)_3$, $AlPO_4$, $GeCl_4$, $Sn(OOCCH_3)_4$, $Sn(SO_4)_2$, $SnF_4$, $SnCl_4$, and the like.

Examples of an organic cation include an ammonium compound such as tetraethylammonium, tetramethylammonium, benzyltrimethylammonium, trimethylammonium, triethylammonium, tripropylammonium, tributylammonium, dodecyl ammonium, N,N-dimethylanilinium, N,N-diethylanilinium, N,N-2,4,5-pentamethylanilinium, N,N-dimethyloctadecylammonium, octadecylammonium, N,N-dimethyl-p-n-butylanilinium, N,N-dimethyl-p-trimethylsilylanilinium, N,N-dimethyl-1-napthylanilinium, N,N-2-trimethylanilinium, 2,6-dimethylanilinium, or the like, a nitrogen-containing aromatic compound such as pyridinium, N-methylpyridinium, quinolinium, N-methylpiperidinium, 2,6-dimethylpyridinium, 2,2,6,6-tetramethylpiperidinium, or the like, an oxonium compound such as dimethyloxonium, diethyloxonium, diphenyloxonium, furanium, oxofuranium, or the like, a phosphonium compound such as triphenylphosphonium, tetraphenylphosphonium, trimesitylphosphonium, or the like, and a phosphorus-containing aromatic compound such as phosphabenzonium, phosphanaphthalenium or the like, but the organic cation is not limited thereto.

In a preferred embodiment, the ion-exchange layered silicate has been treated with one or more of tetraethylammonium, tetramethylammonium, benzyltrimethylammonium, trimethylammonium, triethylammonium, tripropylammonium, tributylammonium, dodecylammonium, N,N-dimethylanilinium, N,N-diethylanilinium, N,N-2,4,5-pentamethylanilinium, N,N-dimethyloctadecylammonium, octadecylammonium, N,N-dimethyl-p-n-butylanilinium, N,N-dimethyl-p-trimethylsilylanilinium, N,N-dimethyl-1-napthylanilinium, N,N-2-trimethylanilinium, 2,6-dimethylanilinium, pyridinium, quinolinium, N-methylpiperidinium, 2,6-dimethylpyridinium, 2,2,6,6-tetramethylpiperidinium, dimethyloxonium, diethyloxonium, diphenyloxonium, furanium, oxofuranium, tetraphenylphosphonium, phosphabenzonium, phosphanaphthalenium, hexafluorophosphate, tetrafluoroborate, and tetraphenylborate.

In addition to the above-illustrated anions, examples of other anions include an anion of a boron compound or a phosphorus compound such as hexafluorophosphate, tetrafluoroborate, tetraphenylborate, or the like, but the anion is not limited thereto.

These salts may be used alone or in a mixture of two or more. Further, they may be used in combination with acids, alkalis, oxidizing agents, reducing agents, compounds intercalatable between layers of an ion-exchange layered silicate, or the like. They may be combined with a treating agent to be added to the initiation or treatment, or they may be combined with a treating agent to be added during treatment.

(C) Alkalis

Examples of a treating agent used in alkali treatment include LiOH, NaOH, KOH, $Mg(OH)_2$, $Ca(OH)_2$, $Sr(OH)_2$, $Ba(OH)_2$, and the like. Since it is considered that the alkali treatment may damage the acidity of an ion-exchanged layered silicate, it is preferable to carry out acid treatment after achieving a structure change of a clay mineral by alkali treatment. However, even after the alkali treatment, if an acidity and an acid amount satisfy the above mentioned ranges, the effect of the present invention is not damaged. Examples of a preferable compound include LiOH, NaOH, KOH, $Mg(OH)_2$, or the like.

(D) Oxidizing Agents

Examples of an oxidizing agent include permanganates such as $HMnO_4$, $NaMnO_4$, $KMnO_4$ or the like, nitric acid compounds such as $HNO_3$, $N_2O_4$, $N_2O$, $Cu(NO_3)_2$, $Pb(NO_3)_2$, $AgNO_3$, $KNO_3$, $NH_4NO_3$, or the like, halogens such as $F_2$, $Cl_2$, $Br_2$, or $I_2$, peroxides such as $H_2O_2$, $Na_2O_2$, $BaO_2$, $(C_6H_5CO)_2O_2$, $K_2S_2O_8$, $K_2SO_5$, $HCO_3H$, $CH_3CO_3H$, $C_6H_5CO_3H$, $C_6H_4(COOH)CO_3H$, $CF_3CO_3H$ or the like, oxyacids such as MO, KClO, KBrO, $KClO_3$, $KBrO_3$, $KIO_3$, $HIO_4$, $KIO_4$, or the like, oxides such as $CeO_2$, $Ag_2O$, CuO, HgO, $PbO_2$, $Bi_2O_3$, $OsO_4$, $RuO_4$, $SeO_2$, $MnO_2$, $As_2O_5$, or the like, oxygens such as oxygen, ozone, or the like, hot concentrated sulfuric acid, a mixture of fuming sulfuric acid and concentrated nitric acid, nitrobenzene, iodoso compounds, and the like.

(E) Reducing Agents

Examples of a reducing agent include hydrogen and hydrogen compounds such as $H_2$, HI, $H_2S$, $LiAlH_4$, $NaBH_4$, or the like, sulfur compounds such as $SO_2$, $Na_2S$, or the like, alkali metals, alkaline earth metals, metals of Group 3 to Group 10 of the Periodic Table of the Elements or their alloys, metal salts of a low atomic valence state such as Fe(II), Sn(II), Ti(II), CO), or the like, CO, and the like.

(F) Intercalation Compounds

Examples of a guest compound intercalated into layers of an ion-exchange layered silicate include a cationic inorganic compound such as $TiCl_4$, $ZrCl_4$, or the like, a metal alcoholate such as $Ti(OR)_4$, $Zr(OR)_4$, $PO(OR)_3$, $B(OR)_3$, (R is an alkyl group or an aryl group) or the like, a metal hydroxide or carboxylate ion such as $[Al_{13}O_4(OH)_{24}]_7^+$, $[Zr_4(OH)_{14}]_2^+$, $[Fe_3O(OCOCH_3)_6]^+$, or the like, an organic compound such as ethylene glycol, glycerol, urea, hydrazine, or the like, and an organic cation such as an alkyl ammonium ion, or the like.

When intercalating these compounds, a polymerized material obtained by hydrolyzing a metal alcoholate such as $Si(OR)_4$, $Al(OR)_3$, $Ge(OR)_4$, or the like, or a colloidal inorganic compound such as $SiO_2$, or the like, may also be present. Examples of a pillar include an oxide, or the like, formed by intercalating the above hydroxide ion between layers and then dehydrating by heat. A guest compound may be used as it is or may be used after newly adsorbing water or after heat-dehydrating. Also, the guest compound may be used alone or in a mixture of two or more of the above solids.

The above-mentioned various treating agents may be used as a treating agent solution by dissolving in an appropriate solvent, or it is possible to use a treating agent itself as a solvent. Examples of a usable solvent include water, alcohols, aliphatic hydrocarbons, aromatic hydrocarbons, esters, ethers, ketones, aldehydes, furans, amines, dimethylsulfoxide, dimethylformamide, carbon disulfide, nitrobenzene, pyridines, or their halides. A concentration of a treating agent in a treating agent solution is preferably from 0.1 to 100 wt %, more preferably from 5 to 50 wt. %. If the treating agent concentration is within these ranges, a time required for treatment becomes shorter and an efficient production is possible.

Chemical Treatment Protocol
Acid Treatment

An acid treatment removes impurities on the surface or ion-exchanges a cation present between layers, and in addition to this function, the acid treatment elutes a part or whole of cations such as Al, Fe, Mg, or the like, in a crystal structure. Examples of acids used in acid treatment include hydrochloric acid, nitric acid, sulfuric acid, phosphoric acid, acetic acid, oxalic acid, and the like. Particularly, it is preferable to use an inorganic acid. The acid is typically used in the form of an acid aqueous solution. The acid used in the treatment may be a mixture of at least two kinds of acids. Usefully, the acid used herein is sulfuric acid.

A particular embodiment of the present invention is to carry out a treatment with an acid having a specific concentration. Any concentration of acid may be used, however higher acid concentrations (and higher temperatures) are more efficient. In particular using an acid concentration of more than 5 wt % (based upon the weight of the acid, any liquid diluent or solvent and the ion exchange layered silicate present), preferably more than 10 wt %, more preferably more than 15 wt % has been found to be effective. In a preferred embodiment, the treatment is performed at temperatures of more than 50° C., preferably more than 70° C., more preferably at more than 90° C. The treatment preferably is allowed to react for 5 minutes to 10 hours, more preferably 30 minutes to 8 hours, more preferably 1 to 6 hours. In a particularly preferred embodiment, the treatment occurs at 90° C. or more for 2 to 6 hours using an acid concentration of more than 15 wt %. In another particularly preferred embodiment, the treatment occurs at 100° C. or more for 2 to 4 hours using an acid concentration of more than 15 wt %.

Generally, it is known that by subjecting the silicate to acid treatment, impurities on the surface are removed and cations such as Al, Fe, Mg, or the like, in a crystal structure are eluted, thereby increasing the surface area. Thus, in accordance with the progress of acid treatment, it is considered that the surface area and a pore volume are increased. However, in case of such concentrated acid treatment as carried out in the present invention, a surface area value of a silicate treated by the concentrated acid treatment employing such an acid concentration as defined as above is rather smaller than a surface area of a silicate treated by an acid treatment employing a lower acid concentration to have the same substituting components eluted. This fact means that a pore size of the silicate becomes larger. It is expected that this change achieves an effect of easily moving a material between an outer part and an inner part of a catalyst. Thus, a silicate treated by an acid having a high concentration provides a larger pore size, and it is expected that mass transport (of a metallocene complex, a monomer, an organoaluminum compound, a heterocyclic organic compound or the like) becomes easy in the inside of a catalyst or constituting particles in the same manner as in the outside. Accordingly, a catalyst prepared from the silicate of the present invention has active sites more uniformly dispersed, and it is considered that local heat generation on the catalyst is inhibited as compared with a conventional catalyst. Particularly, when producing an easily meltable or soluble polymer, e.g., in a case of low melting point random polymerization of a propylene type monomer, it is possible to carry out polymerization at a high activity and in a state of maintaining dispersed particles, which could not be conventionally achieved. After appropriate acid treatment the ion-exchange layered silicate will, preferably, have a surface area in the range of 100 to 450 $m^2/g$, preferably 150 to 400 $m^2/g$, more preferably 200 to 350 $m^2/g$.

An acid used for the concentrated acid treatment may be the same as those used in an ordinary acid treatment, but is preferably sulfuric acid, nitric acid or hydrochloric acid more preferably sulfuric acid.

Salt Treatment

Further, in the present invention, one may carry out a salt treatment. The salt treatment means a treatment carried out for the purpose of exchanging cations in an ion-exchange layered silicate. The treating conditions with a salt are not specially limited, but it is preferable to carry out the salt treatment under conditions of a salt concentration of from 0.1 to 50 wt %, a treating temperature of from room temperature to a boiling point and a treating time of from 5 minutes to 24 hours in such a manner as to elute at least a part of the materials constituting an ion-exchange layered silicate. Also, the salt may be used in an organic solvent such as toluene, n-heptane, ethanol, or the like, or may be used in the absence of a solvent if it is liquid-like at the treating temperature, but it is, preferably, used as an aqueous solution. However, depending on a kind of a salt employed, the salt treatment achieves an effect similar to an acid treatment.

In the present invention, it is preferable to ion exchange at least 40%, preferably at least 60% of ion exchangeable cations of Group 1 metals contained in an ion-exchange layered silicate with cations dissociated from the salts as described above. After carrying out the above chemical treatment, it is preferable to remove ions eluted from the treatment and an excess amount of a treating agent. For this operation, water or an organic solvent is generally used. After dehydrating, drying is carried out generally at a drying temperature of from 100 to 800° C., preferably from 150 to 600° C.

Drying of Chemically Treated Ion-Exchange Layered Silicate

These ion-exchange layered silicates change their properties depending on a drying temperature employed even when their structures are not destroyed, and it is, therefore, preferable to change a drying temperature depending on their uses. The drying period is usually in a range of from 1 minute to 24 hours, preferably from 5 minutes to 6 hours, and a drying atmosphere is preferably dry air, dry nitrogen, dry argon, or carried out under reduced pressure. A drying method is not specially limited, but various methods may be employed.

In a preferred embodiment, ion-exchange layered silicates subjected to both acid and/or salt (or a combination thereof) chemical treatments described above, have one or more of the following features (as outlined in U.S. Pat. No. 6,531,552 B2 and US 2003/0027950 A1), which is fully incorporated herein by reference):

(1) an amount of acid sites having a pKa of −8.2 or less of 0.05 mmol/g (where the amount is equivalent to the mmol/g of 2,6-dimethylpyridine consumed for neutralization), (2) performance that in desorption isotherm by nitrogen adsorption-desorption method, a ratio of a remaining adsorption amount (b) at a relative pressure P/Po=0.85 to an adsorption amount (a) at a relative pressure P/Po=1 satisfies the formula, (b)/(a)≥0.8, (3) performance that in adsorption isotherm and desorption isotherm by nitrogen adsorption-desorption method, a difference between a remaining adsorption amount (b) at a relative pressure P/Po=0.85 and an adsorption amount (c) in adsorption isotherm at a relative pressure P/Po=0.85 satisfies the formula, (b)−(c)>25 (cc/g), (4) a pore size distribution curve calculated from the desorption isotherm by nitrogen adsorption-desorption method, a pore diameter $D_m$ showing a maximum peak intensity $D_{VM}$ from 60 to 200 Å, (5) in a pore size distribution curve calculated from desorption isotherm by nitrogen adsorption-desorption method, a pore diameter $D_{m1/2}$ (Å) on the smaller pore size side corresponding to a ½ peak intensity of the maximum peak intensity $D_{VM}$ has a relation of $D_{m1/2}/D_m$ of at least 0.65 and less than 1, provided that the largest value is employed when there are a plurality of $D_{m1/2}$ values, and or (6) an average crushing strength of at least 3 MPa as measured by a minute compression tester.

(1) Acid Strength/Acid Site Density

The term "acid" used herein is one category classifying a material, and is defined as a material of Bronsted acid or Lewis acid. Also, the term "acid site" is defined as a constituting unit of a material exhibiting a property as an acid, and for the present invention, its amount is analyzed by the method described in U.S. Pat. No. 6,531,552 B2, which is fully incorporated herein by reference. When a chemically treated ion-exchange layered silicate is used as the support or carrier, the amount of a specific acidity is measured with regard to a silicate obtained after the chemical treatment.

In one embodiment, the ion-exchange layered silicate is acidic in nature as determined by titration methods as outlined in U.S. Pat. No. 6,531,552 B2, which is fully incorporated herein by reference.

In another embodiment, it is important to control an acidity and amount of acid sites, so as to afford an ion-exchange layered silicate that contains aluminum in an atomic ratio of Al/Si in a range of from 0.05 to 0.4, preferably from 0.05 to 0.25, more preferably from 0.07 to 0.23. The Al/Si atomic ratio is regarded as an index of acid treatment of the clay constituent. Furthermore, the chemically treated ion-exchange layered silicate having an acid site of at most −8.2 pKa, with the amount of acid site being equivalent to at least 0.05 mmol/g of 2,6-dimethylpyridine consumed for neutralization (as described in U.S. Pat. No. 6,531,552 B2). In general, the preferred amount of acid sites present in the ion-exchange layered silicate is 0.05 mmol/g or more and the amount of acid sites is preferably as high as possible.

(2) Performance in Nitrogen Adsorption/Desorption Isotherm

In the present invention, measurement of the adsorption and desorption isotherm by the nitrogen adsorption-desorption method are carried out in accordance with the Brunauer-Emmett-Teller (BET) method using adsorption-desorption of nitrogen (temperature of liquid nitrogen, 77 K) with a MICROMERITICS TRISTAR II 3020 instrument after degassing of the powders for 4 hrs at 350° C. More information regarding the method can be found, for example, in "*Characterization of Porous Solids and Powders: Surface Area, Pore Size and Density*", S. Lowell et al., Springer, 2004.

In general, the nitrogen adsorption-desorption isotherms for ion-exchange layered silicates exhibit an adsorption hysteresis. Detailed descriptions of adsorption-desorption fundamentals, including hysteresis, are discussed in "Adsorption Technology and Design" by Crittenden and Thomas and is incorporated by reference.

In one embodiment, the chemically treated ion-exchange layered silicate performance in the nitrogen adsorption-desorption isotherm exhibits a hysteresis.

In a preferred embodiment, the ion-exchange layered silicate exhibits the following performance in the nitrogen adsorption-desorption isotherm: that in desorption isotherm by the nitrogen adsorption-desorption method, a ratio of a remaining adsorption amount (b) at a relative pressure P/Po=0.85 to an adsorption amount (a) at a relative pressure P/Po=1 satisfies the formula, (b)/(a)≥0.8, (3) performance that in adsorption isotherm and desorption isotherm by nitrogen adsorption-desorption method, a difference between a remaining adsorption amount (b) at a relative pressure P/Po=0.85 and an adsorption amount (c) in adsorption isotherm at a relative pressure P/Po=0.85 satisfies the formula, (b)−(c)>25 (cc/g).

Examples of the analyzing apparatus include commercially available products such as Autosorb of Quantachrome Company or Omnisorp of Coulter Inc., or the like.

(3) Pore Size Distribution

The evaluation of the pore size distribution in the present invention employs the desorption isotherm. The desorption isotherm is a curve obtained while reducing the relative pressure. The desorption isotherm shows a lower relative pressure to the same desorbed gas amount as compared with adsorption isotherm, and, consequently, shows a lower free energy state, and is generally considered to be closer to a state of real thermodynamic stability.

In one embodiment, an ion-exchange layered silicate with any pore size and or any pore size distribution may be used.

In another embodiment, included in this invention is the preferred pore size distributions of the ion-exchange layered silicate as described in US 2003/0027950 A1 (which is fully incorporated herein by reference) and listed above in "features" 4 and 5. Where $D_m$ (from differential values of pore volumes) represents a pore size diameter showing a maximum peak intensity and is generally expressed as "most frequently appearing pore diameter", $D_{VM}$ represents a maximum peak intensity and $D_{m1/2}$ represents a pore size diameter on the smaller diameter side corresponding to a point, the peak intensity of which is ½ of the maximum peak intensity. A pore diameter $D_{m1/2}$ is present, at least one respectively, on both sides of $D_m$, i.e., on the larger diameter side of $D_m$ and on the smaller diameter side of $D_m$, but a value on the smaller diameter side is taken as the $D_{m1/2}$ value in the present invention. Also, if there are a plurality of $D_{m1/2}$ values on the smaller diameter side, the largest value is employed for calculation. In one embodiment, the $D_{m1/2}/D_m$ can range from 0.1 to 0.9. In another embodiment, a $D_{m1/2}/D_m$ value is preferably at least 0.68, more preferably at least 0.70. Furthermore, a pore size distribution curve calculated from desorption isotherm by the nitrogen adsorption-desorption method, a pore diameter $D_{m1/3}$ (Å) on the smaller pore size side corresponding to a ⅓ peak intensity of the maximum peak intensity $D_{vm}$ has a relation of $D_{m1/3}/D_m$ of at least 0.55 and less than 1, provided that the largest value is employed when there are a plurality of $D_{m1/3}$ values. In an analogous manner as $D_{m1/2}$, a pore diameter $D_{m1/3}$ value is present respectively on both sides of $D_m$, i.e., at least one on the larger diameter side of $D_m$ and at least one on the smaller diameter side of D, but a value on the smaller diameter side is defined as $D_{m1/3}$. Also, when there are a plurality of $D_{m1/3}$ values on the smaller diameter side, the largest value is employed for calculation. A $D_{m1/3}/D_m$ value is, preferably, at least 0.56, more preferably at least 0.57. If the $D_{m1/3}/D_m$ value is less than 0.56, a considerable amount of smaller diameter pores are present, which is not preferred.

Moreover, the pore size distribution calculated for desorption isotherm by the nitrogen adsorption-desorption method is a substantially unimodal peak. That is, there is not present a second peak, and if it is present, its intensity is at most 50%, preferably at most 40%, particularly at most 30% of a maximum peak intensity $D_{VM}$.

Also, the pore size distribution curve calculated from desorption isotherm by the nitrogen adsorption-desorption method, wherein a peak intensity at a pore diameter of 50 Å is defined as $D_{V50A}$, $D_{V50A}/D_{VM}$ is at least 0.01 and at most 0.40, preferably at least 0.03 and at most 0.38, more preferably at least 0.05 and at most 0.36. If the $D_{V50A}/D_{VM}$ value exceeds 0.38, a considerable amount of smaller diameter pores are contained.

Thus, an ion-exchange layered silicate may have a predetermined pore size, but its pore size is sufficiently large to accept a metallocene complex, an activator, an organoaluminum compound, and a monomer. Accordingly, these compounds participating in the reaction easily enter into pores in respective stages of formation of a catalyst, activation, prepolymerization and polymerization, and complexes are highly dispersed in carriers, and consequently metallocene catalyst active sites are thought to be uniformly formed. In a preferred embodiment, the ion exchange layered silicate has a pore size that is sufficiently large enough that the catalyst compound, the organoaluminum and activator compounds may freely enter and diffuse evenly within the particle. Preferred pore sizes include 40 Angstroms to 500 Angstroms, preferably 50 Angstroms to 300 Angstroms, more preferably 70 to 200 Angstroms.

(4) Carrier Strength

In one embodiment, the spray dried agglomerate has a compression fracture strength (also called average crushing strength) as measured by a minute compression tester. Preferably, the ion exchange layered silicate has a compression fracture strength of 3 to 20 MPa. Preferably, the average crushing strength is at least 5 MPa, more preferably at least 7 MPa. In addition, the upper limit of the ion-exchange layered silicate strength is, preferably, an average crushing strength of at most 20 MPa, more preferably at most 18 MPa.

Organoaluminum Compound

In the present invention ion-exchange layered silicate is preferably contacted with an organoaluminum compound, optionally, before treatment with the catalyst compound(s).

In one embodiment, preferred organoaluminum compounds described above are represented by the Formula:

$$AlR_3 \quad \text{(Formula I)}$$

wherein each R is independently a substituted or unsubstituted alkyl group and/or a substituted or unsubstituted aryl group. Preferably R is an alkyl group containing 1 to 30 carbon atoms. Preferred R groups include methyl, ethyl, propyl, butyl, pentyl, hexyl, heptyl, octyl, nonyl, decyl, undecyl, docecyl, aryl, and all isomers thereof.

In another embodiment, the preferred organoaluminum compounds include alkylaluminum compounds and/or alumoxanes, preferably methylalumoxane, modified methylalumoxane, or ethylalumoxane. The organoaluminum compounds include alkylaluminum compounds where the alkyl is a C1 to C40 linear, branched or cyclic alkyl, preferably a C1 to C12 linear or branched alkyl, preferably methyl, ethyl, propyl, butyl, isobutyl, n-butyl, isopentyl, pentyl, hexyl, heptyl, octyl, nonyl, decyl or dodecyl, even more preferably methyl, ethyl, propyl, butyl, isobutyl, n-butyl, or hexyl. Preferred organoaluminum compounds include those represented by the Formula:

$$AlR_nY_{3-n} \quad \text{(Formula II)}$$

wherein R is a hydrocarbon group having a carbon number of from 1 to 30, preferably 4 to 12, Y is hydrogen, halogen, an alkoxy group or a siloxy group, and n is 1, 2, or 3. Particularly preferred alkyl aluminum compounds useful in this invention include: trimethylaluminum, triethylaluminum, triisobutylaluminum, tri-n-hexylaluminum, tri-n-octylaluminum, tri-iso-octylaluminum, triphenylaluminum, and combinations thereof.

In another embodiment, the organoaluminum compounds also include combinations of organoaluminum compounds. For example, it is possible to use a mixture of organoaluminum compounds such as two or more of trimethylaluminum, triethylaluminum, triisobutylaluminum, tri-n-hexylaluminum, tri-n-octylaluminum, tri-iso-octylaluminum, and triphenylaluminum.

In another embodiment, the organoaluminum compound comprises one or more alumoxanes, which are generally oligomeric compounds, containing —Al(R)—O— or —Al(R)$_2$—O— subunits, where R is an alkyl group, preferably a C1 to C40 linear, branched or cyclic alkyl, preferably a C1 to C12 linear or branched alkyl, preferably methyl, ethyl, propyl, butyl, isobutyl, n-butyl, isopentyl, pentyl, hexyl, heptyl octyl, nonyl, decyl or dodecyl, even more preferably methyl, ethyl, propyl, butyl, isobutyl, n-butyl, or hexyl. Examples of alumoxanes include methylalumoxane (MAO), modified methylalumoxane (MMAO), ethylalumoxane, isobutylalumoxane, tetraethyldialumoxane and di-isobutylalumoxane. Alumoxanes may be produced by the hydrolysis of the respective trialkylaluminum compound. MMAO may be produced by the hydrolysis of trimethylaluminum and a higher trialkylaluminum such as triisobutylaluminum. There are a variety of methods for preparing alumoxane and modified alumoxanes, non-limiting examples of which are described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; 5,693,838; 5,731,253; 5,731,451; 5,744,656; 5,847,177; 5,854,166; 5,856,256; 5,939,346; EP 561 476; EP 279 586; EP 594 218; EP 586 665; WO 94/10180; and WO 99/15534; all of which are fully incorporated herein by reference.

Contact between an ion-exchange layered silicate and an organoaluminum compound can be carried out under an inert gas atmosphere such as nitrogen in a solvent of an inert hydrocarbon such as hexane, heptane, pentane, cyclohexane, benzene, toluene, xylene, or the like, and the solvent may be used alone or in a mixture of two or more.

An amount of an organoaluminum compound used is preferably from 0.01 to 1000 mmol, more preferably from 0.1 to 100 mmol, per 1 g of an ion-exchange layered silicate.

A concentration of an ion-exchange layered silicate in a solvent is preferably from 0.001 to 100 g/mL, more preferably form 0.01 to 10 g/mL, and a concentration of an organoaluminum compound is preferably from 0.001 to 100 mmol/mL, more preferably from 0.01 to 10 mmol.

Contacting may be carried out by dispersing an ion-exchange layered silicate in a solvent and then bringing an organoaluminum compound in contact therewith. Alternatively, contacting may be carried out by adding an organoaluminum compound to a solvent and then dispersing an ion-exchange layered silicate therein.

The contacting treatment is carried out generally at a temperature of from −50° C. to a boiling point of a solvent, preferably from 0° C. to a boiling point of a solvent. The contacting time is from 1 minute to 48 hours, preferably from 1 minute to 24 hours.

The order of contacting an organoaluminum compound with an ion-exchange layered silicate is not specially limited as far as the object of the present invention is achieved, but it is more effective to carry out the contacting treatment after chemical treatment of the silicate or preferably after drying carried out after the chemical treatment. It is also preferable to contact the organoaluminum compound with an ion-exchange layered silicate after spray drying the aqueous mixture of ion-exchange layered silicate and inorganic oxide.

Also, the order of contacting treatment step of an organoaluminum compound and an ion-exchange layered silicate and the granulation step of an ion-exchange layered silicate is not specially limited as far as the object of the present invention is achieved, but it is preferable to carry out the treatment with an organoaluminum compound after granulating the silicate.

Further, it is possible to enhance the effect of the present invention by combining the above-mentioned respective treatments. Thus, after controlling a particle size distribution and a carrier particle strength by granulating an ion-exchange layered silicate, a carrier obtained through the following Step 1 and Step 2 is used as a catalyst component for olefin polymerization.

Step 1: after granulating an ion-exchange layered silicate, the silicate is treated with an acid having an acid concentration as described above and is then contacted with an inorganic oxide and thereafter spray dried.

Step 2: after carrying out step 1, the silicate-inorganic oxide particle is treated with an organoaluminum compound, which is any organoaluminum compound from the discussion above.

Preferred treated organoaluminum layered silicates include: triethylaluminum treated montmorillonite, triisobutylaluminum treated montmorillonite, triethylaluminum treated montmorillonite/silicate, preferably where the montmorillonite/silicate is spray dried, tri-n-octylaluminum treated monmorillonite-silicate, preferably where the montmorillonite/silicate is spray dried, trimethylaluminum treated montmorillonite-silicate, preferably where the montmorillonite/silicate is spray dried, and the like.

Activators

The term "activator" is used herein to be any compound which can activate any one of the catalyst compounds described above by converting the neutral catalyst compound to a catalytically active metallocene compound cation. The organoaluminum treated layered silicates alone or in combination with inorganic oxides described herein function as an activator and thus allow polymerization without the use of traditional activators such as alumoxanes or non-coordinating anions. While traditional activators can also be used, it is useful if traditional activators are not present or if present are present at a ratio of activator metal (such as Al or B) to catalyst transition metal of less than 1:1, preferably less than 0.5 to 1, preferably less than 0.1:1.

Alumoxanes

Alumoxanes are generally oligomeric compounds containing —Al(R1)-O— sub-units, where R1 is an alkyl group. Examples of alumoxanes include methylalumoxane (MAO), modified methylalumoxane (MMAO), ethylalumoxane, isobutylalumoxane, and mixtures thereof. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. Another useful alumoxane is a modified methylalumoxane (MMAO) cocatalyst type 3A (commercially available from Akzo Chemicals, Inc. under the trade name Modified Methylalumoxane type 3A, covered under U.S. Pat. No. 5,041,584). In preferred embodiments of this invention, the activator is an alkylalumoxane, preferably methylalumoxane or isobutylalumoxane.

Preferably alumoxane is not present, or if present is present at an aluminum to transition metal ratio of less than 10:1, preferably 1:0, preferably less than 0.1:1.

Stoichiometric Activators

In alternate embodiments, the catalyst system of this invention further comprises one or more stoichiometric activators. A stoichiometric activator is a non-alumoxane compound which when combined in a reaction with the metallocene compound forms a catalytically active species at a molar ratio of stoichiometric activator to metallocene compound of 10:1 or less (preferably 5:1, more preferably 2:1, or even more preferably 1:1), such as a compound comprising a non-coordinating anion. Preferably, a stoichiometric activator is not present, or if present is present at a molar ratio of stoichiometric activator to catalyst compound of less than less than 1:1, preferably 0.1:1, preferably less than 0.01:1.

Stoichiometric activators may comprise an anion, preferably a non-coordinating anion. The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the metallocene cation in the sense of balancing its ionic charge at +1, yet retain sufficient lability to permit displacement by an ethylenically or acetylenically unsaturated monomer during polymerization.

The ionic stoichiometric activators are represented by the following Formula (1):

$$(Z)_d^+ A^{d-} \quad (1)$$

wherein $(Z)_d^+$ is the cation component and $A^{d-}$ is the anion component; where Z is (L-H) or a reducible Lewis Acid, L is a neutral Lewis base; H is hydrogen; (L-H)$^+$ is a Bronsted acid; $A^{d-}$ is a non-coordinating anion having the charge $^{d-}$; and d is an integer from 1 to 3.

When Z is (L-H) such that the cation component is (L-H)$_d^+$, the cation component may include Bronsted acids such as protonated Lewis bases capable of protonating a moiety, such as an alkyl or aryl, from the bulky ligand metallocene-containing transition metal catalyst precursor, resulting in a cationic transition metal species. Preferably, the activating cation (L-H)$_d^+$ is a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, $(Z)_d^+$ is preferably represented by the formula: $(Ar3C)^+$, where Ar is aryl or aryl substituted with a heteroatom, a C1 to C40 hydrocarbyl, or a substituted C1 to C40 hydrocarbyl, preferably $(Z)_d^+$ is represented by the formula: $(Ph3C)^+$, where Ph is phenyl or phenyl substituted with a heteroatom, a C1 to C40 hydrocarbyl, or a substituted C1 to C40 hydrocarbyl. In a preferred embodiment, the reducible Lewis acid is triphenyl carbenium.

The anion component $A^{d-}$ includes those having the formula $[M^{k+}Q_n]^{d-}$ wherein k is 1, 2, or 3; n is 1, 2, 3, 4, 5, or 6, preferably 3, 4, 5, or 6; (n−k)=d; M is an element selected from group 13 of the Periodic Table of the Elements, preferably boron or aluminum; and each Q is, independently, a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ components also include diboron compounds as disclosed in U.S. Pat. No. 5,447,895, which is fully incorporated herein by reference.

In other embodiments of this invention, the ionic stoichiometric activator may be an activator comprising expanded anions, represented by the Formula:

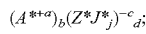

$$(A^{*+a})_b(Z^*J^*_j)^{-c}_d;$$

wherein A* is a cation having charge +a; Z* is an anion group of from 1 to 50 atoms not counting hydrogen atoms, further containing two or more Lewis base sites; J* independently each occurrence is a Lewis acid coordinated to at least one Lewis base site of Z*, and, optionally, two or more such J* groups may be joined together in a moiety having multiple Lewis acid functionality; J is a number from 2 to 12; and a, b, c, and d are integers from 1 to 3, with the proviso that a×b is equal to c×d. Examples of such activators comprising expandable anions may be found in U.S. Pat. No. 6,395,671, which is fully incorporated herein by reference.

Optional Co-Catalysts

In addition to the organoaluminum treated layered silicates, co-catalysts may be used. Aluminum alkyl or organometallic compounds which may be utilized as co-catalysts (or scavengers) include, for example, triethylaluminum, tri-isobutylaluminum, tri-n-hexylaluminum, tri-n-octylaluminum, diethyl aluminum chloride, dibutyl zinc, diethyl zinc, and the like.

Preferably, cocatalyst is present at a molar ratio of co-catalyst metal to transition metal of less than 100:1, preferably less than 50:1, preferably less than 15:1, preferably less than 10:1. In alternate embodiments, the cocatalyst is present at 0 wt %.

Other additives may also be used, as desired, such as one or more scavengers, promoters, modifiers, reducing agents, oxidizing agents, aluminum alkyls, or silanes.

Methods of Making the Catalyst System

Any method of combining the catalyst compound and support may be used. In some embodiments of this invention, the support material is slurried in a non-polar solvent and the resulting slurry is contacted with a solution of a catalyst. The slurry mixture may be heated to 0° C. to 70° C., preferably to 25° C. to 60° C., preferably at room temperature (25° C.). Contact times typically range from 0.5 hour to 24 hours, from 2 hours to 16 hours, or from 4 hours to 8 hours.

Suitable non-polar solvents are materials in which all of the reagents used herein, i.e., the activator, and the catalyst compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, alone or in combination, may also be employed.

The volatiles are removed to yield the supported catalyst system, preferably as a free-flowing solid.

In some embodiments, the weight ratio of the catalyst to the solid support material may be from 10:1 to 0.0001:1, from 1:1 to 0.001:1, or from 0.1:1 to 0.001:1. The weight ratio of the support material to the activator compound (such as an alumoxane) may range from 1:10 to 100:1, from 1:1 to 100:1, or from 1:1 to 10:1.

In some embodiments, the supported catalyst system is suspended in a paraffinic agent, such as mineral oil, for easy addition to a reactor system, for example a gas phase polymerization system.

Polymerization Processes

This invention also relates to polymerization processes comprising: contacting one or more olefins with the catalyst system of the present invention under polymerization conditions; and obtaining an olefin polymer.

The catalyst systems described herein are useful in the polymerization of all types of olefins. This includes polymerization processes which produce homopolymers, copolymers, terpolymers, and the like, as well as block copolymers and impact copolymers.

Monomers useful herein include substituted or unsubstituted $C_2$ to $C_{40}$ olefins, preferably $C_2$ to $C_{20}$ olefins, preferably $C_2$ to $C_{12}$ olefins, preferably ethylene, propylene, butene, pentene, hexene, heptene, octene, nonene, decene, undecene, dodecene, and isomers thereof, preferably alpha olefins. In a preferred embodiment of the invention, the monomer comprises propylene and optional comonomers comprising one or more ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In another preferred embodiment, the monomer comprises ethylene and optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Examples of $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene. Preferably, the polymerization or co-polymerization is carried out using olefins such as ethylene, propylene, 1-butene, 1-hexene, 4-methyl-1-pentene, and 1-octene, vinylcyclohexane, norbornene, and norbornadiene. In particular, propylene and ethylene are polymerized.

In some embodiments, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example, $C_4$ raffinate streams, and can therefore be substantially less expensive than pure 1-butene.

Polymerization processes of this invention can be carried out in any manner known in the art, in slurry, in suspension or in the gas phase, continuously or batchwise, or any combination thereof, in one or more steps. Slurry, and gas phase processes are preferred. A bulk homogeneous process is also useful. (A bulk process is defined to be a process where monomer concentration in all feeds to the reactor is 70 vol % or more.) Alternately, no solvent or diluent is present or added in the reaction medium (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles and at least 95 wt % of polymer products derived from the supported catalyst are in granular form as solid particles (not dissolved in the diluent).

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,453,471; U.S. Pat. No. 5,462,999; U.S. Pat. No. 5,616,661; and U.S. Pat. No. 5,668,228; all of which are fully incorporated herein by reference.)

In an embodiment of the invention, any catalyst/support combination described herein is used in the gas phase to produce olefin polymer, preferably an ethylene polymer.

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In an embodiment, a preferred polymerization technique useful in the invention is referred to as a particle form polymerization, or a slurry process where the temperature is kept below the temperature at which the polymer goes into solution. Such technique is well known in the art, and described in, for instance, U.S. Pat. No. 3,248,179; which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is fully incorporated herein by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. (In one embodiment 500 ppm or less of hydrogen is added, or 400 ppm or less or 300 ppm or less. In other embodiments at least 50 ppm of hydrogen is added, or 100 ppm or more, or 150 ppm or more.)

The reactor may be maintained at a pressure of 3620 kPa to 4309 kPa and at a temperature in the range of about 60° C. to about 104° C. depending on the desired polymer melting characteristics. Reaction heat is removed through the loop wall since much of the reactor is in the form of a double jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Useful chain transfer agents are typically alkylalumoxanes, a compound represented by the formula $AlR_3$, $ZnR_2$ (where each R is, independently, a $C_1$-$C_8$ aliphatic radical, preferably methyl, ethyl, propyl, butyl, penyl, hexyl, heptyl, octyl, or an isomer thereof) or a combination thereof, such as diethyl zinc, methylalumoxane, trimethylaluminum, triisobutylaluminum, trioctylaluminum, or a combination thereof.

Preferred polymerizations can be run at any temperature and/or pressure suitable to obtain the desired polymers. Typical temperatures and/or pressures include a temperature greater than 30° C., preferably greater than 50° C., preferably greater than 65° C., alternately less than 200° C., preferably less than 150° C., most preferably less than 140°

C., and at a pressure in the range of from 0.35 MPa to 10 MPa, preferably from 0.45 MPa to 6 MPa, or preferably from 0.5 MPa to 4 MPa.

In a typical polymerization, the run time of the reaction is up to 300 minutes, preferably in the range of from 5 to 250 minutes, or preferably from 10 to 120 minutes.

If necessary, hydrogen is added as a molecular-weight regulator and/or in order to increase the activity. The overall pressure in the polymerization system usually is at least 0.5 bar, preferably at least 2 bar, most preferred at least 5 bar. Pressures higher than 100 bar, e.g., higher than 80 bar and, in particular, higher than 64 bar, are usually not preferred. In some embodiments, hydrogen is present in the polymerization reactor at a partial pressure of from 0.001 to 100 psig (0.007 to 690 kPa), preferably from 0.001 to 50 psig (0.007 to 345 kPa), preferably from 0.01 to 25 psig (0.07 to 172 kPa), more preferably 0.1 to 10 psig (0.7 to 70 kPa).

In an alternate embodiment, the productivity of the catalyst is at least 50 gpolymer/g (cat)/hour, preferably 500 or more gpolymer/g (cat)/hour, preferably 5000 or more gpolymer/g (cat)/hour, preferably 50,000 or more gpolymer/g (cat)/hour.

In an alternate embodiment, the conversion of olefin monomer is at least 10%, based upon polymer yield and the weight of the monomer entering the reaction zone, preferably 20% or more, preferably 30% or more, preferably 50% or more, preferably 80% or more. A "reaction zone", also referred to as a "polymerization zone", is a vessel where polymerization takes place, for example, a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In preferred embodiments, the polymerization occurs in one, two, three, four, or more reaction zones.

In a preferred embodiment, the catalyst system used in the polymerization comprises no more than one catalyst compound.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Polyolefin Products

This invention also relates to polyolefins produced using the supported catalyst systems of this invention, particularly propylene and ethylene homopolymers and copolymers. In some embodiments, the invention relates to polyolefins produced using the catalyst systems of this invention, particularly polyethylene, having a density in the range of 0.916 to 0.955 g/cc, preferably in the range of from 0.920 to 0.950 g/cc, preferably 0.920 to 0.940 g/cc, preferably 0.920 to 0.935 g/cc.

In an embodiment of the invention, the process described herein produces a polyolefin composition "A", which has an Mw of 1,000,000 g/mol or more, and comprises less than 5 wt %, alternately from 0.01 to 5 wt % alternately 0.1 to 5 wt %, alternately 0.25 to 3 wt % or less, alternately 0.5 to 1 wt %) of the layered silicate (which may or may not be in contact with the organoaluminum compound or the inorganic oxide), based upon the weight of the polyolefin and the layered silicate, where polyolefin composition A has: 1) no diffraction peak resulting from interlamellar spacing of the organoaluminum treated layered silicate, and/or 2) a diffraction peak resulting from interlamellar spacing of the organoaluminum treated layered silicate of Z Angstroms or more, where Z=5X (alternately Z=10X, alternately Z=15X, alternately Z=20X), where X is the diffraction peak resulting from interlamellar spacing of the layered silicate used in the support before combination with the catalyst compound, as measured by wide angle x-ray scattering (WAXS).

SAXS/MAXS/WAXS measurements are performed using a SAXSLAB Ganesha 300XL. The wavelength of the incident X-rays is 1.54 Å using a micro-focus sealed CuKα source. The X-rays are focused using a Silicon crystal monochromator and beam size defined by a series of vertical and horizontal slits. This slit configuration defines a beam size of approximately 0.3 mm on the sample. The scattered X-rays are collected on a vacuum compatible Dectris Pilatus 300K 2D area detector. A pin diode measured the intensity after the sample and automatic corrections for sample transmission and beam intensity are done. The detector is moved inside the vacuum tube to positions of 0.091 m, 0.441 m and 1.041 m for WAXS, MAXS and SAXS respectively. This gives a q range of 0.07 to 0.25 Å$^{-1}$, corresponding to real-space dimensions of 2.2 to 897 Å. The estimated beam flux on the sample is $55 \times 10^6$, $31 \times 10^6$, and $4.5 \times 10^6$ photons/second for WAXS, MAXS, and SAXS configurations. The resulting 2D patterns are collected and collapsed into a 1D I(q) vs. q profile.

In embodiments, two, three, four, or more different layered silicate supports may be present in the support. Likewise, two, three, four, or more different layered silicate supports may be present in the polymer produced herein.

In a preferred embodiment, the process described herein produces propylene homopolymers or propylene copolymers, such as propylene-ethylene and/or propylene-α-olefin (preferably $C_2$, and/or $C_4$ to $C_{20}$) copolymers (such as propylene-hexene copolymers, propylene-octene copolymers, or propylene-ethylene-hexene terpolymers) having a Mw/Mn of greater than 1 to 40 (preferably greater than 1 to 5). Preferably, copolymers of propylene have from 0 wt % to 25 wt % (alternately from 0.5 wt % to 20 wt %, alternately from 1 wt % to 15 wt %, preferably from 3 wt % to 10 wt %, preferably less than 1 wt %, preferably 0 wt %) of one or more of $C_2$ or $C_4$ to $C_{40}$ olefin comonomer (preferably ethylene or $C_4$ to $C_{20}$ or $C_4$ to $C_{12}$ alpha olefin comonomer, preferably ethylene, butene, hexene, octene, decene, dodecene, preferably ethylene, butene, hexene, or octene).

In another preferred embodiment, the process described herein produces ethylene homopolymers or copolymers, such as ethylene-propylene and/or ethylene-α-olefin (preferably $C_3$ and/or $C_4$ to $C_{20}$) copolymers (such as ethylene-hexene copolymers, ethylene-octene copolymers, or ethylene-propylene-hexene terpolymers) having a Mw/Mn of greater than 1 to 40 (preferably greater than 1 to 5). Preferably, copolymers of ethylene have from 0 wt % to 25 wt % (alternately from 0.5 wt % to 20 wt %, alternately from 1 wt % to 15 wt %, preferably from 3 wt % to 10 wt %, preferably less than 1 wt %, preferably 0 wt %) of one or more of $C_3$ to $C_{40}$ olefin comonomer (preferably propylene or $C_3$ to $C_{20}$ or $C_4$ to $C_{12}$ alpha olefin comonomer, preferably propylene, butene, hexene, octene, decene, dodecene, preferably ethylene, butene, hexene, and octene).

In a preferred embodiment, the monomer is ethylene and the comonomer is hexene, preferably from 1 to 15 mol % hexene, alternately 1 to 10 mol %.

Typically, the polymers produced herein have an Mw of 1,000,000 to 5,000,000 g/mol (preferably 1,500,000 to 4,000,000 g/mol) as measured by GPC.

Typically, the polymers produced herein have an Mw/Mn ("MWD" or "PDI") of greater than 1 to 40 (alternately 1.2 to 20, alternately 2 to 10, alternately 2 to 5, alternately 2.5 to 4).

In a preferred embodiment, the polymer produced herein has a unimodal or multimodal molecular weight distribution as determined by Gel Permeation Chromotography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

Unless otherwise indicated, GPC is performed as follows: A High Temperature Gel Permeation Chromatography (Agilent PL-220), equipped with three in-line detectors, a differential refractive index detector (DRI), a light scattering (LS) detector, and a viscometer is used. Experimental details, including detector calibration, are described in: T. Sun, P. Brant, R. R. Chance, and W. W. Graessley, Macromolecules, Vol. 34, No. 19, pp. 6812-6820, (2001), and references therein. Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm³, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient. P(θ) is the form factor for a monodisperse random coil, and $K_o$ is the optical constant for the system:

$$K_0 = \frac{4\pi^2 n^2 \left(\frac{dn}{dc}\right)^2}{\lambda^4 N_A}$$

where $N_A$ is Avogadro's number, and (dn/dc) is the refractive index increment for the system, which take the same value as the one obtained from DRI method. The refractive index, n=1.500 for TCB at 145° C. and λ=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram, is calculated from the following equation:

$$\eta_S = c[\eta] + 0.3(c[\eta])^2$$

where c is concentration and was determined from the DRI output.

The branching index ($g'_{vis}$) is calculated using the output of the GPC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as:

$$g'vis = \frac{[\eta]_{avg}}{kM_v^\alpha}$$

$M_v$ is the viscosity-average molecular weight based on molecular weights determined by LS analysis. Z average branching index ($g'z_{ave}$) is calculated using Ci=polymer concentration in the slice i in the polymer peak times the mass of the slice squared, $M_i^2$.

In a preferred embodiment, the polymer produced herein has a composition distribution breadth index (CDBI) of 50% or more, preferably 60% or more, preferably 70% or more, preferably 80% or more. CDBI is a measure of the composition distribution of monomer within the polymer chains and is measured by the procedure described in PCT publication WO 93/03093, published Feb. 18, 1993, specifically columns 7 and 8, as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

In another embodiment, the polymer produced herein has two peaks in the TREF measurement. Two peaks in the TREF measurement as used in this specification and the appended claims means the presence of two distinct normalized ELS (evaporation mass light scattering) response peaks in a graph of normalized ELS response (vertical or y axis) versus elution temperature (horizontal or x axis with temperature increasing from left to right) using the TREF method below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. Preferably, the two distinct peaks are at least 3° C. apart, more preferably at least 4° C. apart, even more preferably at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. Two peaks on such a graph indicates a bi-modal composition distribution (CD). Bimodal CD may also be determined by other methods known to those skilled in the art. One such alternate method for TREF measurement that can be used, if the above method does not show two peaks, is disclosed in B. Monrabal, "Crystallization Analysis Fractionation: A New Technique for the Analysis of Branching Distribution in Polyolefins," Journal of Applied Polymer Science, Vol. 52, pp. 491-499, (1994).

TREF Method

Temperature Rising Elution Fractionation (TREF) analysis is done using a CRYSTAF-TREF 200+ instrument from Polymer Char, S.A., Valencia, Spain. The principles of TREF analysis and a general description of the particular apparatus to be used are given in the article Monrabal, B.; del Hierro, P. *Anal. Bioanal. Chem.* 2011, 399, 1557. FIG. 3 of the article is an appropriate schematic of the particular apparatus used; however, the connections to the 6-port valve shown in FIG. 3 differ from the apparatus to be used in that the tubing connected to the 11-o'clock port is connected to the 9-o'clock port and the tubing connected to the 9-o'clock port is connected to the 11-o'clock port. Pertinent details of the analysis method and features of the apparatus to be used are as follows.

1,2-Dichlorobenzene (ODCB) solvent stabilized with approximately 380 ppm of 2,6-bis(1,1-dimethylethyl)-4-methylphenol (butylated hydroxytoluene) is used for preparing the sample solution and for elution. The sample to be analyzed (approximately 25 mg, but as low as approximately 10 mg) is dissolved in ODCB (25 ml metered at ambient temperature) by stirring at 150° C. for 60 min. A small volume (0.5 ml) of the solution is introduced into a column (15-cm long by ⅜" o.d.) packed with an inert support (of stainless stell balls) at 150° C., and the column temperature is stabilized at 140° C. for 45 min. The sample volume is then allowed to crystallize in the column by reducing the temperature to 30° C. at a cooling rate of 1° C./min. The column is kept at 30° C. for 15 min before injecting the ODCB flow (1 ml/min) into the column for 10 min to elute and measure the polymer that did not crystallize (soluble fraction). The infrared detector used (Polymer Char IR4) generates an absorbance signal that is proportional to the concentration of polymer in the eluting flow. A complete TREF curve is then generated by increasing the temperature of the column from 30 to 140° C. at a rate of 2° C./min while maintaining the ODCB flow at 1 ml/min to elute and measure the dissolving polymer.

In a preferred embodiment of the invention, the polymer produced herein has a branching index (g'vis) of 0.95 or more, preferably 0.97 or more, preferably 0.98 or more.

In a preferred embodiment of the invention, the polymer produced herein has a bimodal composition distribution and a branching index (g'vis) of 0.95 or more, preferably 0.97 or more, preferably 0.98 or more.

In a preferred embodiment of the invention, the polymer produced herein has a bulk density of 0.25 g/cc or more, preferably 0.30 to 0.80 g/cc, preferably greater than 0.32 g/cc. Bulk density is measured by quickly transferring (in 10 seconds) the sample powder into a graduated cylinder which overflows when exactly 100 cc is reached. No further powder is added at this point. The rate of powder addition prevents settling within the cylinder. The weight of the powder is divided by 100 cc to give the density.

In embodiments, the polymers produced herein comprise at least 0.1 wt % layered silicate where the layered silicate has an average aspect ratio (L/W) of 1.5 or more, preferably from 1.5 to 10, preferably from 2 to 5, preferably from 2 to 4, as determined by Transmission Electron Microscopy.

In embodiments, the polymers produced herein comprise at least 0.1 wt % layered silicate where the layered silicate has an average aspect ratio (L/W) of 1.5 or more, preferably from 1.5 to 10, preferably from 2 to 5, preferably from 2 to 4, as determined by Transmission Electron Microscopy and have an Mw of 1,000,000 to 5,000,000 g/mol (preferably 1,500,000 to 4,000,000 g/mol) as measured by GPC.

Average aspect ratio is determined by averaging the aspect ratio (length versus width) of multiple particles as shown in Transmission Electron Micrographs. Several TEM photographs of the sample are taken and 60 particles of layered silicate are identified and measured. For each of the 60 particles, the longest dimension is identified by drawing a line between the two points at the edge of the particle which are the furthest apart ("length"). Then the shortest dimension is identified by drawing a line between the two points at the edge of the particle which are the least distance apart ("width"). Length is then divided by width to obtain aspect ratio. The average aspect ratio is calculated as the arithmetical mean based on the aspect ratio of the 60 particles. Image-Pro Plus™ v 7.0.0 is used for image analysis.

When selecting the 60 particles for analysis: 1) only particles which are entirely in the field of view are chosen for analysis; and 2) particles which exhibit signs of damage, such as rough fracture surfaces due to handling, are not included in the analysis.

Uses of Polyolefins

Polyolefins prepared using the processes described herein find uses in all applications including fibers, injection molded parts, films, pipes, and wire and cable applications. Examples include carpet fibers and primary and secondary carpet backing; slit tape applications, such as tarpaulins, erosion abatement screens, sand bags, fertilizer and feed bags, swimming pool covers, intermediate bulk container (IBC) bags; non-woven applications for spun-bonded, melt blown and thermobonded fibers; carded web applications, such as disposable diaper liners, feminine hygiene products, tarpaulins and tent fabrics, and hospital garments; apparel applications, such as socks, T-shirts, undergarments, bicycle shorts, sweat bands, football undershirts, hiking socks, and other outdoor sporting apparel; cordage applications, such as mooring and towing lines and rope; netting applications, such as safety fences and geogrids for soil stabilization; injection molded applications such as appliance parts in automatic dishwashers and clothes washers, hand tools, and kitchen appliances; consumer product applications, such as outdoor furniture, luggage, infant car seats, ice coolers, yard equipment; medical applications, such as disposable syringes and other hospital and laboratory devices; rigid packaging made by injection molding, blow molding, or thermoforming such as margarine tubs, yogurt containers and closures, commercial bottles, and ready-to-eat food containers; transportation applications, such as automotive interior trim, instrument panels, bumper fascia, grills and external trim parts, battery cases; film applications, such as snack packages and other food packaging and film labels, packing tapes and pressure sensitive labels; wire and cable applications, such as wire insulation.

The polyolefins described herein may be used by themselves or blended with one or more additional polymers. In another embodiment, the polyolefin (preferably propylene or ethylene homopolymer or copolymer) produced herein is combined with one or more additional polymers prior to being formed into a film, molded part, or other article. Useful additional polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE (low density polyethylene), LLDPE (linear low density polyethylene), HDPE (high density polyethylene), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM (ethylene-propylene-diene monomer rubber), block copolymer, styrenic block copolymers, polyamides, polycarbonates, PET (polyethylene terephthalate) resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

This invention further relates to:

1. A process to polymerize olefins comprising:
i) contacting olefins with a catalyst system comprising: 1) support comprising an organoaluminum treated layered silicate and inorganic oxide and 2) pyridyldiamido compound represented by the Formula (A):

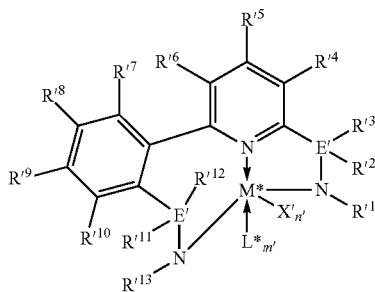

wherein:
M* is a Group 4 metal;
each E' group is independently selected from carbon, silicon, or germanium;
each X' is an anionic leaving group;
L* is a neutral Lewis base;
$R'^1$ and $R'^{13}$ are independently selected from the group consisting of hydrocarbyls, substituted hydrocarbyls, and silyl groups;

$R'^2$, $R'^3$, $R'^4$, $R'^5$, $R'^6$, $R'^7$, $R'^8$, $R'^9$, $R'^{10}$, $R'^{11}$, and $R'^{12}$ are independently selected from the group consisting of hydrogen, hydrocarbyls, alkoxy, silyl, amino, aryloxy, substituted hydrocarbyls, halogen, and phosphino;
n' is 1 or 2;
m' is 0, 1, or 2; and
two X' groups may be joined together to form a dianionic group;
two L* groups may be joined together to form a bidentate Lewis base;
an X' group may be joined to an L* group to form a monoanionic bidentate group;
$R'^7$ and $R'^8$ may be joined to form a ring; and
$R'^{10}$ and $R'^{11}$ may be joined to form a ring; and
ii) preferably, obtaining a polyolefin composition, A, having an Mw of 1,000,000 g/mol or more and comprising 5 wt % or less of the layered silicate, where polyolefin composition A has: 1) no diffraction peak resulting from interlamellar spacing of the organoaluminum treated layered silicate, and/or 2) a diffraction peak resulting from interlamellar spacing of the organoaluminum treated layered silicate of Z Angstroms or more, where Z=5X, where X is the diffraction peak resulting from interlamellar spacing of the support before combination with the catalyst compound, as measured by wide angle x-ray scattering.

2. The process of paragraph 1, wherein the pyridyldiamido compound is represented by the Formula (I):

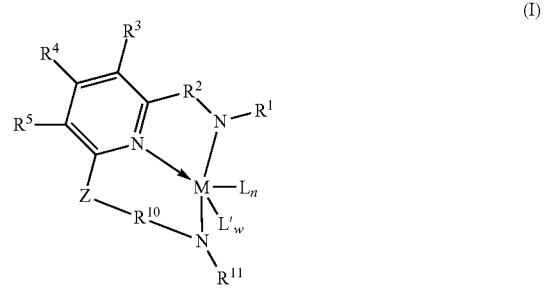

wherein:
M is a Group 4 metal;
Z is $-(R^{14})_pC-C(R^{15})_q-$,
where $R^{14}$ and $R^{15}$ are independently selected from the group consisting of hydrogen, hydrocarbyls, and substituted hydrocarbyls, and wherein adjacent $R^{14}$ and $R^{15}$ groups may be joined to form an aromatic or saturated, substituted or unsubstituted hydrocarbyl ring, where the ring has 5, 6, 7, or 8 ring carbon atoms and where substitutions on the ring can join to form additional rings,
p is 0, 1, or 2, and
q is 0, 1, or 2;
$R^1$ and $R^{11}$ are independently selected from the group consisting of hydrocarbyls, substituted hydrocarbyls, and silyl groups;
$R^2$ and $R^{10}$ are each, independently, $-E(R^{12})(R^{13})-$ with E being carbon, silicon, or germanium, and each $R^{12}$ and $R^{13}$ being independently selected from the group consisting of hydrogen, hydrocarbyls, alkoxy, silyl, amino, aryloxy, substituted hydrocarbyls, halogen, and phosphino, $R^{12}$ and $R^{13}$ may be joined to each other or to $R^{14}$ or $R^{15}$ to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings; $R^3$, $R^4$, and $R^5$ are independently selected from the group consisting of hydrogen, hydrocarbyls (such as alkyls and aryls), substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

L is an anionic leaving group, where the L groups may be the same or different and any two L groups may be linked to form a dianionic leaving group;

n is 0, 1, 2, or 3;

L' is a neutral Lewis base; and w is 0, 1, 2, or 3

3. The process of paragraph 2, wherein the pyridylamido compound is represented by the Formula II:

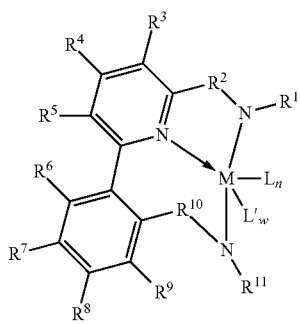

(II)

wherein:

$R^6$, $R^7$, $R^8$, and $R^9$ are independently selected from the group consisting of hydrogen, hydrocarbyls, substituted hydrocarbyls, alkoxy, halogen, amino, and silyl, and wherein adjacent R groups ($R^6$ & $R^7$ and/or $R^7$ & $R^8$ and/or $R^8$ & $R^9$, and/or $R^9$ & $R^{10}$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, $R^1$, $R^2$, $R^3$, $R^4$, $R^5$, $R^{10}$, and $R^{11}$ are as defined in claim 2.

4. The process of paragraph 2, wherein the pyridylamido compound is represented by the Formula III:

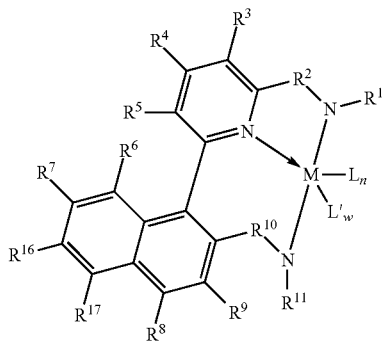

(III)

wherein:

$R^6$, $R^7$, $R^8$, $R^9$, $R^{16}$, and $R^{17}$ are independently selected from the group consisting of hydrogen, hydrocarbyls, substituted hydrocarbyls, alkoxy, halogen, amino, and silyl, wherein adjacent R groups ($R^6$ & $R^7$ and/or $R^7$ & $R^{16}$ and/or $R^{16}$ & $R^{17}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, $R^1$, $R^2$, $R^3$, $R^4$, $R^5$, $R^{10}$, and $R^{11}$ are as defined in paragraph 2.

5. The process of paragraph 2 or 3, wherein M is zirconium or hafnium.

6. The process of paragraph 1, wherein M* is hafnium.

7. The process of any of paragraphs 2 to 5, wherein each of $R^1$, $R^2$, $R^3$, $R^4$, $R^5$, $R^{10}$, and $R^{11}$ is, independently, hydrogen or a hydrocrbyl.

8. The process of any of paragraphs 1 to 7, wherein the combination of layered silicate and inorganic oxide is spray dried prior to contact with the organoaluminum.

9. The process of paragraph 8, wherein the support is obtained by spray drying an aqueous slurry of alkylaluminum treated layered silicate and a Group 1 or 2 silicate.

10. The process of paragraph 8, wherein the support is obtained by spray drying an aqueous slurry of trialkyl aluminum treated montmorillonite, where the alkyl is a C1 to C12 alkyl group, and a sodium, potassium, lithium, or magnesium silicate, or a mixture thereof.

11. The process of any of paragraphs 1 to 10, wherein the support comprises spheroidal particles of the combination of the organoaluminum treated layered silicate and the inorganic oxide.

12. The process of any of paragraphs 1 to 11, wherein the support comprises particles having an average diameter of 20 to 100 microns.

13. The process of any of paragraphs 1 to 12, wherein the support comprises particles having a pore volume of between 0.1 and 0.4 cc/g.

14. The process of any of paragraphs 1 to 13, wherein the support comprises particles having a surface area of between 100 and 200 m$^2$/g.

15. The process of any of paragraphs 1 to 14, wherein the support comprises at least 10 wt % montmorillonite, based upon the weight of the organoaluminum treated layered silicate and the inorganic oxide.

16. The process of any of paragraphs 1 to 15, wherein the support comprises 50 to 90 wt % montmorillonite, based upon the weight of the organoaluminum treated layered silicate and the inorganic oxide.

17. The process of any of paragraphs 1 to 16, wherein the organoaluminum comprises trimethylaluminum, triethylaluminum, triisobutylaluminum, tri-n-hexylaluminum, tri-n-octylaluminum, tri-iso-octylaluminum, triphenylaluminum, or a combination thereof.

18. The process of any of paragraphs 1 to 17, wherein the polyolefin has a bulk density of 0.25 g/ml.

19. The process of any of paragraphs 1 to 18, wherein the polyolefin has no diffraction peak resulting from interlamellar spacing of the organoaluminum treated layered silicate.

20. The process of any of paragraphs 1 to 19, wherein the polyolefin is an ethylene polymer.

21. The process of any of paragraphs 1 to 19, wherein the polyolefin is an ethylene homopolymer.

22. The process of any of paragraphs 1 to 21, wherein the polyolefin is an ethylene copolymer.

23. The process of any of paragraphs 1 to 22, wherein the polyolefin has an Mw from 1,000,000 to 3,000,000 g/mol.

24. The process of any of paragraphs 1 to 23, wherein the polymerization is conducted in the gas phase.

25. The process of any of paragraphs 1 to 23, wherein the polymerization is conducted in the slurry phase.
26. The process of any of paragraphs 1 to 25, wherein alumoxane is absent.
27. The process of any of paragraphs 1 to 26, wherein non-coordinating anion is absent.
28. The process of any of paragraphs 1 to 26, wherein the support comprising an organoaluminum treated layered silicate support and inorganic oxide has an aspect ratio of 1 to 1.7.
29. The process of any of paragraphs 1 to 26, wherein the catalyst system has an average aspect ratio of 1 to 1.7.
30. An ethylene polymer having an Mw of 1,000,000 g/mol or more and comprising 0.1 to 5 wt % of a layered silicate, where the ethylene polymer has no diffraction peak resulting from interlamellar spacing of the layered silicate, as measured by wide angle x-ray scattering.
31. An ethylene polymer having an Mw of 1,000,000 g/mol or more and comprising 0.1 to 5 wt % of a layered silicate derived from a supported catalyst used to produce the ethylene polymer, where the ethylene polymer has 1) no diffraction peak resulting from interlamellar spacing of the layered silicate present in the supported catalyst, and 2) a diffraction peak resulting from interlamellar spacing of the layered silicate of Z Angstroms or more, where Z=5X, where X is the diffraction peak resulting from interlamellar spacing of the layered silicate present in the supported catalyst, as measured by wide angle x-ray scattering.

EXAMPLES

The following abbreviations may be used below: eq. means equivalents.

All reagents were obtained from Sigma Aldrich (St. Louis, Mo.) and used as obtained, unless stated otherwise. All solvents were anhydrous. All reactions were performed under an inert nitrogen atmosphere, unless otherwise stated. All deuterated solvents were obtained from Cambridge Isotopes (Cambridge, Mass.) and dried over 3 Angstrom molecular sieves before use.
Products were Characterized as Follows:
$^1$H NMR Unless otherwise indicated, $^1$H NMR data of non-polymeric compounds was collected at room temperature in a 5 mm probe using either a Bruker or Varian NMR spectrometer operating with a $^1$H frequency of 400 or 500 MHz. Data was recorded using a 30° flip angle RF pulse, 8 scans, with a delay of 5 seconds between pulses. Samples were prepared using approximately 5-10 mg of compound dissolved in approximately 1 mL of an appropriate deuterated solvent, as listed in the experimental examples. Samples are referenced to residual protium of the solvents at 7.15, 7.24, 5.32, 5.98, and 2.10 for D5-benzene, chloroform, D-dichloromethane, D-1,1,2,2-tetrachloroethane, and $C_6D_5CD_2H$, respectively. Unless stated otherwise, NMR spectroscopic data of polymers was recorded in a 5 mm probe on a Varian NMR spectrometer at 120° C. using a $d_2$-1,1,2,2-tetrachloroethane solution prepared from approximately 20 mg of polymer and 1 mL of solvent. Unless stated otherwise, data was recorded using a 30° flip angle RF pulse, 120 scans, with a delay of 5 seconds between pulses.

All molecular weights are weight average unless otherwise noted. All molecular weights are reported in g/mol unless otherwise noted.

Experimental

Catalysts A, B, C, and D (also referred to as Complexes A, B, C, and D) are depicted in FIG. 1.

Synthesis of Pyridyldiamide Complexes.

Complex A was prepared as described in US 2014/0221587. Complex C was prepared as described in US 2015/0141601A1. Complex D was prepared using a procedure analogous to that used for complex A. The only significant difference was that a different aniline was used during the synthesis of the pyridyldiamine ligand. Complex B was prepared using the series of reactions described below.

4,4,5,5-Tetramethyl-2-(2-methyl-1-naphthyl)-1,3,2-dioxaborolane (1)

1,2-Dibromoethane (~0.3 ml) was added to 6.10 g (0.25 mol) of magnesium turnings in 1000 cm$^3$ of THF. This mixture was stirred for 10 min, and then 55.3 g (0.25 mol) of 1-bromo-2-methylnaphtalene was added by vigorous stirring for 3.5 h at room temperature. Further on, 46.5 g (250 mmol) of 2-isopropoxy-4,4,5,5-tetramethyl-1,3,2-dioxaborolane was added in one portion. The resulting mixture was stirred for 15 min and then poured into 1000 cm$^3$ of cold water. The product was extracted with 3×300 ml of ethyl acetate. The organic layer was separated, washed by water, brine, dried over MgSO$_4$, and, finally, evaporated to dryness. The formed white solid was washed by 2×75 ml of pentane and then dried in vacuum. Yield 47.3 g (70%). Anal. calc. for $C_{17}H_{21}BO_2$: C, 76.14; H, 7.89. Found: C, 76.21; H, 7.96. $^1$H NMR (CDCl$_3$): δ 8.12 (m, 1H, 8-H), 7.77 (m, 1H, 5-H), 7.75 (d, J=8.4 Hz, 1H, 4-H), 7.44 (m, 1H, 7-H), 7.38 (m, 1H, 6-H), 7.28 (d, J=8.4 Hz, 1H, 3-H), 2.63 (s, 3H, 2-Me), 1.48 (s, 12H, CMe$_2$CMe$_2$).

2-[2-(Bromomethyl)-1-naphthyl]-4,4,5,5-tetramethyl-1,3,2-dioxaborolane (2)

A mixture of 47.3 g (176 mmol) of 4,4,5,5-tetramethyl-2-(2-methyl-1-naphthyl)-1,3,2-dioxaborolane, 33.0 g (185 mmol) of NBS, and 0.17 g (0.70 mmol) of benzoyl peroxide in 340 ml of CCl$_4$ was stirred in argon atmosphere for 14 h at 75° C. The resulting mixture was cooled to room temperature, filtered through a glass frit (G3), and the filtrate was evaporated to dryness. This procedure gave 62.2 g (99%) of a beige solid. Anal. calc. for $C_{17}H_{20}BBrO_2$: C, 58.83; H, 5.81. Found: C, 58.75; H, 5.90. $^1$H NMR (CDCl$_3$): δ 8.30 (m, 1H, 8-H), 7.84 (d, J=8.3 Hz, 1H, 4-H), 7.79 (m, 1H, 5-H), 7.43-7.52 (m, 3H, 3,6,7-H), 4.96 (s, 2H, CH$_2$Br), 1.51 (s, 12H, CMe$_2$CMe$_2$).

Cyclohexyl{[1-(4,4,5,5-tetramethyl-1,3,2-dioxaborolan-2-yl)-2-naphthyl]methyl}amine (3)

A mixture of 18.0 g (181 mmol) of cyclohexylamine, 42.1 (129 mmol) g of 2-[2-(bromomethyl)-1-naphthyl]-4,4,5,5-tetramethyl-1,3,2-dioxaborolane, 18.4 g (133 mmol) of K$_2$CO$_3$, and 500 ml of DMF was stirred for 12 h at 80° C. in argon atmosphere. The resulting mixture was poured into 1200 ml of water. The product was extracted with 3×200 ml of ethyl acetate. The combined extract was dried over Na$_2$SO$_4$ and then evaporated to dryness. An excess of cyclohexylamine was distilled off using the Kugelrohr apparatus. Yield 29.9 g (67%) of a dark red glassy solid. Anal. Calc for $C_{23}H_{32}BNO_2$: C, 75.62; H, 8.83; N, 3.83. Found: C, 75.69; H, 8.79; N, 3.87. $^1$H NMR (CDCl$_3$): δ 8.51 (m, 1H, 8-H in naphtyl), 7.76 (m 1H, 4-H in naphtyl), 7.69 (m, 1H, 5-H in naphtyl), 7.41-7.46 (m, 1H, 7-H in naphtyl), 7.35-7.39 (m, 1H, 6-H in naphtyl), 7.18 (m, 1H, 3-H in naphtyl), 4.16 (s, 2H, CH$_2$), 3.32 (m, 1H, NH), 1.56-1.67 (m, 5H, Cy), 1.37 (s, 12H, BPin), 1.15-1.25 (m, 5H, Cy), 0.94-1.06 (m, 1H, Cy).

6-{2-[(Cyclohexylamino)methyl]-1-naphthyl}pyridine-2-carbaldehyde (4)

A solution of 21.2 g (74.1 mmol) of Na$_2$CO$_3$×10H$_2$O in 660 ml of water and 190 ml of methanol was purged with argon for 30 min. The obtained solution was added to a mixture of 29.9 g (80.0 mmol) of cyclohexyl {[1-(4,4,5,5-tetramethyl-1,3,2-dioxaborolan-2-yl)-2-naphthyl]methyl}amine, 14.0 g (80.0 mmol) of 6-bromopyridine-2-carbaldehyde, 4.62 g (4.00 mmol) of Pd(PPh$_3$)$_4$, and 780 ml of toluene in argon atmosphere. This mixture was refluxed for 10 h using a mechanical stirrer, then cooled to room temperature. The organic layer was separated, dried over Na$_2$SO$_4$, evaporated to 300 ml in volume, and then extracted with 3×300 ml of 2M HCl. The combined aqueous layer was alkalified to pH 10 by the saturated aqueous K$_2$CO$_3$, and then extracted with 3×200 ml of dichloromethane. The combined organic extract was dried over Na$_2$SO$_4$ and evaporated to dryness. Yield 23.1 g (84%) of a brown oil. Anal. Calc for C$_{23}$H$_{24}$N$_2$O: C, 80.20; H, 7.02; N, 8.13. Found: C, 80.78; H, 7.11; N, 8.01. $^1$H NMR (CDCl$_3$): δ 10.08 (s, 1H, CHO), 7.96-8.03 (m, 2H, 3-H, 4-H in Py), 7.83-7.89 (m, 2H, 8,5-H in Py), 7.59-7.64 (m, 2H, 5-H in Py and 4-H in naphtyl), 7.39-7.43 (m, 1H, 6-H in naphtyl), 7.30-7.34 (m, 1H, 7-H in naphtyl), 7.20-7.23 (m, 1H, 3-H in naphtyl), 3.56 (m, 2H, CH$_2$), 2.21 (m, 1H, 1-H in Cy), 1.57-1.66 (m, 4H, Cy), 1.02-1.11 (m, 4H, Cy), 0.88-0.96 (m, 2H, Cy).

N-[(1E)-(6-{2-[(Cyclohexylamino)methyl]-1-naphthyl}pyridin-2-yl)methylene]-2,6-diisopropylaniline (5)

A solution of 9.80 g (28.0 mmol) of 6-{2-[(cyclohexylamino)methyl]-1-naphthyl}pyridine-2-carbaldehyde, 5.55 g (31.0 mmol) of 2,6-diisopropylaniline, 0.1 g of TsOH in 100 ml of dry ethanol was refluxed for 10 h in argon atmosphere. The resulting mixture was cooled to room temperature and then evaporated to dryness. The residue was purified by flash chromatography on silica gel 60 (40-63 um, eluent: hexane-ethyl acetate-triethylamine=10:1:1, vol.). Yield 10.8 g (77%) of yellow powder. Anal. Calc for C$_{35}$H$_{41}$N$_3$: C, 83.45; H, 8.20; N, 8.34. Found: C, 83.59; H, 8.06; N, 8.41. $^1$H NMR (CDCl$_3$): δ 8.39 (m, 1H, 3-H in Py), 8.35 (s, 1H, CHN), 8.00 (m, 1H, 4-H in Py), 7.87-7.92 (m, 2H, 4,8-H in naphtyl), 7.63 (m, 1H, 3-H in naphtyl), 7.54 (m, 1H, 3-H in Py), 7.37-7.47 (m, 3H, 5-H in Py and 6,7-H in naphtyl), 7.09-7.17 (m, 3H, 3,4,5-H in naphtyl), 3.69 (m, 2H, CH$_2$N), 3.01 (sept, J=6.8 Hz, 2H, CH in 2,6-diisopropylphenyl), 2.29 (m, 1H, CH in Cy), 1.61-1.72 (m, 4H, Cy), 1.52-1.54 (m, 2H, Cy), 1.19 (d, J=6.8 Hz, 12H, CH$_3$ in 2,6-diisopropylphenyl), 1.09-1.11 (m, 2H, Cy), 0.94-0.99 (m, 2H, Cy).

N-[(6-{2-[(Cyclohexylamino)methyl]-1-naphthyl}pyridin-2-yl)(2-isopropylphenyl)methyl]-2,6-diisopropylaniline To a solution of 3.56 g (18.0 mmol) of 2-isopropylbromobenzene in 80 ml of THF 21.0 ml (35.7 mmol) of 1.7M $^t$BuLi in pentane was added at −80° C. in argon atmosphere. The resulting solution was stirred for 1 h at this temperature. Then, a solution of 3.00 g (6.00 mmol) of N-[(1E)-(6-{2-[(cyclohexylamino)methyl]-1-naphthyl}pyridin-2-yl)methylene]-2,6-diisopropylaniline in 20 ml of THF was added. The obtained mixture was stirred for 30 min at −80° C. Further on, 10 ml of water was added, and this mixture was warmed to room temperature. The resulting mixture was diluted with 100 ml of water, and crude product was extracted with 50 ml of ethyl acetate. The organic layer was separated, dried over Na$_2$SO$_4$, and evaporated to dryness. The residue was purified by flash chromatography on silica gel 60 (40-63 um, eluent: hexane-ethyl acetate-triethylamine=10:1:1, vol.). Yield 1.15 g (31%) of a yellow glassy solid. Anal. Calc for C$_{44}$H$_{53}$N$_3$: C, 84.70; H, 8.56; N, 6.73. Found: C, 84.86; H, 8.69; N, 6.55. $^1$H NMR (CDCl$_3$): δ 7.87 (m); 7.59-7.74 (m); 7.42-7.46 (m); 7.14-7.34 (m); 6.99 (m); 5.52 (d); 5.39 (d); 4.80 (m); 4.50 (m); 3.67 (m); 3.48-3.58 (m); 3.18 (m); 2.98 (m); 2.50-2.55 (m); 2.15 (m); 2.25 (m); 1.48-1.72 (m); 1.03-1.15 (m); 0.98-1.01 (m); 0.91-0.93 (m); 0.79-0.86 (m).

Complex B.

While shielded from direct light, N-[(6-{2-[(Cyclohexylamino)methyl]-1-naphthyl}pyridin-2-yl)(2-isopropylphenyl)methyl]-2,6-diisopropylaniline (0.898 g, 1.44 mmol), Hf(NMe$_2$)$_2$Cl$_2$(dme) (0.616 g, 1.44 mmol), and toluene (20 mL) were combined and heated to 95° C. in a round bottomed flask that was uncapped to allow for the release of dimethylamine. After 3 h, the volatiles were evaporated under a stream of nitrogen to afford a yellow solid that was washed thoroughly with Et$_2$O to afford 1.11 g (1.27 mmol) of the dichloride complex. This dichloride intermediate was dissolved in CH$_2$Cl$_2$ (20 mL) and Me$_2$Mg in Et$_2$O (4.43 mL, 1.4 mmol) was added dropwise. After 30 minutes, the volatiles were evaporated under a stream of nitrogen and the residue was dried thoroughly under reduced pressure. The residue was extracted with CH$_2$Cl$_2$ (10 mL) and filtered. Concentration of this solution to 1 mL followed by the addition of pentane (3 mL) caused the product to precipitate as a yellow microcrystalline solid. Yield 0.99 g, 83%. Room temperature H-NMR spectroscopic analysis indicates that the product is an 85:15 mixture of rotational diastereomers.

Supported Catalysts:
Supportation of Complex a on Spray Dried Montmorrillonite.

K10 montmorillonite was purchased from Sigma-Aldrich and used as received. Montmorillonite KSF was purchased from Sigma-Aldrich. Methylalumoxane 30 wt % in toluene was purchased from Albemarle and used as received. Trimethyl aluminum, triethyl aluminum and tri-n-octyl aluminum were purchased from Akzo Nobel and used as received.

Spray Dried Montmorillonite, Support 1

Support 1 was prepared by adding 2500 g of montmorillonite (K-10, Sigma-Aldrich) to 3.4 l of deionized water. A homogeneous slurry, with an agglomerate size d$_{50}$ typically in the range of 15 μm, was achieved by stirring with a high-shear mixer for 60 min. Then 27 g of sodium silicate (reagent grade, Aldrich) were added to the mixture and homogenized for 5 min; achieving a final solids content of 30 wt %. The obtained slurry was spray dried at a rate of 300 cc/min using a Bowen spray drier with an inlet temperature in the range of 716° F. and 1100° F. (380° C. and 593° C.), depending on feed flow, and a target outlet temperature of 320° F. (160° C.). The product was recovered as a dry, flowing powder with an agglomerate size d$_{50}$ between 90 and 150 μm, and moisture content between 17 and 6 wt %, depending on spray gas pressure. Finally, the support was dried further at 121° F. (250° C.) for 16 h and optionally calcined in air at 932° F. (500° C.) for 8 h.

Sulfuric Acid Treated Montmorillonite KSF, Support 2

Montmorillonite KSF was then treated according to the general procedure of Example 1 of U.S. Pat. No. 7,220,695, i.e., Montmorillonite KSF (198.766 g) was placed in a 2 L round bottom flask along with 1.40 L of $H_2O$ and 110 mL of concentrated sulfuric acid and stirred for 6 hr at 90° C. The mixture was then allowed to stir overnight at room temperature. The mixture was filtered and the solid was washed with 4×1 L of $H_2O$. The pH of the filtrate was monitored; when the pH was approximately 3 the washing was stopped and the solid was heated to 130° C. while open to air. The solid was then placed under vacuum at room temperature for a few hours and then heated to 150° C. under vacuum overnight. The clay was brought into a glovebox while maintaining a nitrogen atmosphere. A 132 gram amount of tan solid was obtained as Support 2.

Tri-n-Octyl Aluminum Treated Montmorillonite KSF, Support 3

Support 2 (14.9 grams) was slurried in 100 mls of toluene. The slurry was sonicated for 5 minutes. Tri-n-octylaluminum (10.25 grams, 27.9485 mmol) was dissolved in 5 mLs of toluene and added to the slurry. The slurry was sonicated for an hour at 60° C. $^1H$ NMR analysis of the solvent indicated excess tri-n-octyl aluminum in solution. The solid was filtered and washed three times with 50 mLs of toluene and once with pentane. The solid was dried under vacuum, yielding 15.6 grams of tan solid as Support 3.

Complex A on Tri-n-Octyl Aluminum Treated Montmorillonite KSF, Supported Complex A Support 3 was slurried in 50 mL of toluene in a beaker and sonicated for 5 minutes. Complex A was dissolved in 7 mL of toluene and added to the slurry, which was then sonicated for an additional 30 minutes. The slurry was filtered, washed three times with 20 mL of toluene, and two times with pentane. The solid was dried under vacuum overnight to give 0.953 grams of tan solid as Supported Complex A.

Example 1: Polymerization with Supported Complex A

Tri-n-octylaluminum (2 mL, 0.091M in hexane) was injected into a 2 liter autoclave reactor that had been baked out for 1 hour. 500 milliliters of isohexane was then added to the reactor. The stir rate was set to 500 rpm and temperature set at 85° C. Supported Complex A (0.0531 g) was injected into the reactor with 200 mL of isohexane. The reactor was pressurized with 150 psi of ethylene. The reactor was stirred for 1 hour keeping the reactor at a total psi of 330 psi. After 1 hour the reactor was vented and cooled to room temperature. 170 milligrams of polyethylene resin was obtained.

Tri-Ethyl Aluminum Treated Montmorillonite K-10, Support 4

Support 1 (4.53 grams) was slurried in 40 milliters of toluene in a Celstir flask. Triethylaluminum (1.81 g, 15.9 mmol, 3.50 mmol/g) was added neat to the Celstir. The slurry stirred for 1 hour at 60° C. The solid was filtered, washed three times with 25 milliliters of toluene and two times with pentane. The solid was dried under vacuum, giving 4.58 grams of gray solid as Support 4.

Tri-Methyl Aluminum Treated Montmorillonite K-10, Support 5

Support 1 (4.2634 g) was slurried in 30 mL of toluene. Trimethylaluminum (0.2420 g, 3.357 mmol) was dissolved in 10 mL of toluene added slowly to the slurry. The slurry was stirred at 60° C. for 1 hr. $^1H$ NMR analysis showed an excess of trimethylaluminum. The slurry was then filtered, washed three times with 20 mL of toluene each and washed twice with pentane. The solid was dried under vacuum to give 4.28 g of tan material as Support 5.

Tri-Isobutyl Aluminum Treated Montmorillonite K-10, Support 6

Support 1 (4.76 g) was slurried in 25 mL of toluene. Triisobutylaluminum (0.733 g, 3.70 mmol) was dissolved in 10 mL of toluene added slowly to the slurry. The slurry was stirred at 60° C. for 1 hr. $^1H$ NMR analysis showed an excess of triisobutylaluminum. The slurry was then filtered, washed three times with 20 mL of toluene each and washed twice with pentane. The solid was dried under vacuum to give 4.88 g of tan material as Support 6.

Supportation of Complex A on Support 4

Support 4 was slurried in 15 mL of toluene at high speed. Complex A (29.0 mg, 0.0382 mmol, 0.0398 mmol/g) was dissolved in 5 mL of toluene and added to the slurry. The slurry stirred for 1 hour before being filtered, washed three times with 20 mL portions of toluene and twice with pentane. The solid was dried under vacuum, giving 0.938 grams of tan solid.

| Support | Surface area (BET method) $m^2/g$ | Pore Volume (BJH Adsorption cumulative volume) $cm^3/g$ |
|---|---|---|
| Montmorillonite MKSF | 33.3 | 0.0257 |
| Support 1 | 204 | 0.257 |
| Support 4 | 169 | 0.226 |
| Support 6 | 166 | 0.227 |

Supportation of Complex A on Support 5

Support 5 (0.5714 g) was slurried in 10 mL of toluene at high speed. Complex A (17.2 mg, 0.0227 mmol) was dissolved in 5 mL of toluene and added to the slurry. The slurry was stirred for 1 hr, filtered, washed three times with 15 mL of toluene each, and washed twice with pentane. The solid was dried under vacuum to give a tan solid.

Supportation of Complex B, on Support 4

Support 4 was slurried in 15 mL of toluene at high speed. Complex B (21.8 mg, 0.0263 mmol) was dissolved in 5 mL of toluene and added to the slurry. The slurry stirred for 1 hr before being filtered, washed three times with 20 mL of toluene and twice with pentane. The solid was dried under vacuum, giving 0.6241 g of tan solid.

Supportation of Complex C, on Support 4

Support 4 (0.6510 g) was slurried in 15 mL of toluene at high speed. Complex C (17.7 mg, 0.0259 mmol) was dissolved in 5 mL of toluene and added to the slurry. The slurry stirred for 1 h before being filtered, washed three times with 20 mL of toluene and twice with pentane. The solid is dried under vacuum, giving 0.6118 g of tan solid.

Supportation of Complex D, on Support 4

Support 4 (0.4087 g) was slurried in 15 mL of toluene at high speed. Complex D (12.1 mg, 0.0162 mmol) was dissolved in 5 mL of toluene and added to the slurry. The slurry stirred for 1 h before being filtered, washed three times with 20 mL of toluene and twice with pentane. The solid was dried under vacuum, giving 0.3901 g of tan solid.

Supportation of Complex A on MAO Treated Silica

600° C. calcined Davison™948 silica (45.6903 g) was slurried in 250 mL of toluene and heated to 80° C. Methyl alumoxane MAO (79.25 g of a 30% wt solution in toluene) was added slowly to the slurry, producing some bubbling. The slurry was stirred for 1 hour. The slurry was filtered, washed twice with 25 mL of toluene and dried under vacuum for two days. A 68.11 gram amount of white solid was obtained. The white solid (0.7835 g) was slurried in 20 mL of toluene. Complex A (23.7 mg, 0.0312 mmol) was dissolved in 5 mL of toluene. The catalyst was added to the slurry and stirred for 2 hr. The slurry was filtered, washed twice with 20 mL of toluene, washed once with pentane, and dried under vacuum overnight. Collected 0.7376 g of white solid.

Polymerization Example 2: Complex A on Spray Dried Montmorillonite-K10-TEAL

Tri-ethyl aluminum, (2 mL, 0.091M in hexane) was injected into a 2 liter autoclave that had been baked out for 1 hour. 800 mL of isohexane was then added to the reactor. The stir rate was set to 500 rpm and temperature set at 85° C. The reactor was pressurized with 60 psi of ethylene. Supported complex A (0.0907 g) was slurried with 2 mL of pentane and injected with another 62 psi of ethylene. The reaction was run for 30 min. The catalyst tube was plugged during the injection process. A 14.57 gram amount of white granules was obtained. Activity: 321 g polymer/(g cat*hr).

Polymerization Example 3: Complex D on Spray Dried Montmorillonite-K10-TEAL

Tri-ethylaluminum (2 mL, 0.091M in hexane) was injected into a 2 Liter autoclave reactor that had been baked out for 1 hour. A 300 mL amount of isohexane was then added to the reactor. 5 milliliters of 1-hexene was added to the reactor followed by an additional 300 milliliters of isohexane. The stir rate was set to 500 rpm and temperature set at 85° C. The reactor was pressurized with 20 psi of ethylene. Supported complex D (0.0712 g) was injected along with 2 milliliters of pentane and pushed in with 200 milliliters of isohexane. The reactor was pressurized to give a total ethylene pressure of 130 psi. The polymerization was run for 30 minutes. A 15.8 gram amount of white granules obtained. Activity: 444 g polymer/(g cat*hr).

Polymerization Example 4

Support 4 (0.571 grams) was weighed out in a vial. Toluene (14 mL) and triisobutyl aluminum (0.569 g, 2.87 mmol) was then added to the vial. The vial was shaken for 5 min. Complex A (17.8 mg, 0.0235 mmol) was then added to the vial. The vial was placed on a shaker for 5 hrs. The slurry was removed via syringe in about 2 mL quantities for use in polymerization reactions.

Tri-ethylaluminum (2 mL, 0.091M in hexane) was injected into a 2 liter autoclave reactor that had been baked out for 1 hour. A 300 mL amount of isohexane was then added to the reactor. 10 or 0 milliliters of 1-hexene was added to the reactor followed by an additional 300 milliliters of isohexane. The stir rate was set to 500 rpm and temperature set at 85° C. The reactor was pressurized with 20 psi of ethylene. 2 mls of the catalyst slurry was injected along with 2 mls of pentane and pushed in with 200 mls of isohexane. The reactor was pressurized to give a total ethylene pressure of 130 psi.

Reaction with 10 mls of hexene yielded 29.9 grams of PE (731 gPE/gsupcat.hr). Reaction with no hexene yielded 9.91 grams of PE.

Examples 4-15

The procedure of Example 3 was repeated with alternate supported catalyst complexes. The data are reported in Table 1.

TABLE 1

| Example | Catalyst Precursor | Support | Hexene (mls) | Yield (grams) | Activity** | Bulk Density | Mn (g/mol)* | Mw (g/mol)* | Mw/Mn |
|---|---|---|---|---|---|---|---|---|---|
| 4 | (1-Me,3-BuCp)$_2$ZrMe$_2$ | 4 | 0 | 14.62 | 558.6 | | | | |
| 1 | Complex A | 3 | | 0.170 | | | | | |
| 5 | Complex A | 4 | 0 | 14.6 | 321 | 0.3038 | 732,694 | 1,757,025 | 2.40 |
| 3 | Complex A | 4 | 5 | 15.8 | 444 | 0.2898 | 1,187,090 | 2,643,660 | 2.23 |
| 6 | Complex A | 4 | 10 | 9.79 | 413.3 | 0.2848 | 967,202 | 2,212,854 | 2.29 |
| 7 | Complex A | 5 | 0 | 7.6 | 261.2 | | 894,488 | 2,247,868 | 2.51 |
| 8 | Complex A | 5 | 10 | 10.3 | 361.5 | | 894,144 | 2,155,165 | 2.41 |
| | Complex A | 6 | 0 | 11.6 | 413 | 0.3420 | | | |
| | Complex A | 6 | 10 | 21.1 | 767 | 0.2376 | | | |
| 9 | Complex A | MAO treated Silica | 10 | 11.68 | | | 520,158 | 1,762,383 | 3.39 |
| 10 | Complex B | 4 | 10 | 14.7 | 589 | 0.2490 | | | |
| 11 | Complex B | 4 | 0 | 27.0 | 859 | 0.2776 | | | |
| 12 | Complex C | 4 | 10 | 16.1 | 510 | 0.1960 | | | |
| 13 | Complex C | 4 | 0 | 15.0 | 476 | 0.2022 | | | |
| 14 | Complex D | 4 | 10 | 2.42 | 126 | | | | |
| 15 | Complex D | 4 | 0 | 3.0 | 95 | | | | |

*GPC-DRI as described below,
**(g polymer/g cat*hr)

GPC-DRI for Samples in Table 1.

Gel permeation chromatography was performed on a Waters Alliance GPC, 2000 equipped with a differential refractive index (DRI) detector. The solvent consisted of 1,2,4-trichlorobenzene (Sigma Aldrich, Chromasolv grade ≥99% purity) stabilized with 1000 ppm of 2,6-di-tert-butyl-4-methylphenol (Sigma Aldrich). The solvent was filtered using a membrane filter (Millipore, polytetrafluoroethylene, 0.1 μm) prior to use. All samples were dissolved at a concentration of approximately 0.25 to 1.5 mg/mL in this solvent. Dissolution was carried out at 160° C. in a shaker oven for 2-3 hours. The samples were immediately transferred to a sample carousel maintained at 160° C. Separation was effected by three TSK gel columns in series (Tosoh Bioscience LLC, TSK gel GMH$_{HR}$-H(30)HT2, 300 mm×7.8 mm, 30 μm) at 160° C. The solvent was passed through an in-line filter (Optimize Technologies, SS frit, 2 μm) prior to entering the columns at an isocratic flow of 1.0 mL/min. Molecular weight was determined by a universal calibration as described below using a set of seventeen narrow polystyrene standards (Agilent Technologies) with peak molecular weights (Mp) from ~1000 to ~10,000,000 g/mol and Mw/Mn≤1.10. Mp for the polystyrene standard provided on the certificate of analysis from the manufacturer was used for calibration. The universal calibration curve was generated by fitting a second order polynomial to a plot of the log Mp vs. retention volume for the polystyrene standards in Microsoft Excel (Version 14.0.7113.5000). Using this calibration and the Mark-Houwink expression, molecular weight moments were determined for polyolefins of known composition. The composition used for GPC analysis is determined by $^1$H NMR.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

What is claimed is:
1. A catalyst system comprising:
1) support comprising inorganic oxide and an organoaluminum treated layered silicate and 2) pyridyldiamido compound represented by the Formula (A):

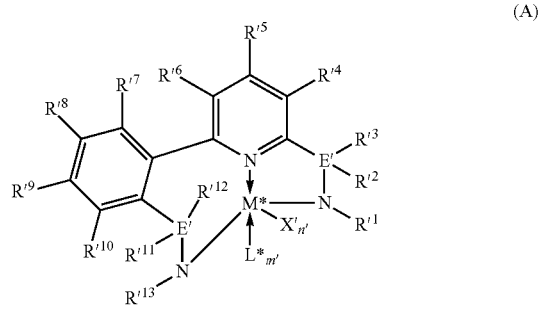

wherein:
M* is a Group 4 metal;
each E' group is independently selected from carbon, silicon, or germanium;
each X' is an anionic leaving group;
L* is a neutral Lewis base;

R'$^1$ and R'$^{13}$ are independently selected from the group consisting of hydrocarbyls, substituted hydrocarbyls, and silyl groups;
R'$^2$, R'$^3$, R'$^4$, R'$^5$, R'$^6$, R'$^7$, R'$^8$, R'$^9$, R'$^{10}$, R'$^{11}$, and R'$^{12}$ are independently selected from the group consisting of hydrogen, hydrocarbyls, alkoxy, silyl, amino, aryloxy, substituted hydrocarbyls, halogen, and phosphine;
n' is 1 or 2;
m' is 0, 1, or 2; and
two X' groups may be joined together to form a dianionic group;
two L* groups may be joined together to form a bidentate Lewis base;
an X' group may be joined to an L* group to form a monoanionic bidentate group;
R'$^7$ and R'$^8$ may be joined to form a ring; and
R'$^{10}$ and R'$^{11}$ may be joined to form a ring.

2. The catalyst system of claim 1, wherein the support is present in the form of spherioid particles, has an average aspect ratio (L/W) of 1 to 1.7; has an average particle size (D50) of 20 to 180 microns, has a surface area of about 100 to about 200 m$^2$/g and has a pore volume of about 0.1 to about 0.4 cc/g.

3. The catalyst system of claim 1, wherein the catalyst system has an average aspect ratio (L/W) of 1 to 1.7, has an average particle size (D50) of 20 to 180 microns, and has a pore volume of about 0.1 to about 0.4 cc/g.

4. The catalyst system of claim 1, wherein the support comprises particles of an agglomerate of an inorganic oxide and treated layered silicate, where the support comprising inorganic oxide and an organoaluminum treated layered silicate has been spray dried prior to contact with the organoaluminum.

5. The catalyst system of claim 4, wherein the support is obtained by spray drying an aqueous slurry of layered silicate and an inorganic oxide, where a pH of the slurry is from about 3 to 7; a dry solids content of the slurry is from about 20 to 30 wt % based on the weight of the slurry and the dry weight of the solids; a ratio of inorganic oxide to layered silicate in the slurry is from 1:5 to 1:20; and the spray dried support has an average particle size of from 20 to 125 microns and is free flowing.

6. A catalyst system comprising:
1) support comprising inorganic oxide and an organoaluminum treated layered silicate and 2) pyridyldiamido compound represented by the Formula (I):

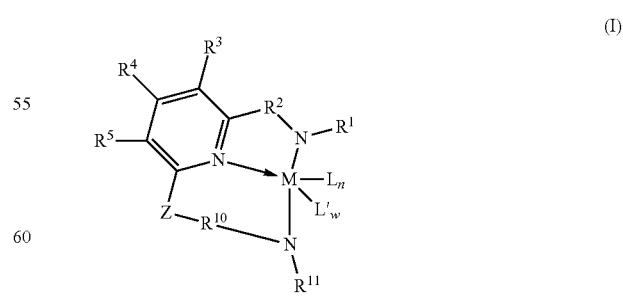

wherein:
M is a Group 4 metal;
Z is $-(R^{14})_pC-C(R^{15})_q-$, where $R^{14}$ and $R^{15}$ are independently selected from the group consisting of hydrogen, hydrocarbyls, and substituted hydrocarbyls, and wherein adjacent $R^{14}$ and $R^{15}$ groups may be joined to form an aromatic or saturated, substituted or unsubstituted hydrocarbyl ring, where the ring has 5, 6, 7, or 8 ring carbon atoms and where substitutions on the ring can join to form additional rings, p is 0, 1, or 2, and q is 0, 1, or 2;

$R^1$ and $R^{11}$ are independently selected from the group consisting of hydrocarbyls, substituted hydrocarbyls, and silyl groups;

$R^2$ and $R^{10}$ are each, independently, $-E(R^{12})(R^{13})-$ with E being carbon, silicon, or germanium, and each $R^{12}$ and $R^{13}$ being independently selected from the group consisting of hydrogen, hydrocarbyls, alkoxy, silyl, amino, aryloxy, substituted hydrocarbyls, halogen, and phosphine, $R^{12}$ and $R^{13}$ may be joined to each other or to $R^{14}$ or $R^{15}$ to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

L is an anionic leaving group, where the L groups may be the same or different and any two L groups may be linked to form a dianionic leaving group;

n is 0, 1, 2, or 3;

L' is a neutral Lewis base; and w is 0, 1, 2, or 3.

7. The catalyst system of claim 6 wherein:

A) the support is obtained by spray drying an aqueous slurry of alkylaluminum treated layered silicate and an inorganic oxide comprising a Group 1 or 2 silicate; and 1) the support comprises particles having an average diameter of 20 to 100 microns, and/or 2) the support comprises particles having a pore volume of between 0.1 and 0.4 cc/g, and/or 3) the support comprises particles having a surface area of between 100 and 200 m²/g; and B) the organoaluminum comprises trimethylaluminum, triethylaluminum, triisobutylaluminum, tri-n-hexylaluminum, tri-n-octylaluminum, triisooctylaluminum, triphenylaluminum, or a combination thereof.

8. A catalyst system comprising:

1) support comprising inorganic oxide and an organoaluminum treated layered silicate and 2) pyridyldiamido compound represented by the Formula III:

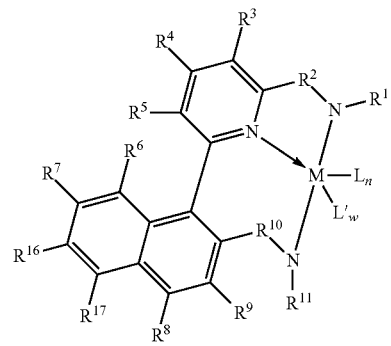

wherein:

$R^6$, $R^7$, $R^8$, $R^9$, $R^{16}$, and $R^{17}$ are independently selected from the group consisting of hydrogen, hydrocarbyls, substituted hydrocarbyls, alkoxy, halogen, amino, and silyl, wherein adjacent R groups ($R^6$ & $R^7$, and/or $R^7$ & $R^{16}$, and/or $R^{16}$ & $R^{17}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings;

M is a Group 4 metal;

$R^1$ and $R^{11}$ are independently selected from the group consisting of hydrocarbyls, substituted hydrocarbyls, and silyl groups;

$R^2$ and $R^{10}$ are each, independently, $-E(R^{12})(R^{13})-$ with E being carbon, silicon, or germanium, and each $R^{12}$ and $R^{13}$ being independently selected from the group consisting of hydrogen, hydrocarbyls, alkoxy, silyl, amino, aryloxy, substituted hydrocarbyls, halogen, and phosphine, $R^{12}$ and $R^{13}$ may be joined to each other to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

L is an anionic leaving group, where the L groups may be the same or different and any two L groups may be linked to form a dianionic leaving group;

n is 0, 1, 2, or 3;

L' is a neutral Lewis base; and w is 0, 1, 2, or 3.

9. The catalyst system of claim 8 wherein:

A) the support is obtained by spray drying an aqueous slurry of alkylaluminum treated layered silicate and an inorganic oxide comprising a Group 1 or 2 silicate; and 1) the support comprises particles having an average diameter of 20 to 100 microns, and/or 2) the support comprises particles having a pore volume of between 0.1 and 0.4 cc/g, and/or 3) the support comprises particles having a surface area of between 100 and 200 m²/g; and B) the organoaluminum comprises trimethylaluminum, triethylaluminum, triisobutylaluminum, tri-n-hexylaluminum, tri-n-octylaluminum, triisooctylaluminum, triphenylaluminum, or a combination thereof.

10. A process to polymerize olefins comprising:
i) contacting olefins with a catalyst system comprising: 1) support comprising: a) an organoaluminum treated layered silicate, and b) inorganic oxide, and 2) pyridyldiamido compound represented by the Formula (A):

(A)

wherein:
M* is a Group 4 metal;
each E' group is independently selected from carbon, silicon, or germanium;
each X' is an anionic leaving group;
L* is a neutral Lewis base;
R'¹¹ and R'¹³ are independently selected from the group consisting of hydrocarbyls, substituted hydrocarbyls, and silyl groups;
R'², R'³, R'⁴, R'⁵, R'⁶, R'⁷, R'⁸, R'⁹, R'¹⁰, R'¹¹, and R'¹² are independently selected from the group consisting of hydrogen, hydrocarbyls, alkoxy, silyl, amino, aryloxy, substituted hydrocarbyls, halogen, and phosphine;
n' is 1 or 2;
m' is 0, 1, or 2; and
two X' groups may be joined together to form a dianionic group;
two L* groups may be joined together to form a bidentate Lewis base;
an X' group may be joined to an L* group to form a monoanionic bidentate group;
R'⁷ and R'⁸ may be joined to form a ring; and
R'¹⁰ and R'¹¹ may be joined to form a ring;
ii) obtaining a polyolefin composition.

11. The process of claim 10, wherein a combination of layered silicate and inorganic oxide is spray dried prior to contact with the organoaluminum.

12. The process of claim 10, wherein the support is obtained by spray drying an aqueous slurry of alkylaluminum treated layered silicate and an inorganic oxide comprising a Group 1 or 2 silicate.

13. The process of claim 10, wherein the support is obtained by spray drying an aqueous slurry of trialkyl aluminum treated montmorillonite, where the alkyl is a C1 to C12 alkyl group, and a sodium, potassium, lithium or magnesium silicate, or a mixture thereof.

14. The process of claim 10, wherein the support comprises spheroidal particles of a combination of the organoaluminum treated layered silicate and the inorganic oxide.

15. The process of claim 10, wherein: 1) the support comprises particles having an average diameter of 20 to 100 microns, and/or 2) the support comprises particles having a pore volume of between 0.1 and 0.4 cc/g, and/or 3) the support comprises particles having a surface area of between 100 and 200 m²/g.

16. The process of claim 10, wherein the support comprises at least 10 wt % montmorillonite, based upon the weight of the organoaluminum treated layered silicate and the inorganic oxide.

17. The process of claim 10, wherein the organoaluminum comprises trimethylaluminum, triethylaluminum, triisobutylaluminum, tri-n-hexylaluminum, tri-n-octylaluminum, triisooctylaluminum, triphenylaluminum, or a combination thereof.

18. The process of claim 10, wherein the support and/or the catalyst system has an average aspect ratio (L/W) of 1 to 1.7.

19. The process of claim 10, wherein the support is obtained by spray drying an aqueous slurry of layered silicate and inorganic oxide, where a pH of the slurry is from about 3 to 7; a dry solids content of the aqueous slurry is from about 20 to 30 wt % based on the weight of the slurry and the dry weight of the solids; and a ratio of inorganic oxide to layered silicate is in the range of 1:5 to 1:20.

20. The process of claim 19, wherein the spray dried combination has an average particle size of from 20 to 125 microns and is free flowing.

21. The process of claim 10, wherein the support comprises 50 to 90 wt % montmorillonite, based upon the weight of the organoaluminum treated layered silicate and the inorganic oxide.

22. The process of claim 10, wherein alumoxane and/or non-coordinating anion is absent.

23. The process of claim 10, wherein the process to polymerize olefins is conducted in the gas phase or the slurry phase.

24. The process of claim 10, wherein the polyolefin composition, has an Mw of 1,000,000 g/mol or more and comprises at least 0.1 wt % of the layered silicate, where polyolefin composition A has: 1) no diffraction peak resulting from interlamellar spacing of the organoaluminum treated layered silicate, or 2) a diffraction peak resulting from interlamellar spacing of the organoaluminum treated layered silicate of Z Angstroms or more, where Z=5X, where X is the diffraction peak resulting from interlamellar spacing of the support before combination with the catalyst compound, as measured by wide angle x-ray scattering.

25. The process of claim 10, wherein the polyolefin composition has no diffraction peak resulting from interlamellar spacing of the organoaluminum treated layered silicate.

26. The process of claim 10, wherein the polyolefin composition is an ethylene polymer.

27. The process of claim 10, wherein the polyolefin composition is an ethylene homopolymer.

28. The process of claim 10, wherein the polyolefin composition is an ethylene copolymer.

29. The process of claim 10, wherein the polyolefin composition has an Mw from 1,000,000 to 3,000,000 g/mol.

30. A process to polymerize olefins comprising:
i) contacting olefins with a catalyst system comprising: 1) support comprising inorganic oxide and an organoaluminum treated layered silicate and 2) pyridyldiamido compound represented by the Formula (A):

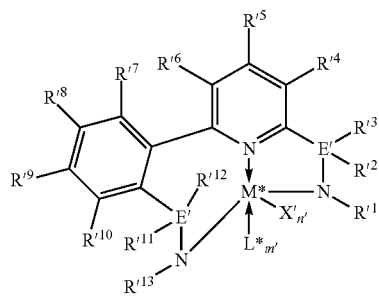
(A)

wherein:

M* is a Group 4 metal;

each E' group is independently selected from carbon, silicon, or germanium;

each X' is an anionic leaving group;

L* is a neutral Lewis base;

$R'^1$ and $R'^{13}$ are independently selected from the group consisting of hydrocarbyls, substituted hydrocarbyls, and silyl groups;

$R'^2, R'^3, R'^4, R'^5, R'^6, R'^7, R'^8, R'^9, R'^{10}, R'^{11}$, and $R'^{12}$ are independently selected from the group consisting of hydrogen, hydrocarbyls, alkoxy, silyl, amino, aryloxy, substituted hydrocarbyls, halogen, and phosphine;

n' is 1 or 2;

m' is 0, 1, or 2; and two X' groups may be joined together to form a dianionic group;

two L* groups may be joined together to form a bidentate Lewis base;

an X' group may be joined to an L* group to form a monoanionic bidentate group;

$R'^7$ and $R'^8$ may be joined to form a ring; and $R'^{10}$ and $R'^{11}$ may be joined to form a ring; and ii) obtaining a polyolefin composition having an Mw of 1,000,000 g/mol or more and comprising 5 wt % or less of the layered silicate, where the polyolefin composition has: 1) no diffraction peak resulting from interlamellar spacing of the organoaluminum treated layered silicate, or 2) a diffraction peak resulting from interlamellar spacing of the organoaluminum treated layered silicate of Z Angstroms or more, where Z=5X, where X is the diffraction peak resulting from interlamellar spacing of the support before combination with the catalyst compound, as measured by wide angle x-ray scattering.

31. A process to polymerize olefins comprising:

i) contacting olefins comprising ethylene with a catalyst system comprising: 1) support comprising: a) an organoaluminum treated layered silicate, and b) inorganic oxide, and 2) pyridyldiamido compound represented by the Formula (A):

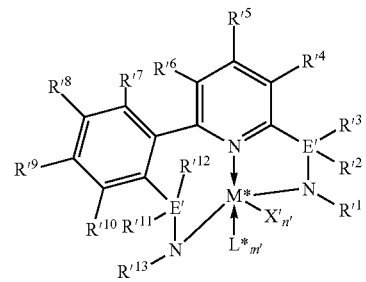
(A)

wherein:

M* is a Group 4 metal;

each E' group is independently selected from carbon, silicon, or germanium;

each X' is an anionic leaving group;

L* is a neutral Lewis base;

$R'^1$ and $R'^{13}$ are independently selected from the group consisting of hydrocarbyls, substituted hydrocarbyls, and silyl groups;

$R'^2, R'^3, R'^4, R'^5, R'^6, R'^7, R'^8, R'^9, R'^{10}, R'^{11}$, and $R'^{12}$ are independently selected from the group consisting of hydrogen, hydrocarbyls, alkoxy, silyl, amino, aryloxy, substituted hydrocarbyls, halogen, and phosphine;

n' is 1 or 2;

m' is 0, 1, or 2; and two X' groups may be joined together to form a dianionic group;

two L* groups may be joined together to form a bidentate Lewis base;

an X' group may be joined to an L* group to form a monoanionic bidentate group;

$R'^7$ and $R'^8$ may be joined to form a ring; and $R'^{10}$ and $R'^{11}$ may be joined to form a ring;

ii) obtaining an ethylene polymer having an Mw of 1,000,000 g/mol or more and comprising 0.1 to 5 wt % of a layered silicate, where the ethylene polymer has no diffraction peak resulting from interlamellar spacing of the layered silicate, as measured by wide angle x-ray scattering.

32. A process to polymerize olefins comprising:

i) contacting olefins comprising ethylene with a catalyst system comprising: 1) support comprising: a) an organoaluminum treated layered silicate, and b) an organoaluminum treated inorganic oxide, and 2) pyridyldiamido compound represented by the Formula (A):

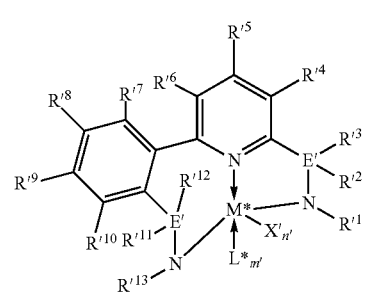
(A)

wherein:

M* is a Group 4 metal;

each E' group is independently selected from carbon, silicon, or germanium;

each X' is an anionic leaving group;

L* is a neutral Lewis base;

$R^{l1}$ and $R^{l13}$ are independently selected from the group consisting of hydrocarbyls, substituted hydrocarbyls, and silyl groups;

$R^{l2}$, $R^{l3}$, $R^{l4}$, $R^{l5}$, $R^{l6}$, $R^{l7}$, $R^{l8}$, $R^{l9}$, $R^{l10}$, $R^{l11}$, and $R^{l12}$ are independently selected from the group consisting of hydrogen, hydrocarbyls, alkoxy, silyl, amino, aryloxy, substituted hydrocarbyls, halogen, and phosphine;

n' is 1 or 2;

m' is 0, 1, or 2; and two X' groups may be joined together to form a dianionic group;

two L* groups may be joined together to form a bidentate Lewis base;

an X' group may be joined to an L* group to form a monoanionic bidentate group;

$R^{l7}$ and $R^{l8}$ may be joined to form a ring; and $R^{l10}$ and $R^{l11}$ may be joined to form a ring;

ii) obtaining an ethylene polymer having an Mw of 1,000,000 g/mol or more and comprising 0.1 to 5 wt % of a layered silicate, where the ethylene polymer has no diffraction peak resulting from interlamellar spacing of the layered silicate, as measured by wide angle x-ray scattering.

33. A process to polymerize olefins comprising:

i) contacting olefins with a catalyst system comprising: 1) support comprising: a) an organoaluminum treated layered silicate, and b) inorganic oxide, and 2) pyridyldiamido compound represented by the Formula (I):

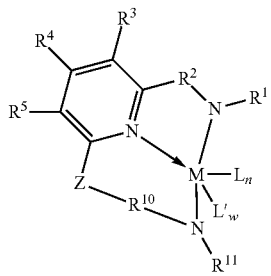

(I)

wherein:

M is a Group 4 metal;

Z is —$(R^{14})_pC—C(R^{15})_q$—, where $R^{14}$ and $R^{15}$ are independently selected from the group consisting of hydrogen, hydrocarbyls, and substituted hydrocarbyls, and wherein adjacent $R^{14}$ and $R^{15}$ groups may be joined to form an aromatic or saturated, substituted or unsubstituted hydrocarbyl ring, where the ring has 5, 6, 7, or 8 ring carbon atoms and where substitutions on the ring can join to form additional rings, p is 0, 1, or 2, and q is 0, 1, or 2;

$R^1$ and $R^{11}$ are independently selected from the group consisting of hydrocarbyls, substituted hydrocarbyls, and silyl groups;

$R^2$ and $R^{10}$ are each, independently, -E($R^{12}$)($R^{13}$)— with E being carbon, silicon, or germanium, and each $R^{12}$ and $R^{13}$ being independently selected from the group consisting of hydrogen, hydrocarbyls, alkoxy, silyl, amino, aryloxy, substituted hydrocarbyls, halogen, and phosphine, $R^{12}$ and $R^{13}$ may be joined to each other or to $R^{14}$ or $R^{15}$ to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

L is an anionic leaving group, where the L groups may be the same or different and any two L groups may be linked to form a dianionic leaving group;

n is 0, 1, 2, or 3;

L' is a neutral Lewis base; and w is 0, 1, 2, or 3; and ii) obtaining a polyolefin composition.

34. The process of claim 33, wherein M is zirconium or hafnium.

35. The process of claim 33, wherein each of $R^1$, $R^3$, $R^4$, $R^5$, and $R^{11}$ is, independently, hydrogen or a hydrocarbyl.

36. The process of claim 33, wherein M is hafnium.

37. The process of claim 33, wherein M is zirconium or hafnium.

38. The process of claim 33, wherein each of $R^2$ and $R^{10}$ is independently, -E($R^{12}$)($R^{13}$)— with E being carbon and each $R^{12}$ and $R^{13}$ being independently selected from the group consisting of hydrocarbyls.

39. A process to polymerize olefins comprising:

i) contacting olefins with a catalyst system comprising: 1) support comprising: a) an organoaluminum treated layered silicate, and b) inorganic oxide, and 2) pyridyldiamido compound represented by Formula II:

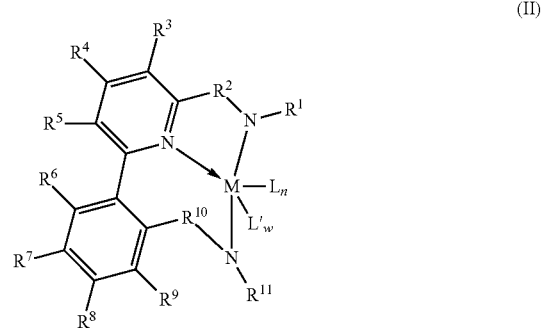

(II)

wherein:

$R^6$, $R^7$, $R^8$, and $R^9$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^7$ & $R^8$, and/or $R^8$ & $R^9$, and/or $R^9$ & $R^{10}$) may be joined to form a saturated, substituted or unsubstituted hydrocarbyl or heterocyclic ring, where the ring has 5, 6, 7, or 8 ring carbon atoms and where substitutions on the ring can join to form additional rings;

M is a Group 4 metal;

$R^1$ and $R^{11}$ are independently selected from the group consisting of hydrocarbyls, substituted hydrocarbyls, and silyl groups;

$R^2$ and $R^{10}$ are each, independently, $-E(R^{12})(R^{13})-$ with E being carbon, silicon, or germanium, and each $R^{12}$ and $R^{13}$ being independently selected from the group consisting of hydrogen, hydrocarbyls, alkoxy, silyl, amino, aryloxy, substituted hydrocarbyls, halogen, and phosphine, $R^{12}$ and $R^{13}$ may be joined to each other to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

L is an anionic leaving group, where the L groups may be the same or different and any two L groups may be linked to form a dianionic leaving group;

n is 0, 1, 2, or 3;

L' is a neutral Lewis base; and w is 0, 1, 2, or 3; and ii) obtaining a polyolefin composition.

40. A process to polymerize olefins comprising:
i) contacting olefins with a catalyst system comprising: 1) support comprising: a) an organoaluminum treated layered silicate, and b) inorganic oxide, and 2) pyridyldiamido compound represented by Formula III:

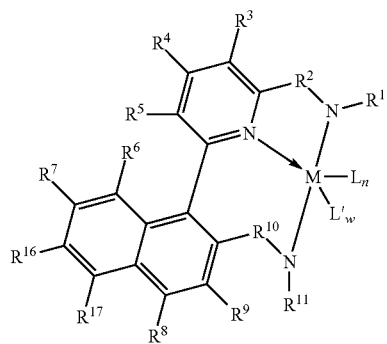

(III)

wherein:

$R^6$, $R^7$, $R^8$, $R^9$, $R^{16}$, and $R^{17}$ are independently selected from the group consisting of hydrogen, hydrocarbyls, substituted hydrocarbyls, alkoxy, halogen, amino, and silyl, wherein adjacent R groups ($R^6$ & $R^7$, and/or $R^7$ & $R^{16}$, and/or $R^{16}$ & $R^{17}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings;

M is a Group 4 metal;

$R^1$ and $R^{11}$ are independently selected from the group consisting of hydrocarbyls, substituted hydrocarbyls, and silyl groups;

$R^2$ and $R^{10}$ are each, independently, $-E(R^{12})(R^{13})-$ with E being carbon, silicon, or germanium, and each $R^{12}$ and $R^{13}$ being independently selected from the group consisting of hydrogen, hydrocarbyls, alkoxy, silyl, amino, aryloxy, substituted hydrocarbyls, halogen, and phosphine, $R^{12}$ and $R^{13}$ may be joined to each other to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

L is an anionic leaving group, where the L groups may be the same or different and any two L groups may be linked to form a dianionic leaving group;

n is 0, 1, 2, or 3;

L' is a neutral Lewis base; and w is 0, 1, 2, or 3; and ii) obtaining a polyolefin composition.

41. The process of claim 40, wherein a combination of layered silicate and inorganic oxide is spray dried prior to contact with the organoaluminum.

42. The process of claim 40, wherein the support is obtained by spray drying an aqueous slurry of alkylaluminum treated layered silicate and an inorganic oxide comprising a Group 1 or 2 silicate.

43. The process of claim 40, wherein the support is obtained by spray drying an aqueous slurry of trialkyl aluminum treated montmorillonite, where the alkyl is a C1 to C12 alkyl group, and a sodium, potassium, lithium or magnesium silicate, or a mixture thereof.

44. The process of claim 40, wherein: 1) the support comprises particles having an average diameter of 20 to 100 microns, and/or 2) the support comprises particles having a pore volume of between 0.1 and 0.4 cc/g, and/or 3) the support comprises particles having a surface area of between 100 and 200 m$^2$/g.

45. The process of claim 40, wherein the organoaluminum comprises trimethylaluminum, triethylaluminum, triisobutylaluminum, tri-n-hexylaluminum, tri-n-octylaluminum, triisooctylaluminum, triphenylaluminum, or a combination thereof.

46. The process of claim 40, wherein alumoxane and/or non-coordinating anion is absent.

47. The process of claim 40, wherein the polyolefin composition is an ethylene polymer.

48. An ethylene polymer having an Mw of 1,000,000 g/mol or more and comprising 0.1 to 5 wt % of a layered silicate, where the ethylene polymer has no diffraction peak resulting from interlamellar spacing of the layered silicate, as measured by wide angle x-ray scattering.

49. An ethylene polymer having an Mw of 1,000,000 g/mol or more and comprising 0.1 to 5 wt % of a layered silicate derived from a supported catalyst used to produce the ethylene polymer, where the ethylene polymer has 1) no diffraction peak resulting from interlamellar spacing of the layered silicate present in the supported catalyst or 2) a diffraction peak resulting from interlamellar spacing of the layered silicate of Z Angstroms or more, where Z=5X, where X is the diffraction peak resulting from interlamellar spacing of the layered silicate present in the supported catalyst, as measured by wide angle x-ray scattering.

* * * * *